US010974692B2

(12) United States Patent
Liteplo et al.

(10) Patent No.: US 10,974,692 B2
(45) Date of Patent: Apr. 13, 2021

(54) LOCKING RETRACTOR MECHANISM FOR A SEATBELT SYSTEM AND A METHOD FOR ACTUATING THE SAME

(71) Applicant: TOOL, INC., Marblehead, MA (US)

(72) Inventors: William P. Liteplo, Middleton, MA (US); Jason G. Sidman, Marblehead, MA (US); Eric A. Miller, Jr., Wellesley, MA (US); Michael D. Tinstman, Malden, MA (US); Arnold J. Herberg, Davisburg, MI (US); Paul DiTullio, Somerville, MA (US); Marcus R. Hanna, South Boston, MA (US); Thomas Gernetzke, Beverly, MA (US); John D. Fiegener, Marblehead, MA (US); Ryan Thompson, Somerville, MA (US); Daniel Bloch, Bethpage, NY (US)

(73) Assignee: Tool, Inc., Marblehead, MA (US)

( * ) Notice: Subject to any disclaimer, the term of this patent is extended or adjusted under 35 U.S.C. 154(b) by 0 days.

(21) Appl. No.: 16/150,463

(22) Filed: Oct. 3, 2018

(65) Prior Publication Data
US 2019/0031139 A1    Jan. 31, 2019

Related U.S. Application Data

(63) Continuation-in-part of application No. 15/256,051, filed on Sep. 2, 2016, now Pat. No. 10,246,048.
(Continued)

(51) Int. Cl.
*B60R 22/48* (2006.01)
*B60R 22/343* (2006.01)
(Continued)

(52) U.S. Cl.
CPC .......... *B60R 22/48* (2013.01); *A44B 11/2561* (2013.01); *B60N 2/2806* (2013.01);
(Continued)

(58) Field of Classification Search
CPC ... B60R 22/48; B60R 22/343; B60R 22/3416; B60R 2022/4825
See application file for complete search history.

(56) References Cited

U.S. PATENT DOCUMENTS 3,294,447 A    12/1966 Riley
3,323,831 A     6/1967 Buechler
(Continued)

FOREIGN PATENT DOCUMENTS

GB         1311978          3/1973

*Primary Examiner* — Paul N Dickson
*Assistant Examiner* — Joselynn Y Sliteris
(74) *Attorney, Agent, or Firm* — Sand, Sebolt & Wernow Co., LPA

(57) ABSTRACT

A seatbelt system comprising a buckle; a spool with a ratchet wheel and webbing that is windable onto or off of the spool as the spool rotates. A control mechanism is operatively engaged with a pawl located proximate the ratchet wheel. When the control mechanism is in a first condition, the pawl is disengaged from the ratchet wheel and the ratchet wheel and spool are rotatable to wind the webbing onto or off of the spool. When the control mechanism is in a second condition, the pawl is moved into engagement with the ratchet wheel and the ratchet wheel and spool are only able to rotate the webbing onto the spool. The control mechanism includes electronic switches and sensors that have to be actuated along with engaging the locking tongue in the buckle in order to move the pawl into engagement with the ratchet wheel.

10 Claims, 40 Drawing Sheets

Related U.S. Application Data

(60) Provisional application No. 62/215,427, filed on Sep. 8, 2015.

(51) Int. Cl.
  *A44B 11/25* (2006.01)
  *B60N 2/28* (2006.01)
  *B60R 22/34* (2006.01)

(52) U.S. Cl.
  CPC ........ *B60R 22/343* (2013.01); *B60R 22/3416* (2013.01); *B60R 2022/3421* (2013.01); *B60R 2022/4825* (2013.01)

(56) References Cited

U.S. PATENT DOCUMENTS

| | | | |
|---|---|---|---|
| 4,305,618 A | 12/1981 | Molnar | |
| 4,427,164 A | 1/1984 | Rumpf | |
| 4,664,413 A | 5/1987 | Sato | |
| 4,733,886 A | 3/1988 | Yokote | |
| 4,856,727 A | 8/1989 | Schmidt et al. | |
| 4,893,874 A | 1/1990 | Childress et al. | |
| 4,935,994 A | 6/1990 | Boone et al. | |
| 5,023,980 A | 6/1991 | Thomas | |
| 5,050,274 A | 9/1991 | Staniszewski et al. | |
| 5,058,244 A | 10/1991 | Fernandez | |
| 5,192,035 A | 3/1993 | Dufour | |
| 5,286,084 A | 2/1994 | Bart | |
| 5,370,333 A * | 12/1994 | Lortz | B60R 22/35 242/384.1 |
| 5,484,190 A | 1/1996 | Corrion et al. | |
| 5,529,381 A | 6/1996 | Zhao et al. | |
| 5,553,804 A | 9/1996 | Hamann | |
| 5,649,341 A | 7/1997 | Ashline et al. | |
| 5,806,148 A | 9/1998 | McFalls et al. | |
| 5,870,816 A | 2/1999 | McFalls et al. | |
| 6,550,810 B1 * | 4/2003 | Bauer | B60R 21/0132 242/384.2 |
| 6,732,969 B2 * | 5/2004 | Tanji | B60R 22/343 242/384.1 |
| 7,010,836 B2 | 3/2006 | Acton et al. | |
| 7,185,919 B2 | 3/2007 | Mather et al. | |
| 7,871,132 B2 | 1/2011 | Rogers | |
| 8,052,220 B2 | 11/2011 | Dennis et al. | |
| 8,087,696 B2 | 1/2012 | Mather et al. | |
| 8,322,000 B2 | 12/2012 | Dziengowski et al. | |
| 8,382,160 B2 | 2/2013 | Disley et al. | |
| 10,377,340 B2 * | 8/2019 | Jaradi | B60R 22/415 |
| 2009/0048739 A1 | 2/2009 | Midorikawa | |

* cited by examiner

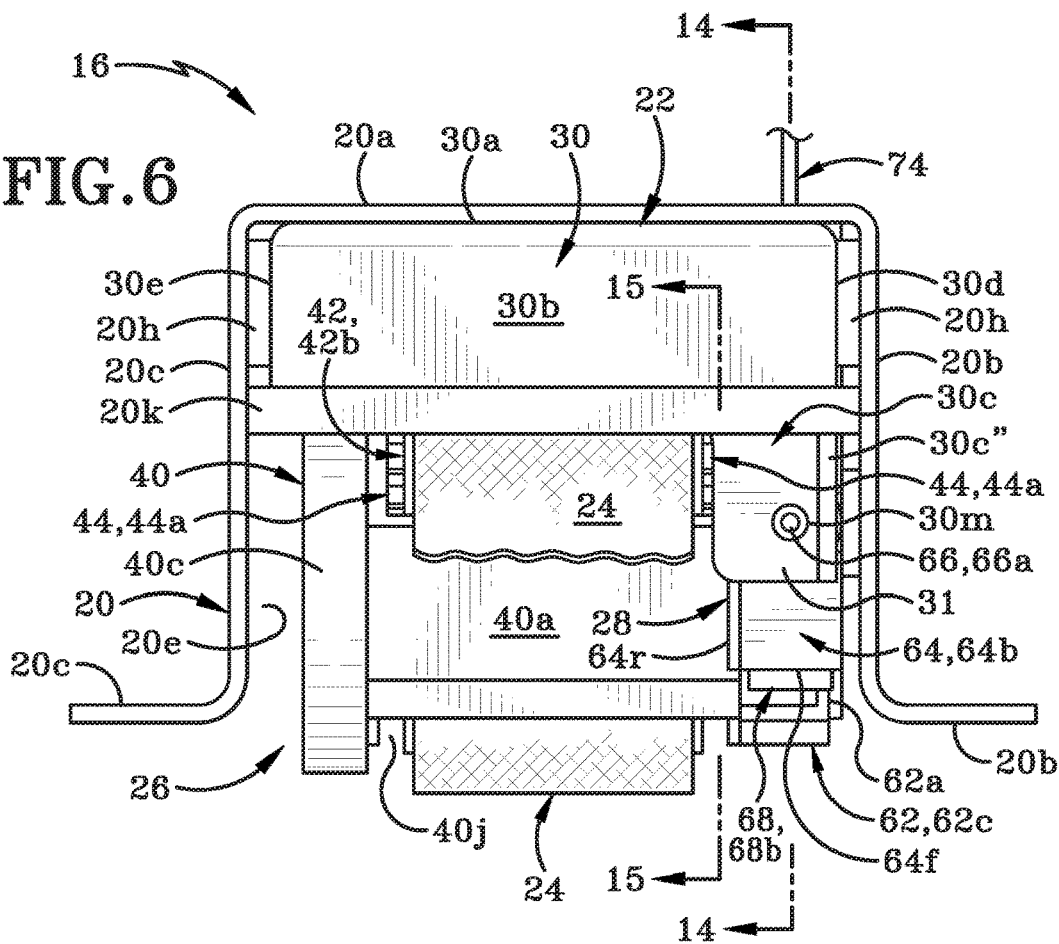
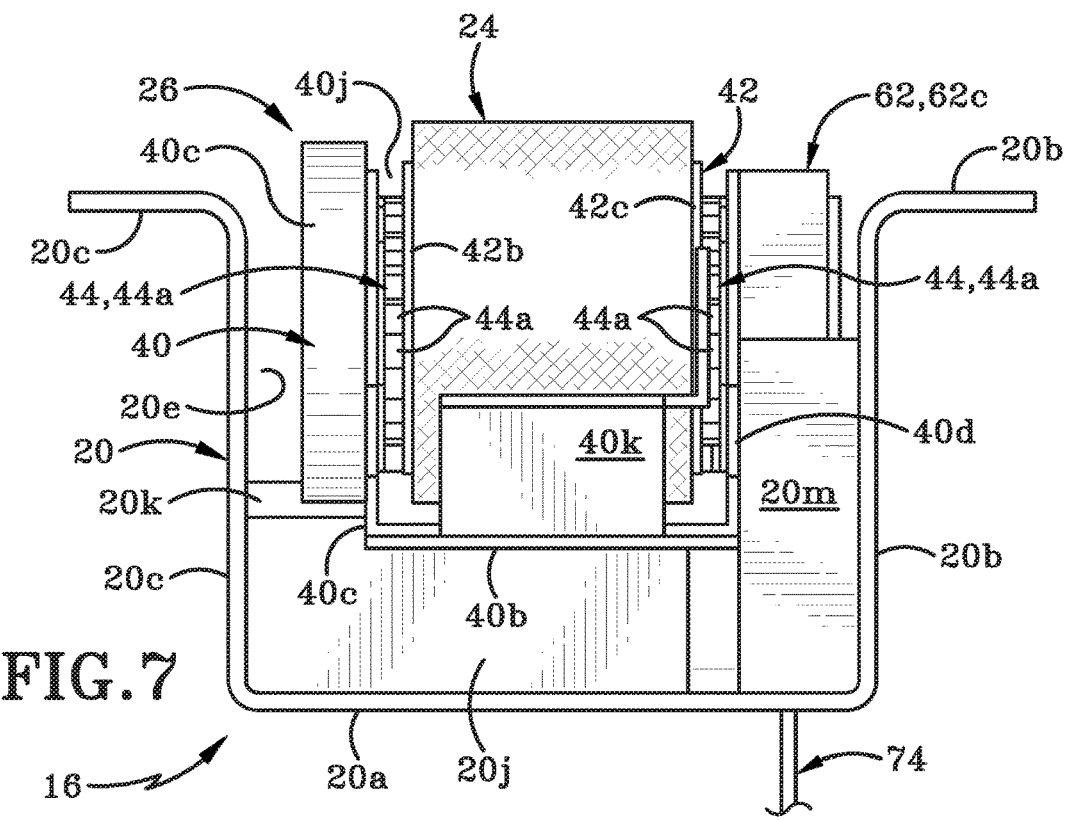

LOCKING RETRACTOR MECHANISM FOR A SEATBELT SYSTEM AND A METHOD FOR ACTUATING THE SAME

CROSS-REFERENCE TO RELATED APPLICATIONS

This application is a Continuation-in-Part of U.S. patent application Ser. No. 15/256,051, filed Sep. 2, 2016, which claims the benefit of U.S. Provisional Patent Application Ser. No. 62/215,427, filed Sep. 8, 2015, the entire disclosures of which are incorporated herein by reference.

BACKGROUND

Technical Field

This disclosure relates generally to seatbelts. More particularly, this disclosure is directed to seatbelts that might be used to secure a child seat in place. Specifically, the disclosure relates to a direct or manual locking retractor mechanism that is only able to be actuated after a locking tongue on the seatbelt webbing has been interlockingly engaged in a buckle assembly, and a control mechanism has subsequently and purposefully been activated by a user.

Background Information

Federal law in the United States requires that passenger seats in a vehicle be provided with a seatbelt system where a lap belt portion of the system is lockable. The lap belt portion may be utilized to buckle a person safely into the seat. In other instances, the lap belt portion may be utilized to secure a child seat (or child car seat) to a vehicle seat in a safe, secure manner. This type of seatbelt system is known as an Automatic Locking Retractor (ALR).

A typical manner of securing a child seat in place with an ALR-type seatbelt system requires that the user place the child seat on the vehicle seat in the desired orientation and then slowly and steadily pull the seatbelt webbing out of a seatbelt housing until no further webbing can be withdrawn therefrom. The user then has to carefully thread the locking tongue that is provided on the webbing through a specially provided seatbelt channel on the child seat. The locking tongue is inserted into the seatbelt buckle assembly. The user then has to manually take up sufficient slack in the webbing so that the child seat is snugly and firmly retained against the vehicle seat. This is accomplished by feeding the webbing, section by section, back into the seatbelt housing while pushing downwardly on the child seat. When each section of webbing that is being fed back into the housing is released, the ALR automatically works to prevent any part of the webbing from being withdrawn once again from the seatbelt housing. According to Federal guidelines, the webbing has to be fed back into the housing up until the point that the child seat will not tend to move more than one inch to the left or to the right or one inch to the front or to the back when manipulated by the adult performing the child seat installation.

While ALR systems work well to secure a child seat to a vehicle seat, these systems tend to have some unforeseen issues. There have been a number of incidents over the past few years where children in the rear seat of a vehicle have accidentally activated the ALR mode of the seatbelt while playing with a seatbelt and have become tightly entangled in the seatbelt. In some instances, the entanglements have been severe enough to require cutting of the seatbelt in order to release the child. These types of entanglements have been particularly prevalent in instances where the seatbelt is being misused, i.e., not being used properly. Even adults have accidentally triggered ALR systems with similar results.

Another issue with presently known ALR systems is that they require that substantially the entire webbing be withdrawn from the seatbelt housing in order to activate the retractor mechanism. In some instances the user will not realize the ALR system has not been activated or they may not even know that the system needs to be activated. Consequently, the child seat may be installed with the seatbelt not adequately secured in place. In other words, the seatbelt may not lock properly because the ALR system has not been actuated. Any child seat secured by a seatbelt in this state will tend to be only loosely restrained against the vehicle seat and is therefore not safe for use.

In addition, a new weight-limit for child seats secured by any "Lower Anchors and Tethers for Children" system (or LATCH system) went into effect in February 2014 limiting the combined maximum weight of the child seat and child to 65 pounds. LATCH systems secure the child seat to specially installed seatbelt tethers that are anchored on the vehicle's frame. Because of the new weight limit, young children may need to be moved out of their tethered child seats and into regular seatbelts. However, this may pose a safety hazard because of where on the body a seatbelt may contact a smaller child. Parents may want to use a child seat for that child but since the tether cannot be utilized, the seatbelt is the only option for securing the child seat in place.

SUMMARY

It would be desirable to have a child seat locking retractor mechanism in a vehicle that cannot and will not be accidentally activated by anyone sitting next to the child seat on the vehicle seat. It would further be desirable to be able to use a single seatbelt in two different ways. The first way would be to use the seatbelt to buckle a person directly into the vehicle seat; where the seatbelt would be able to allow the person to bend and move freely without locking up and preventing further motion. The second way would be to use the seatbelt to secure a child seat in place on the vehicle seat. In this instance the seatbelt may be threaded through the child seat without having to be completely unwound from a seatbelt assembly to activate a locking retractor mechanism. Furthermore, the seatbelt would desirably be able to be cinched or tightened to keep the child seat in place and movement of the webbing out of the seatbelt housing would be prevented but slack webbing would be able to be taken up into the seatbelt housing.

It is therefore an objective to provide a locking retractor mechanism that is only engageable when a child seat is being secured in place against a vehicle seat.

It is a further objective to provide a locking retractor mechanism that is quickly and easily activated when installing a child seat without requiring that the entire webbing be unwound from the seatbelt housing in order to activate the system.

It is a further objective to provide a locking retractor mechanism that requires a purposeful decision on the part of the person installing the child seat to activate a cinching mechanism to install the child seat. It is a further objective that the locking retractor mechanism be simple to use once a decision to activate the cinching mechanism has been made.

It is a further objective to indicate to a user that the locking retractor mechanism has not been activated by the fact that the seatbelt is not able to be cinched until an actuator assembly has been engaged.

It is a further objective to provide a locking retractor mechanism that does not interfere with Emergency Locking Retractors (ELR) in a vehicle seatbelt.

It is a further objective to provide a locking retractor mechanism that has a substantially lower risk of entrapment or entanglement of a vehicle occupant if the seatbelt system is misused.

It is a further objective to provide a locking retractor mechanism that does not pose additional risks to the vehicle's occupants while solving issues with previously known systems.

A seatbelt system is disclosed herein comprising a buckle assembly, a spool with a ratchet wheel, and webbing that is windable onto or off of the spool as the spool rotates. A control mechanism is operatively engaged with a pawl located proximate the ratchet wheel. When the control mechanism is in a first condition, the pawl is disengaged from the ratchet wheel and the ratchet wheel and spool are rotatable to wind the webbing onto or off of the spool. When the control mechanism is in a second condition, the pawl is moved into engagement with the ratchet wheel and the ratchet wheel and spool are only able to rotate the webbing onto the spool. The control mechanism includes a button that has to be pushed by a user after a locking tongue on the seatbelt webbing is engaged with the buckle assembly in order to move the pawl into engagement with the ratchet wheel.

In one aspect the disclosure may provide a seatbelt system comprising a buckle assembly; a spool; a length of webbing having a first end engaged with the spool, a locking tongue provided on the webbing and wherein the locking tongue is selectively engageable in the buckle assembly; a ratchet wheel operatively engaged with the spool, said ratchet wheel and spool being selectively rotatable in unison about an axis in a first direction to wind the webbing onto the spool and in a second direction to wind the webbing off of the spool; a pawl configured to stop rotation of the ratchet wheel in one direction and thereby to stop rotation of the spool; and a control mechanism operatively engaged with the pawl, said control mechanism being movable between a first condition and a second condition; and when the control mechanism is in the first condition the pawl is disengaged from the ratchet wheel and the ratchet wheel and spool are rotatable in either of the first and second directions; and when the control mechanism is in the second condition the pawl is moved into engagement with the ratchet wheel and the ratchet wheel and spool are only able to rotate in the first direction.

In another aspect, the disclosure may provide a method of securing a child seat to a vehicle seat using a seatbelt mounted for rotation on a spool; said method comprising providing a seatbelt assembly that includes a seatbelt webbing connected at one end to a spool, where the spool is rotatable about an axis in a first direction to wind the webbing on the spool and is rotatable in a second direction to wind the webbing off of the spool; providing a ratchet wheel that is rotatable in unison with the spool; providing a pawl proximate the ratchet wheel; actuating a control mechanism operatively engaged with the pawl; moving the pawl into engagement between two teeth on the ratchet wheel; stopping, with the pawl, rotation of the ratchet wheel in the second direction while permitting rotation of the ratchet wheel in the first direction.

In another aspect the disclosure may provide a method of using a seatbelt in a vehicle comprising providing a seatbelt assembly that includes a seatbelt webbing connected at one end to a spool, where the spool is rotatable about an axis in a first direction to wind the webbing on the spool and is rotatable in a second direction to wind the webbing off of the spool; providing a ratchet wheel that is rotatable in unison with the spool; providing a pawl proximate the ratchet wheel; providing a control mechanism operatively engaged with the pawl; and selecting one of a first mode or a second mode with which to use the seatbelt assembly; where the first mode does not permit cinching of the seatbelt webbing and the second mode does permit cinching of the seatbelt webbing. The step of selecting the first mode includes engaging a locking tongue on the seatbelt webbing in a buckle assembly provided on the vehicle. The step of selecting the second mode includes engaging the locking tongue in the buckle assembly followed by engaging the control mechanism to move the pawl into contact with the ratchet wheel and stopping rotation of the ratchet wheel and thereby the spool with the pawl. The method further comprises the step of stopping the use of the seatbelt assembly in the selected one of the first mode or the second mode by disengaging the locking tongue from the buckle assembly.

In another aspect, the present disclosure may provide a seatbelt system comprising a retractor mechanism including a spool mounted for selective rotation about an axis; a length of seatbelt webbing having a first end engaged with the spool; a ratchet wheel operatively engaged with the spool, said ratchet wheel and spool being selectively rotatable in unison about the axis in a first direction to wind the seatbelt webbing onto the spool and in a second direction to wind the seatbelt webbing off of the spool; a control mechanism operatively engaged with the retractor mechanism; said control mechanism including a slider; an electrical actuator operable to move the slider between a first position and a second position; and a pawl; wherein the slider moves the pawl into engagement with the ratchet wheel when the slider is moved to the first position and moves the pawl out of engagement with the ratchet wheel when the slider is moved to the second position.

In a further aspect, the present disclosure may provide a method of locking a retractor mechanism to secure a child car seat against a vehicle seat comprising engaging a locking tongue on a length of seatbelt webbing into a cavity of a buckle housing; sending a first electrical signal to a computer when the locking tongue is engaged in the buckle housing; moving a switch on the buckle housing into a first position; sending a second electrical signal to the computer when the switch is moved to the first position; unwinding some or all of the seatbelt webbing wound around a spool of a retractor mechanism; sending a third electrical signal to the computer when all of the seatbelt webbing has been unwound from the spool; and locking the spool against rotation in a direction that will unwind seatbelt webbing from the spool.

In a further aspect, the present disclosure may provide a method of securing a child car seat in a vehicle with a seatbelt; said method comprising positioning a child car seat on a vehicle seat; threading a length of a seatbelt webbing through a belt path provided on the child car seat; moving a switch on a buckle housing to a car seat mode; engaging a locking tongue on the seatbelt webbing in the buckle housing; engaging an automatic locking retractor mechanism; and preventing unwinding of the seatbelt webbing from a spool while permitting winding of the seatbelt webbing onto the spool. The engaging of the automatic locking retractor mechanism includes controlling rotation of the ratchet wheel with the control mechanism. The method may further comprise sending an electronic signal to the computer to indicate the switch is in the car seat mode; and sending an electronic signal to the computer to indicate the locking tongue is engaged in the buckle housing. The method may further comprise sending a signal from the computer to a control mechanism operatively engaged with a ratchet wheel associated with the spool. Still further, the method may comprise unwinding some or all of the seatbelt webbing wound around a spool of a retractor mechanism. The method may further include sending an electronic signal to a computer to indicate all the seatbelt webbing is unwound. The method may also include winding seatbelt webbing back onto the spool until the child car seat is securely retained against the vehicle seat. The controlling of the rotation of the ratchet wheel further includes moving a pawl of the control mechanism into engagement with the ratchet wheel. The moving of the pawl includes moving a slider of the retractor mechanism from a first position to a second position; capturing the pawl in a gap defined between spaced-apart fingers of the slider; and rotating the pawl from a first position where the pawl is out of engagement with the ratchet wheel to a second position where the pawl is in engagement with the ratchet wheel. In order to remove the child car seat from the vehicle, the method may further include disengaging the automatic locking retractor mechanism. The disengaging includes removing the locking tongue from the buckle housing. The method may further comprise returning the switch on the buckle housing to a default. The default position may be a position in which the seatbelt is usable to secure an adult in the vehicle.

In a further aspect, the present disclosure may provide a method of securing a child car seat in a vehicle with a seatbelt; said method comprising positioning a child car seat on a vehicle seat; threading a length of a seatbelt webbing through a belt path provided on the child car seat; moving a switch on a buckle housing to a car seat mode; sending an electronic signal to the computer to indicate the switch is in the car seat mode; engaging a locking tongue on the seatbelt webbing in the buckle housing; sending an electronic signal to the computer to indicate the locking tongue is engaged in the buckle housing; engaging an automatic locking retractor mechanism; and preventing unwinding of the seatbelt webbing from a spool while permitting winding of the seatbelt webbing onto the spool. The engaging of the automatic locking retractor mechanism includes sending a signal from the computer to a control mechanism operatively engaged with a ratchet wheel associated with the spool; and controlling rotation of the ratchet wheel with the control mechanism. The method may further comprise unwinding some or all of the seatbelt webbing wound around a spool of a retractor mechanism; and sending an electronic signal to a computer to indicate all the seatbelt webbing is unwound. The method may further comprise winding seatbelt webbing back onto the spool until the child car seat is securely retained against the vehicle seat. The controlling of the rotation of the ratchet wheel further includes moving a pawl of the control mechanism into engagement with the ratchet wheel. The moving of the pawl includes moving a slider of the retractor mechanism from a first position to a second position; capturing the pawl in a gap defined between spaced-apart fingers of the slider; and rotating the pawl from a first position where the pawl is out of engagement with the ratchet wheel to a second position where the pawl is in engagement with the ratchet wheel. The method may further include disengaging the automatic locking retractor mechanism to remove the child car seat from the vehicle. The disengaging may include removing the locking tongue from the buckle housing. The disengaging may further include returning the switch on the buckle housing to a default position where the seatbelt may be used to secure an adult or older child in place. In the default position the seatbelt will not be used to secure a child seat in place.

BRIEF DESCRIPTION OF THE SEVERAL VIEWS OF THE DRAWINGS

A sample embodiment of the disclosure is set forth in the following description, is shown in the drawings and is particularly and distinctly pointed out and set forth in the appended claims. The accompanying drawings, which are fully incorporated herein and constitute a part of the specification, illustrate various examples, methods, and other example embodiments of various aspects of the disclosure. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

FIG. 6 is a top plan view of the seatbelt assembly taken along line 6-6 of FIG. 5

FIG. 7 is a bottom plan view of the seatbelt assembly taken along line 7-7 of FIG. 5;

Similar numbers refer to similar parts throughout the drawings.

DETAILED DESCRIPTION

Figure 1:
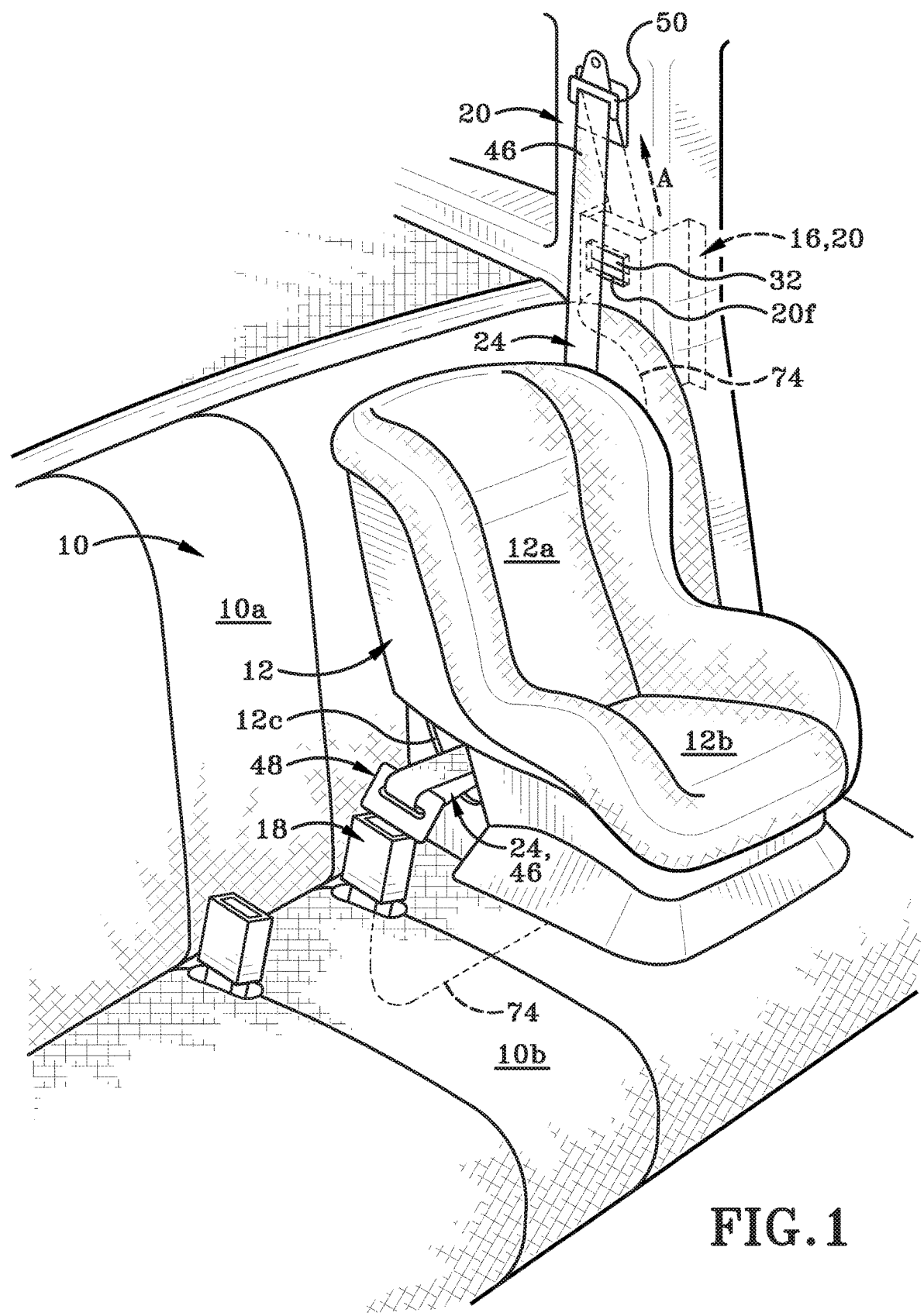
FIG. 1 is a isometric perspective view of a vehicle's rear seat showing a child seat positioned thereon and a seatbelt system in accordance with an aspect of the disclosure being provided to secure the child seat in place.

Referring to FIG. 1, there is shown a rear seat 10 of a vehicle. Seat 10 has a back region 10a and a seat region 10b. A child seat 12 is illustrated as being positioned on seat 10 with a back 12a of child seat 12 positioned against back region 10b and a seat 12b of child seat 12 positioned on seat region 10b. Child seat 12 is illustrated as being positioned in a forward-facing orientation by way of example only. It will be understood that child seat 12 may, instead, be oriented in a rear-facing orientation. A seatbelt channel 12c is defined in child seat 12 and is provided to receive a length of seatbelt webbing therethrough as will be later described herein.

Figure 2:
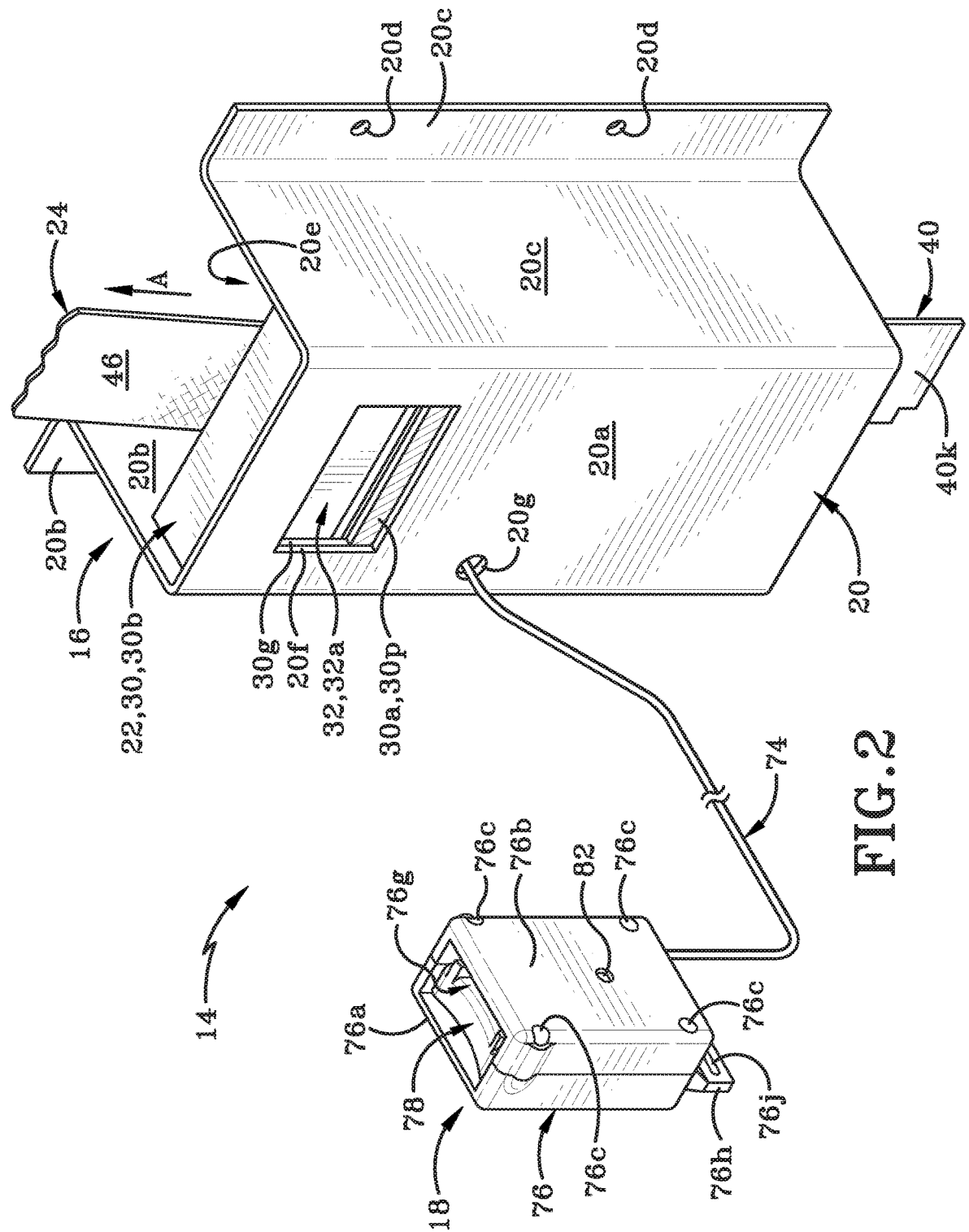
FIG. 2 is a front isometric perspective view of the seatbelt system in accordance with an aspect of the disclosure.
Figure 3:
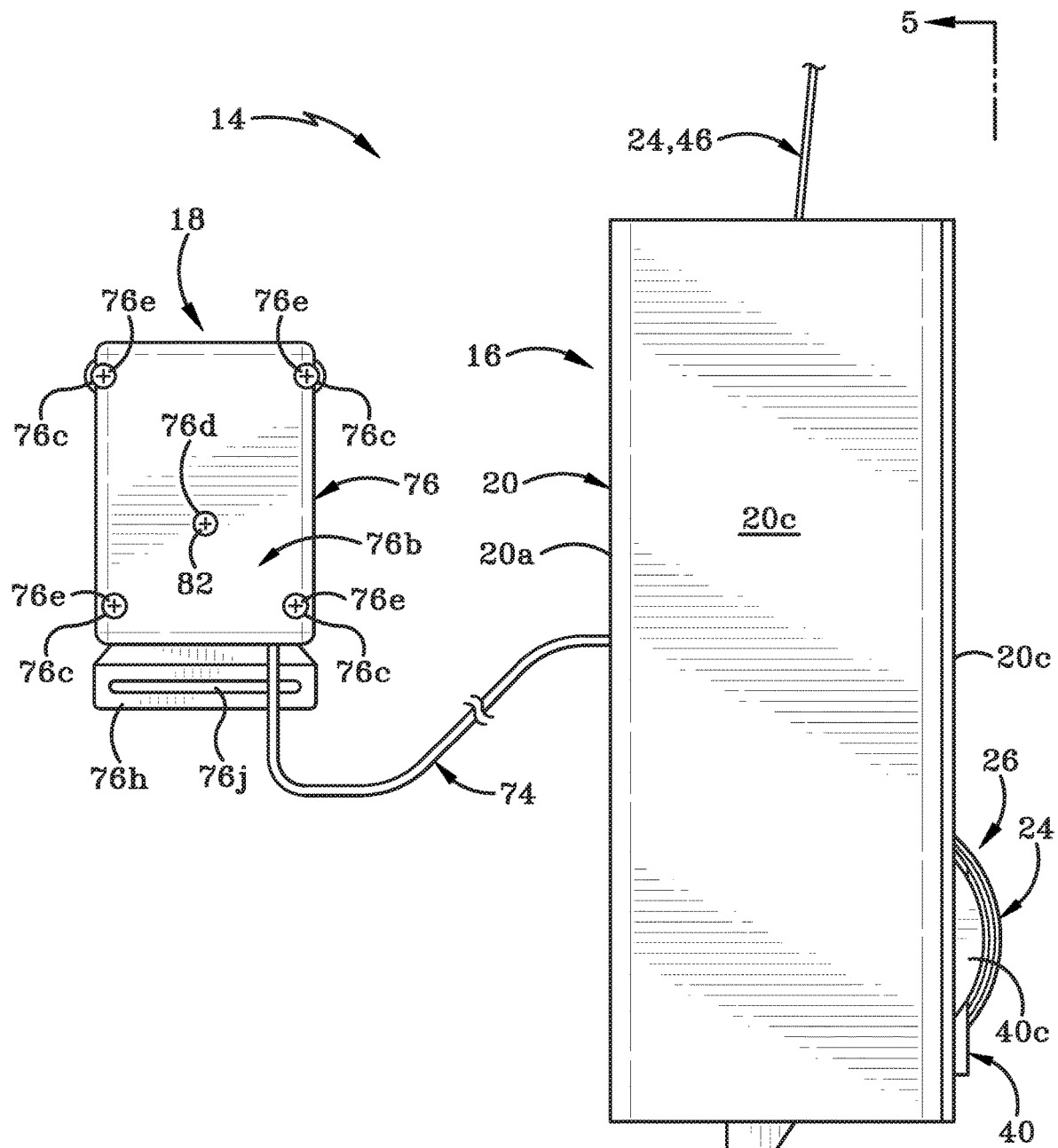
FIG. 3 is a right side elevational view of the seatbelt system of FIG. 2.

A seatbelt system in accordance with the present disclosure is illustrated in FIGS. 1 and 2. Seatbelt system is indicated by the reference number 14 (FIG. 2) and includes a seatbelt assembly 16 and a buckle assembly 18. Each of the seatbelt assembly 16 and buckle assembly 18 will be described in greater detail below. Seatbelt assembly 16 may be mounted on the vehicle in any one of a number of different locations. Seatbelt assembly 16 may be ceiling mounted, shelf mounted, pillar mounted, or mounted on the seat itself. By way of example only a pillar-mounted seatbelt assembly 16 is illustrated in the attached figures. It should be understood however, that the basic components and operation of seatbelt assembly 16 will be substantially common to all mounting situations.

FIG. 1 shows a portion of a pillar "P" within which seatbelt assembly 16 is mounted. Buckle assembly 18 is illustrated as extending outwardly from a junction between back region 10a and seat region 10b of vehicle seat 10.

Referring now to FIGS. 1-11 and 14, housing 20 of seatbelt assembly 16 is shown in greater detail. Housing 20 may be a separate component that is mounted within an interior bore of pillar "P" (as shown in FIG. 1) or housing 20 may itself form part of pillar "P" and extend for an additional length upwardly to join a roof of the vehicle. Alternatively or additionally, a portion of housing 20 may extend downwardly to join a floor of the vehicle. Housing 20 may be substantially U-shaped in cross-section (as shown in FIG. 2) and may include a front wall 20a, a left side wall 20b (FIG. 4) and a right side wall 20c (FIG. 2). Each of the left side wall 20b and right side wall 20c may be an L-shaped component that includes a first section and a second section that are oriented at right angles to each other. The first section may be oriented at right angles to front wall 20a and the second section may be oriented substantially parallel to front wall 20a and at right angles to the first section. A plurality of screw holes 20d is defined in the second sections of each of the left and right side walls 20b, 20c. Fasteners may be provided to extend through these holes 20d in order to secure housing 20 to the vehicle's frame and/or to pillar "P", if housing 20 does not form an integral part thereof.

A channel 20e is bounded and defined by front wall 20a, left side wall 20b and right side wall 20c of housing 20. It is into this channel 20e that various components of seatbelt assembly 16 are received, as will be further described herein. An aperture 20f is defined in front wall 20a and aperture 20f extends from an exterior surface of front wall 20a through to an interior surface thereof. Aperture 20f is in communication with channel 20e. Aperture 20f, as illustrated in the attached figures, may be generally rectangular in shape. Aperture 20f may be located in a region of pillar "P" that will be easily accessible to an adult who is securing or installing child seat 12 into the vehicle. Aperture 20f preferably is not located in a position on pillar "P" that may be easily reached by a child seated on vehicle seat 10 or in child seat 12. Front wall 20a further defines a hole 20g therein. Hole 20g extends from the exterior surface of front wall 20a through to the interior surface thereof and is in communication with channel 20e. The purpose of aperture 20f and hole 20g will be later described herein.

It will be understood that any shape of aperture 20f and hole 20g may be utilized in housing 20. Furthermore, one or both of aperture 20f and hole 20g may be defined in other faces of housing 20 if those locations provide better accessibility to the person who may be installing a child seat 12, or better connection of seatbelt assembly 16 to buckle assembly 18, or are further out of the reach of a child who may be seated in child seat 12.

A pair of spaced apart and nested guide tracks 20h (FIG. 8) are provided on an interior surface of each of the first and second side walls 20b, 20c of housing 20. Each guide track 20h may be L-shaped and one of the tracks may be longer and wider than the other. A guide path 20i is defined between the tracks 20h. Guide tracks 20h and guide path 20i on interior surface of first side wall 20b are laterally aligned with guide tracks 20h and guide path 20i on interior surface of second side wall 20c.

Housing 20 may also be provided with a ledge 20j (FIG. 4) that is connected to right side wall 20c and front wall 20a and is generally horizontally oriented relative to the vertically extending front and side walls 20a, 20b, 20c. Ledge 20j may terminate a distance laterally away from left side wall 20b. Housing 20 further includes a rear wall 20k (FIG. 4) that may be spaced a distance rearwardly away from front wall 20a. Rear wall 20k may be of a smaller size than front wall 20a and may extend between left side wall 20b and right side wall 20c. The purpose of ledge 20j and rear wall 20k will be described later herein.

Figure 4:
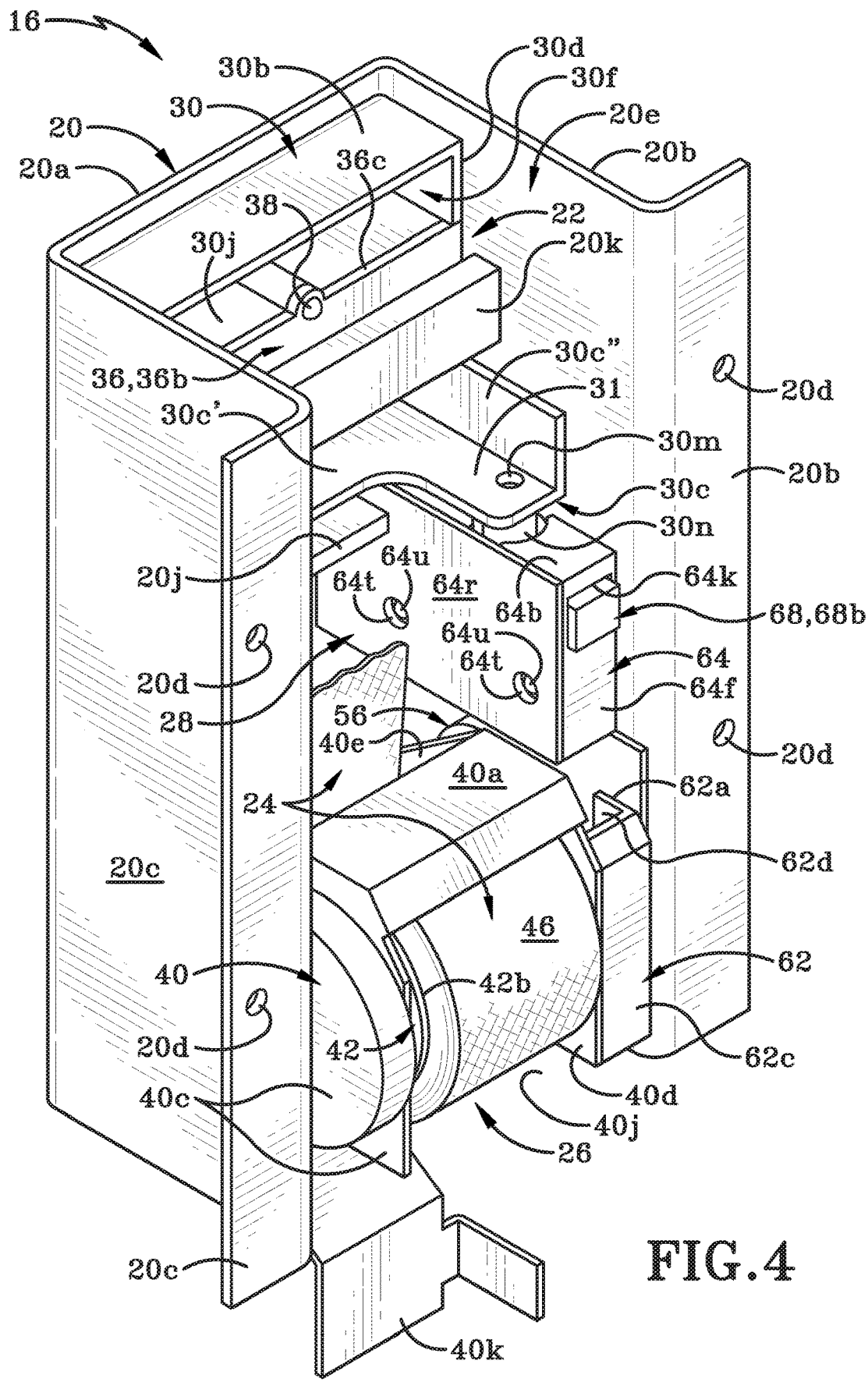
FIG. 4 is a rear perspective view of the seatbelt assembly of the seatbelt system with the seatbelt partially removed for clarity of illustration.

Referring to FIG. 4, seatbelt assembly 16 may further include an actuator assembly 22, a seatbelt 24, a retractor mechanism 26, and a cable locking assembly 28. Actuator assembly 22, retractor mechanism 26, and cable locking assembly 28 are located within channel 20e of housing 20. Rear wall 20k of housing 20 retains actuator assembly 22 in abutting contact with the interior surface of front wall 20a as is shown in FIG. 4.

Figure 9:
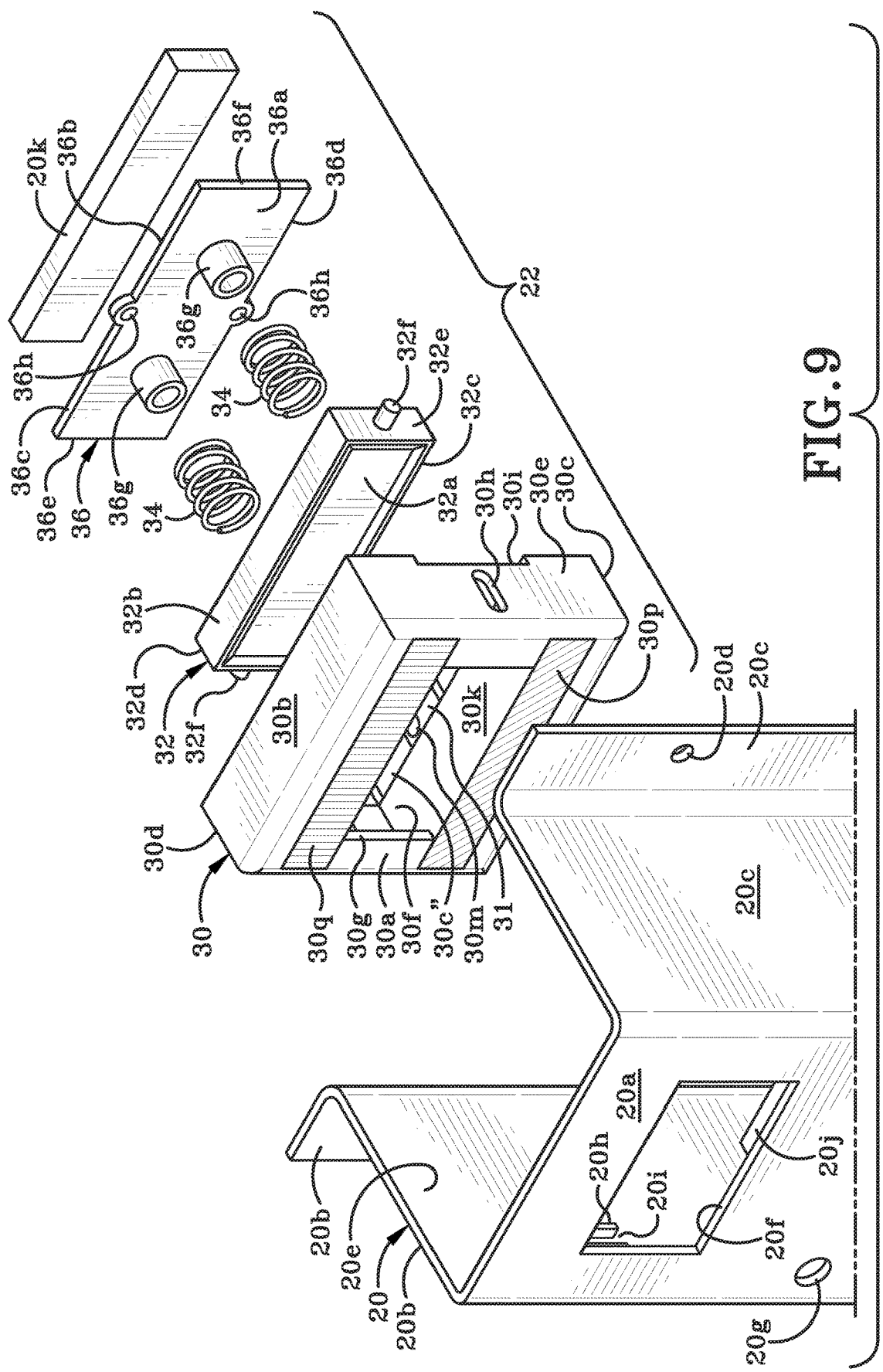
FIG. 9 is an exploded partial front isometric perspective view of the seatbelt assembly.

Referring to FIG. 9, actuator assembly 22 includes an actuator housing 30 having a front wall 30a, a top wall 30b, a bottom wall 30c, a first side wall 30d, and a second side wall 30e. Front wall, top, bottom, first side, and second side wall 30a-30e bound and define a cavity 30f (FIG. 4). An aperture 30g is defined in front wall 30a. Aperture 30g is positioned so as to be at least partially alignable with aperture 20f in front wall 20a of housing 20. A pair of horizontally aligned slots 30h is defined in first and second side walls 30d, 30e. A pair of aligned notches 30i may also be defined in a rear edge of first and second side walls 30d, 30e opposite front wall 30a. Actuator housing 30 may also include a pair of parallel spaced apart shelves 30j (FIG. 4) and 30k (FIG. 9). As shown in FIG. 4, bottom wall 30c may be "L-shaped" and comprise a horizontal first leg 30c' and a vertical second leg 30c". First leg 30c' may extend between left side wall 20b and right side wall 20c of housing 20 when actuator assembly 22 is engaged with housing 20. Second leg 30c" may extend vertically and be in abutting contact with left side wall 20b of housing 20 when actuator assembly 22 is engaged with housing 20. First leg 30c' may also be generally L-shaped having an arm 31 that extends for a distance rearwardly beyond the rearmost edges of top wall 30b and first and second side walls 30d and 30e. Arm 31 defines a projection 30n (FIG. 14) that extends downwardly for a distance beyond a lower surface of bottom wall 30c. A hole 30m (FIGS. 4 and 14) is defined in arm 31 of bottom wall 30c and extends from an upper surface of arm 31 to a bottom end of projection 30n. Hole 30m thus forms a channel through projection 30n, the purpose of which will be discussed later herein.

FIG. 9 shows that actuator housing 30 may also be provided with a first indicator 30p and a second indicator 30q on front wall 30a. First indicator 30p may comprise a first color stripe that is provided in a region below aperture 30g. Second indicator 30q may comprise a second color stripe that is provided in a region above aperture 30g. For example, first indicator 30p may be green in color and second indicator 30q may be red in color. First and second indicators 30p and 30q are provided so that a user may readily determine visually if seatbelt assembly is in a condition ready to dispense seatbelt 24 therefrom or if seatbelt 24 is cinched and locked.

Figure 14:
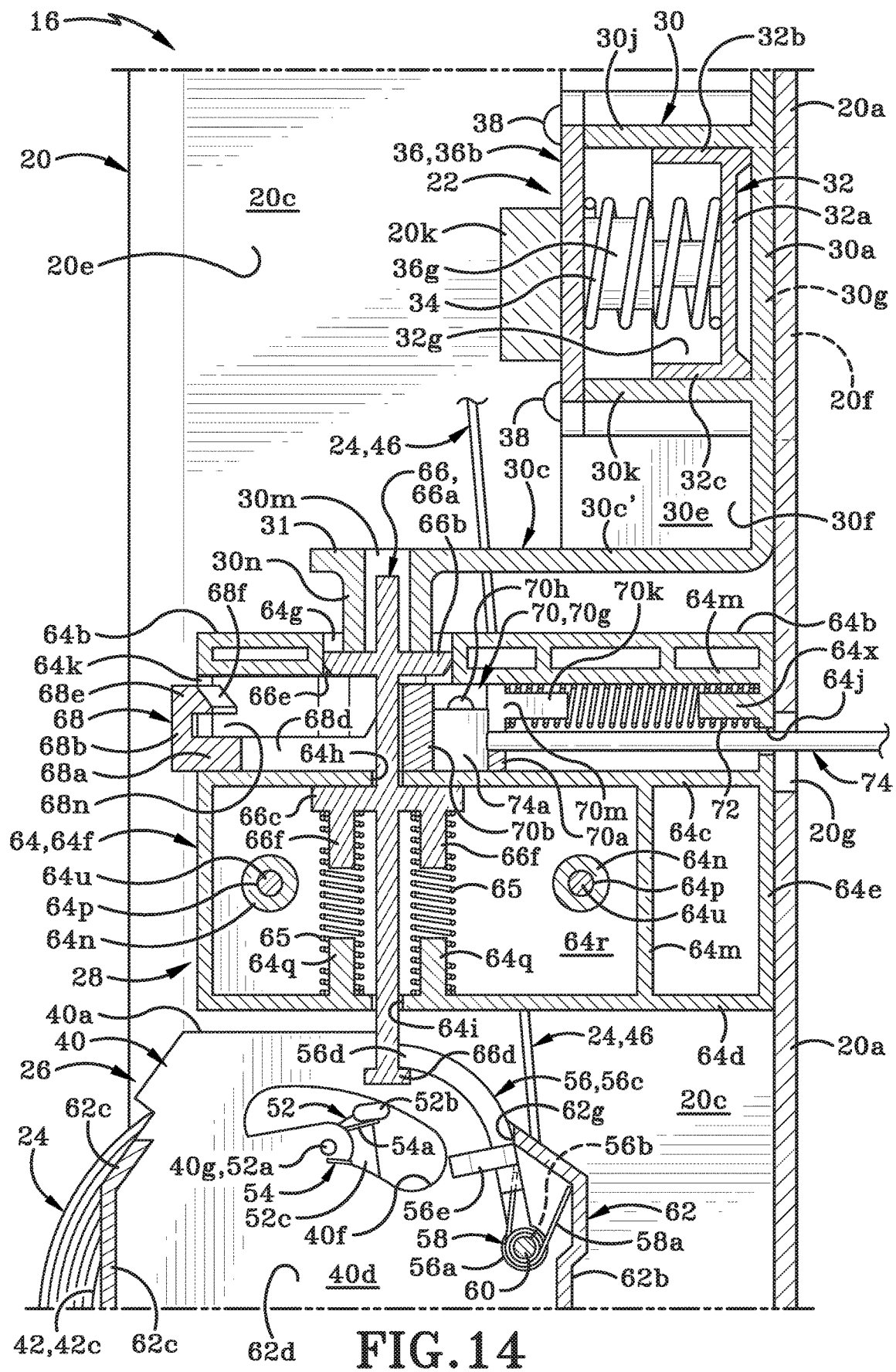
FIG. 14 is a cross-section of the seatbelt assembly taken along line 14-14 of FIG. 6.

A button 32 (FIG. 9) is provided for engagement in actuator housing 30. Button 32 has a front wall 32a, a top wall 32b, a bottom wall 32c, a first side wall 32d, and a second side wall 32e. Posts 32f extend outwardly from each of the first and second side walls 32d, 32e and are generally oriented at right angles relative thereto. Each post 32f is shaped and sized to be received through one of slots 30h in actuator housing 30 and ultimately into guide path 20i defined between the L-shaped guide tracks 20h. Front wall 32a, top wall 32b, bottom wall 32c, first side wall 32d, and second side wall 32e bound and define a chamber 32g (FIG. 14).

When button 32 is depressed and released (as will be described later herein) posts 32f travel along guide path 20i. (Guide path 20i is the L-shaped path defined by the spaced-apart guide tracks 20h on housing 20. A first leg of guide path 20ih is substantially horizontally oriented and a second leg of guide path 20i is substantially vertically oriented.) When posts 32f travel along the horizontally oriented leg of guide path 20i, button 32 moves either away from or towards the interior surface of front wall 30a of actuator housing 30. The travel of button 32 is therefore in a plane substantially parallel to front wall 30a of actuator housing 30 and therefore to front wall 20a of housing 20. The horizontal movement of button 32 is limited by the length of slot 30h in housing sides 30d, 30e. When the posts 32f travel along the vertically oriented leg of guide path 20i, because posts 32f are captured within actuator housing 30, the actuator housing 30 itself is caused to move up and down relative to the interior surface of housing 20. The extent of vertical travel in an upward direction is limited by the larger of the two guide tracks 20h. The extent of vertical travel in a downward direction is limited by shelf 20j. Other means may be provided to limit travel of posts 32f and therefore actuator housing 30. A shelf 20m (FIG. 5) is secured to front wall 20a and side wall 20b and is positioned to support a cover 62 thereon (as will be described later herein.)

Figure 10:
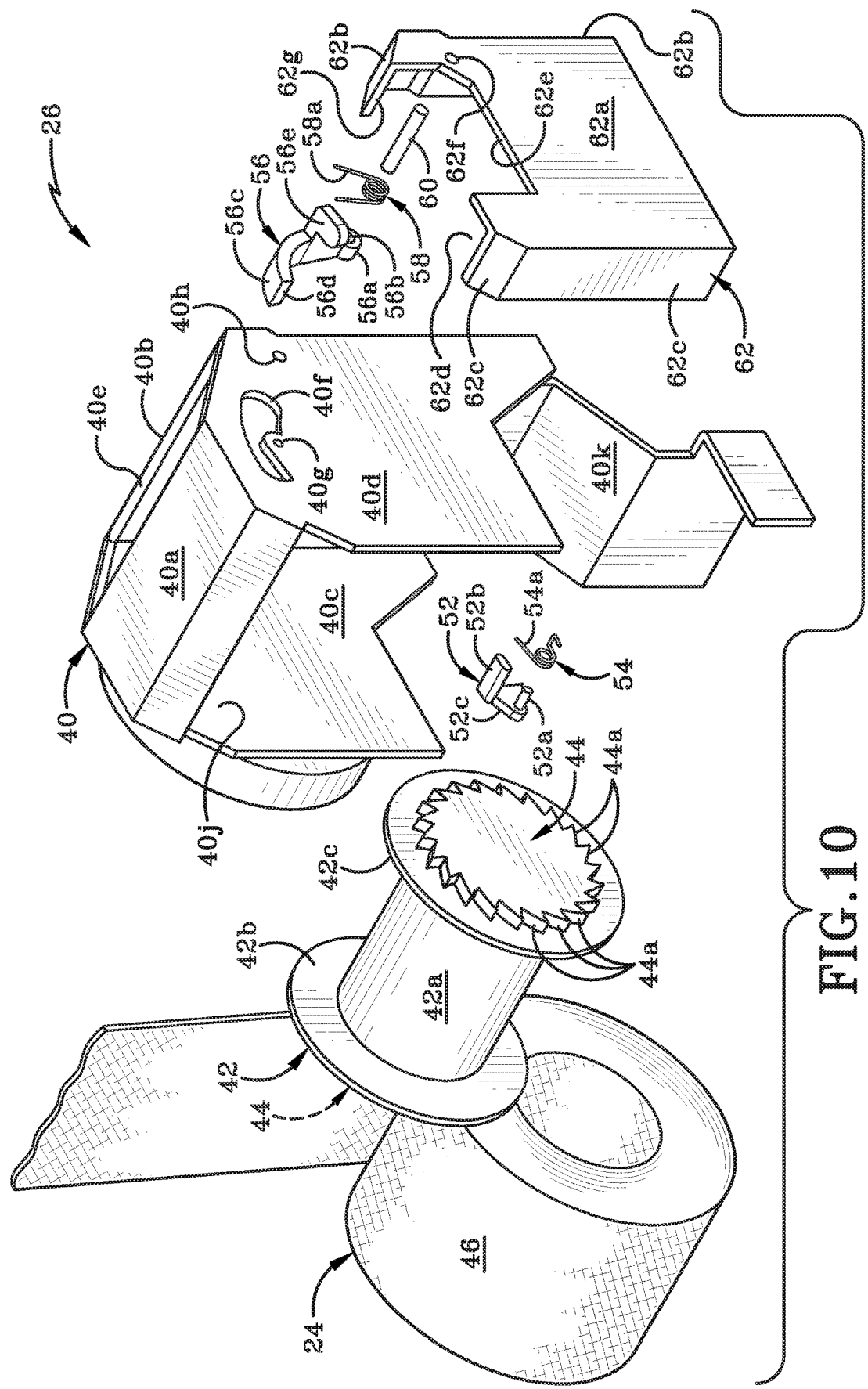
FIG. 10 is an exploded partial rear isometric perspective view of the seatbelt assembly.

Actuator assembly 22 further includes a rear plate 36 (FIG. 9). Rear plate 36 has a front surface 36a, rear surface 36b, top surface 36c, bottom surface 36d, first side surface 36e, and second side surface 30f. Rear plate 36 is sized so as to be received in notches 30i of actuator housing 30. A pair of posts 36g extends outwardly from front surface 36a of rear plate 36. A coil spring 34 is received around each post 36g. Coil springs 34 engage a rear surface of front wall 32a of button 32 and urge button 32 into a closed position. In the closed position the front wall 32a of button 32 is positioned adjacent an interior surface of front wall 30a of actuator housing 30. Rearward travel of button 32 is limited by the presence of rear plate 36, the posts 36g thereon, and coil springs 34. A pair of apertures 36h is defined in rear plate 36. Fasteners 38 (FIG. 4) are inserted through these apertures 36h to secure rear plate 36 to shelves 30j, 30k of actuator housing 30. Seatbelt 24 and retractor mechanism 26 may be of any type known in the art and the seatbelt 24 and retractor mechanism 26 illustrated in the figures are provided by way of example only and should not be considered to limit the disclosure. Referring to FIG. 10, retractor mechanism 26 includes a housing 40 that has a top wall 40a, a rear wall 40b, a first side wall 40c and a second side wall 40d. An aperture 40e is defined in top wall 40a that may be of a relatively large size and may be generally rectangular in shape. A slot 40f, a first hole 40g and a second hole 40h are defined in second side wall 40d. Top wall 40a, rear wall 40b, first and second side walls 40c, 40d, bound an define a cavity 40j that is accessible through an opening defined opposite rear wall 40b. Housing 40 also includes a downwardly extending flange member 40k.

Retractor mechanism 26 further comprises a spool 42 (FIG. 10) that is supported for rotation within cavity 40j of housing 40. (An axle that supports spool 42 for rotation within housing 40 and a torsion spring for controlling that rotation are not shown in the attached figures for clarity of illustration.) Spool 42 comprises a hub 42a, a first end 42b, and a second end 42c. A ratchet wheel 44 having a plurality of teeth 44a on a circumferential surface thereof is provided on an exterior surface of one or both of the first and second ends 42b, 42c, as may be seen in FIGS. 5-7.

Seatbelt 24 comprises a length of webbing 46 and a locking tongue 48 (FIG. 1) that is engaged on webbing 46 and is slidingly movable therealong. Locking tongue 48 is configured to be selectively engageable in buckle assembly 18 as illustrated in FIG. 1. Webbing 46 is secured at one end to spool 42 and is able to be wound onto spool 42 when spool 42 is rotated in a first direction; and is windable off of spool 42 when spool 42 is rotated in a second direction. Webbing 46 is threaded through aperture 40e defined in housing 40 and then through a U-shaped flange 50 (FIG. 1) mounted on pillar "P" of the vehicle. Although not shown in the attached figures, it should be understood that a second end of webbing 46 is fixedly secured to a region of the vehicle's frame or to pillar "P" a distance away from flange 50.

Retractor mechanism 26 further includes a pawl mechanism 52 (FIG. 10) that comprises a pin 52a, a foot 52b, and a pawl 52c. A spring 54 is engaged with pin 52a. Pawl mechanism 52 is positioned within cavity 40j of housing 40 between second end 42c and an interior surface of second side wall 40d of housing 40. Pin 52a is received through hole 40g in second side wall 40d and an arm 54a of spring 54 engages the underside of foot 52b as may be seen in FIG. 15. Arm 54a urges pawl 52c out of engagement with teeth 44a on second end 42c.

As shown in FIG. 10, retractor mechanism 26 further includes a lever arm 56, a spring 58, and a pin 60. Lever arm 56 has a first end 56a that defines a hole 56a therein and through which one end of pin 60 is received. Lever arm 56 further includes a hook 56c that curves outwardly away from first end 56a and terminates in a free end 56d remote from first end 56a. Lever arm 56 further includes a flange 56e that extends outwardly from a side surface of hook 56c approximately one third along the length of hook 56c between first end 56a and free end 56d.

A cover 62 is provided to engage second side wall 40d of housing 40 and protect lever arm 56. Cover 62 includes an end wall 62a, a front wall 62b, and a rear wall 62c. End wall 62a, front wall 62b, and rear wall 62c bound and define a recess 62d that is accessible through an opening 62e in an uppermost end of cover 62. A hole 62f is defined in end wall 62a. When cover 62 is engaged with second side wall 40d of housing 40, hole 62f is aligned with hole 40h. A first end of pin 60 is received through hole 40h and a second end of pin 60 is received through hole 62f. Pin 60 is also inserted through a central aperture defined by a coil of spring 58 and through hole 56b in lever arm 56. When all of these components are engaged with each other, lever arm 56 is able to pivot about pin 60. An arm 58a of spring 58 contacts an interior surface of rear wall 62c of cover 62 and urges free end 56d of lever arm 56 towards foot 52b of pawl mechanism 52. This may be seen in FIG. 14. A surface 62g (FIG. 14) is provided on cover 62 that acts as a limiting member for hook 56.

Pawl 52c is configured to selectively interlock with teeth 44a and thereby selectively prevent rotation of ratchet wheel 44 and consequently of spool 42. As indicated earlier herein, a torsion spring (not shown) forms part of spool 42. The torsion spring is positioned so that when spool 42 is rotated in a counter-clockwise direction, the torsion spring will tend to unwind. When a force causing the counter-clockwise rotation of spool 42 is stopped, the torsion spring will tend to return to its original size, shape, and position and will coil up once again; thereby causing spool 42 to rotate in the clockwise direction. When someone is buckled into seat 10, a length of webbing 46 is pulled out of housing 40 in the direction of arrow "A" shown in FIG. 2 until locking tongue 28 is able to be engaged in buckle assembly 18. If that person bends forward in seat 10, spool 42 will rotate in a counter-clockwise direction and an additional length of webbing 46 will be unwound from spool 42. As spool 42 rotates, it unwinds the torsion spring engaged therewith. When the person sits back in seat 10, i.e., moves in the opposite direction, webbing 46 will initially become slightly slack, and because the force pulling webbing 46 out of housing 40 is stopped, the torsion spring will return to its original shape and position and, as it does so, the torsion spring will rotate spool 42 clockwise. The clockwise rotation of spool 42 will wind webbing 46 back onto spool 42 drawing up the slack in webbing 46 and causing webbing 46 to be drawn back into housing 40 in the direction opposite to arrow "A".

Figure 15:
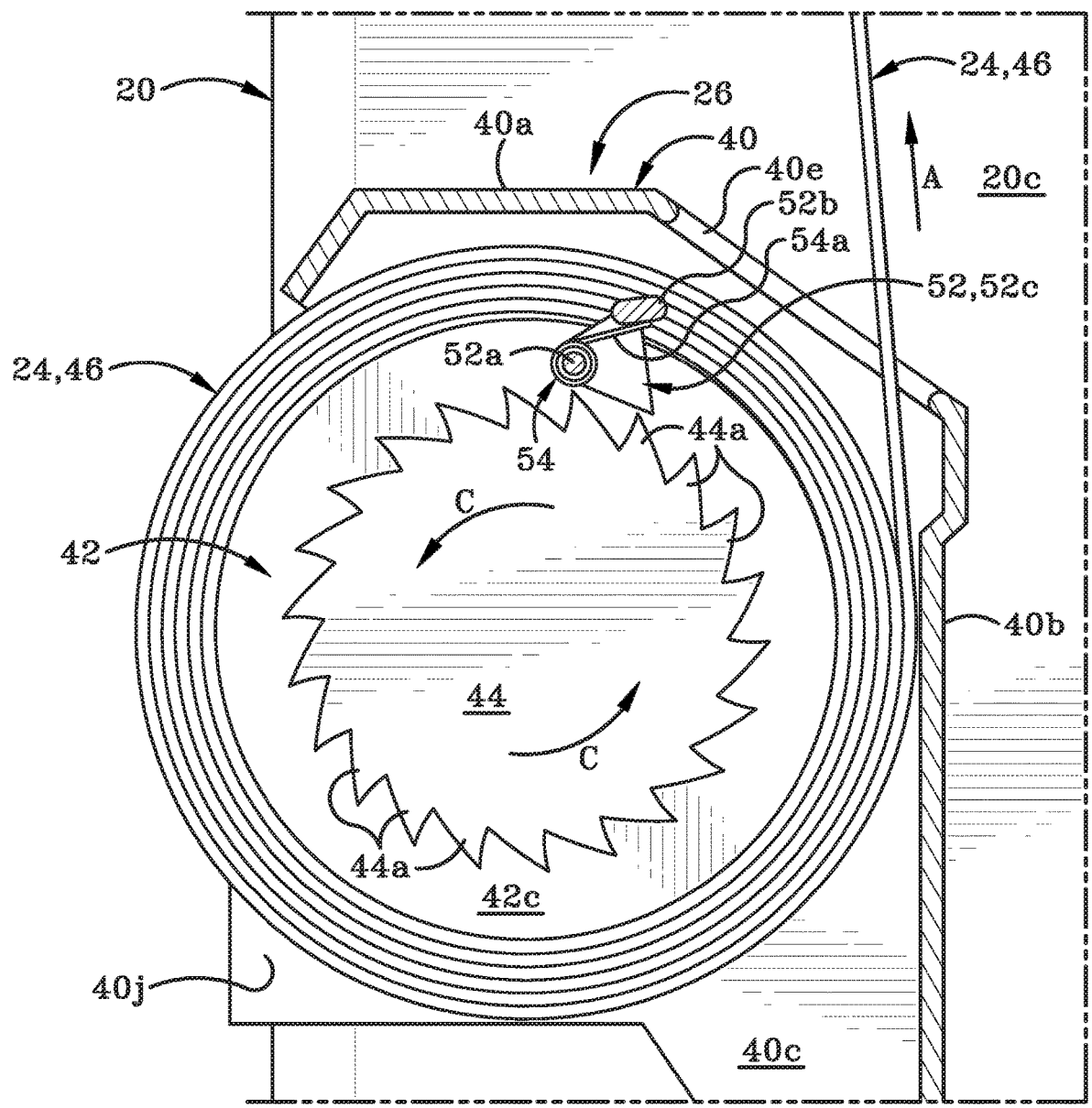
FIG. 15 is a cross-section of the seatbelt assembly taken along line 15-15 of FIG. 6.
Figure 22:
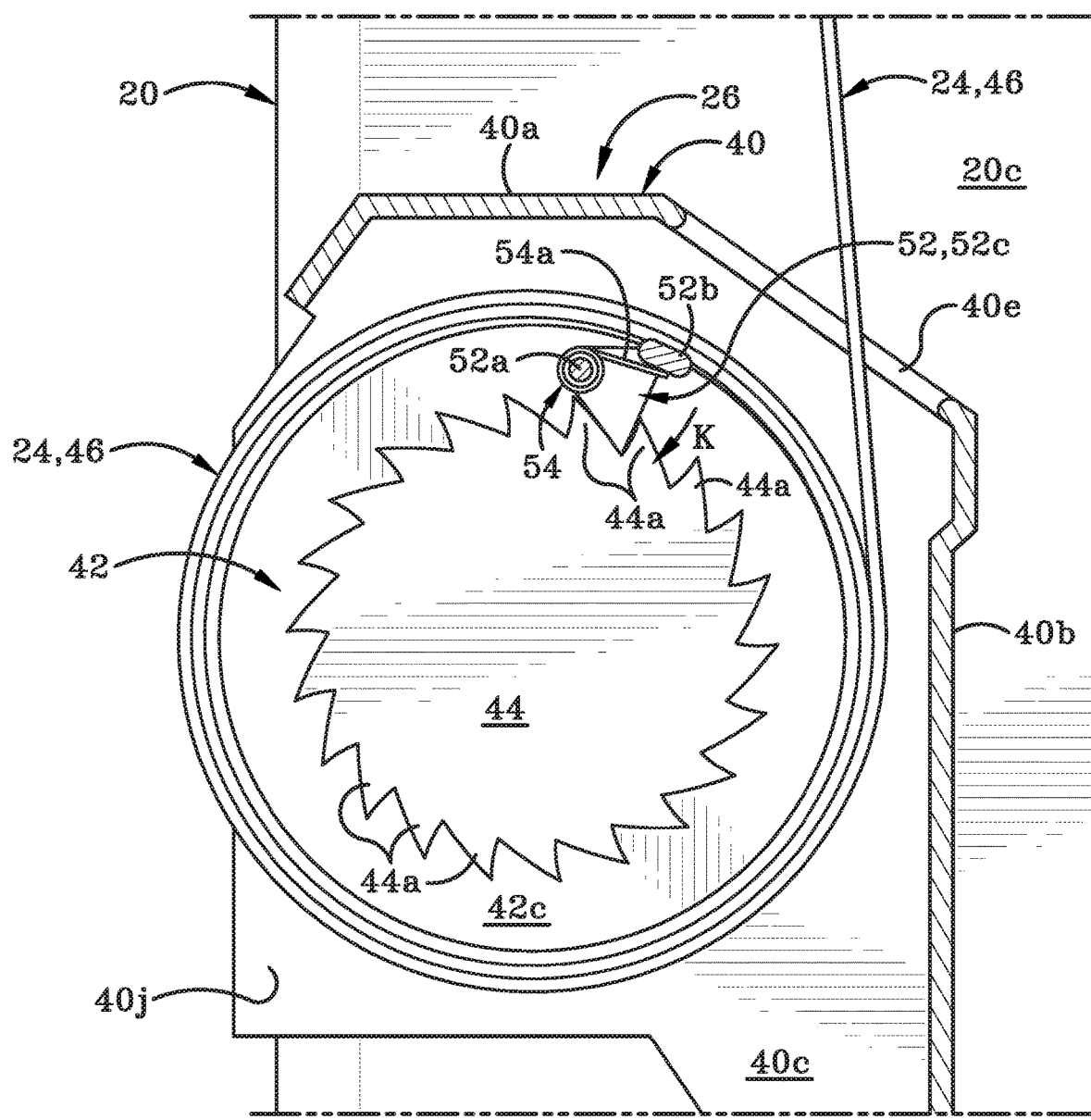
FIG. 22 is a partial longitudinal cross-section through the retractor mechanism housing showing the pawl engaged with the teeth of the ratchet wheel.

Ratchet wheel 44 is operatively engaged with spool 42 so that ratchet wheel 44 and spool 42 rotate in unison and in the same direction. If rotation of spool 42 is to be halted, then ratchet pawl 52c will be rotated from a disengaged position shown in FIG. 15 to an engaged position shown in FIG. 22. In FIG. 15, the pawl 52c is not interlockingly engaged with teeth 44a on ratchet wheel 44. In FIG. 22, pawl 52c is interlocking engaged with teeth 44a on ratchet wheel 44. In order to move pawl 52c from the disengaged position to the engaged position, foot 52b must overcome the spring force of arm 54a of spring 54 and move downwardly towards ratchet wheel 44. Seatbelt assembly 16 is provided with a mechanism to cause foot 52b to overcome the spring force of arm 54a and this mechanism will be further described below.

It should be noted that seatbelt assembly 16 may be of a type that includes an emergency locking retractor (ELR) in addition to pawl mechanism 52. ELRs are well known in the art and any suitable mechanism for producing emergency locking of the seatbelt may be utilized in the present disclosure. ELR ensures that if the vehicle has to come to a sudden stop, during a collision for example, the spool 42 and therefore the webbing 46 will be substantially immediately locked against rotational movement. This ensures that any forward inertial movement of someone buckled into the vehicle by seatbelt assembly 16 will be substantially immediately arrested. The ELR includes any suitable locking mechanism, such as a pendulum type weight, that will engage teeth 44a of ratchet wheel 44 and stop all rotation of the same. When the vehicle comes to a sudden stop, the locking mechanism will cause ratchet wheel 44 to be locked into position and since ratchet wheel 44 is operatively engaged with spool 42, any further rotation of spool 42 is substantially prevented.

Figure 5:
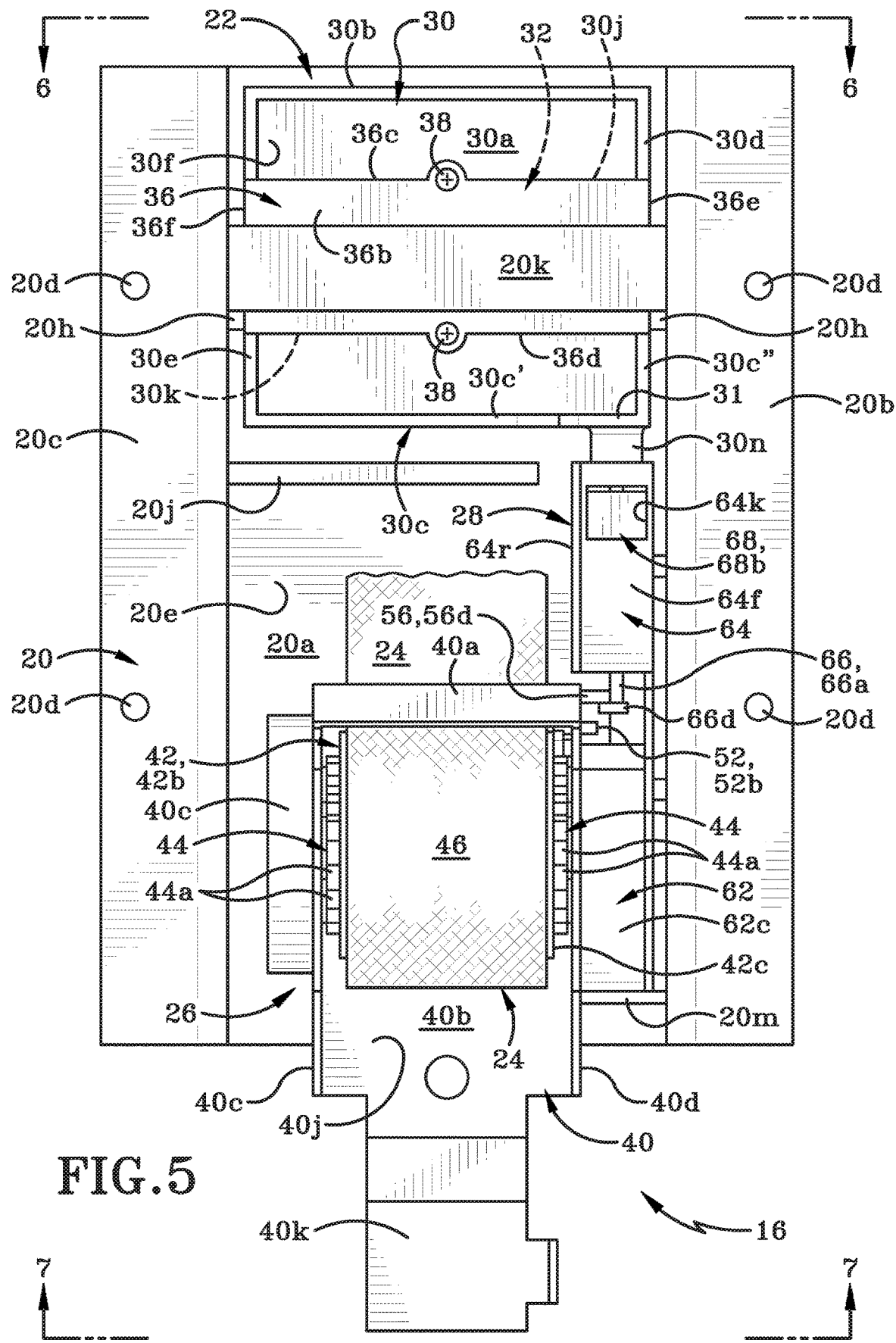
FIG. 5 is a rear elevation view of the seatbelt assembly of the seatbelt system taken along line 5-5 of FIG. 3.
Figure 8:
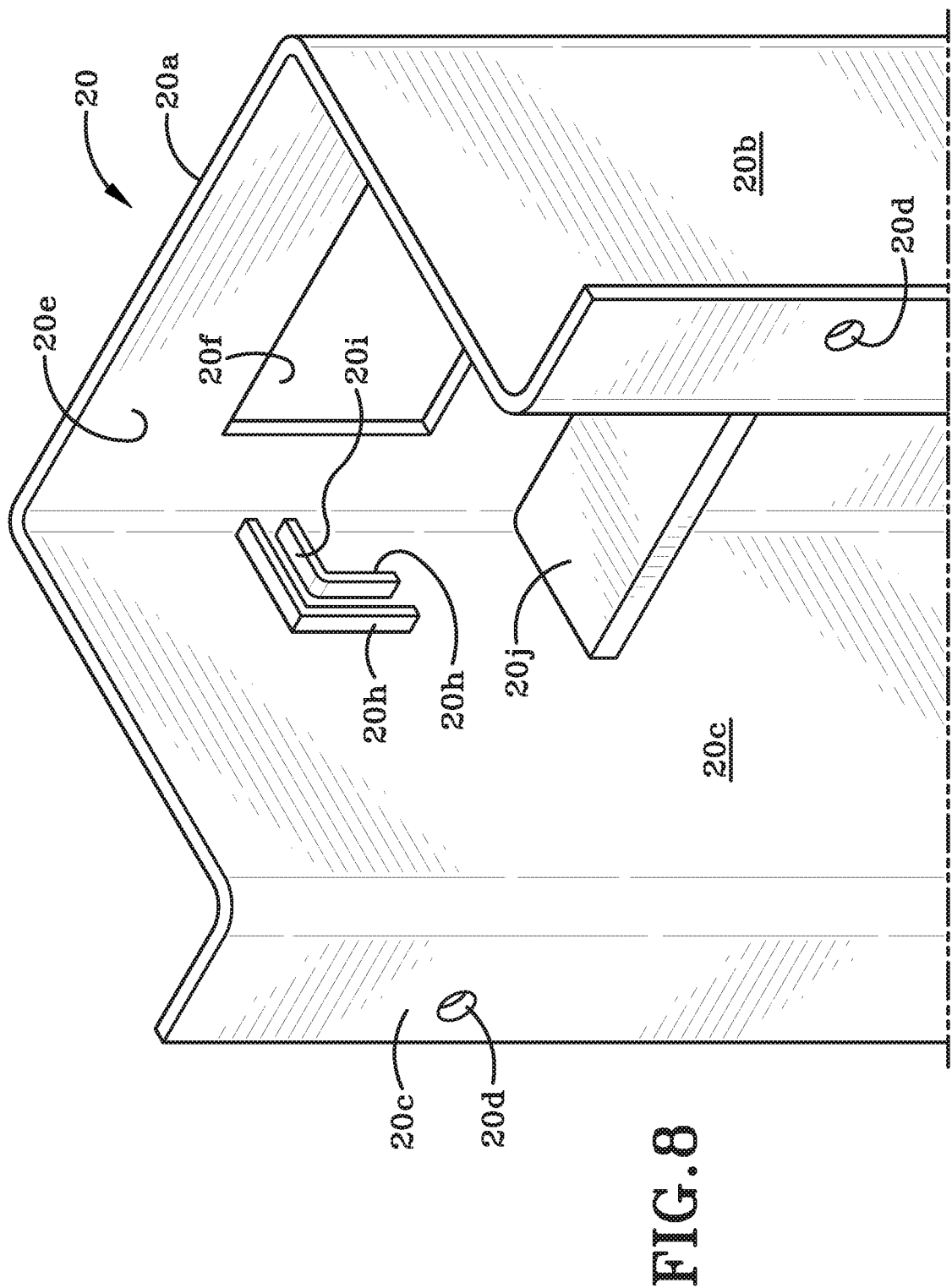
FIG. 8 is a rear isometric perspective view of the housing of seatbelt assembly showing a pair of guide tracks provided thereon.
Figure 11:
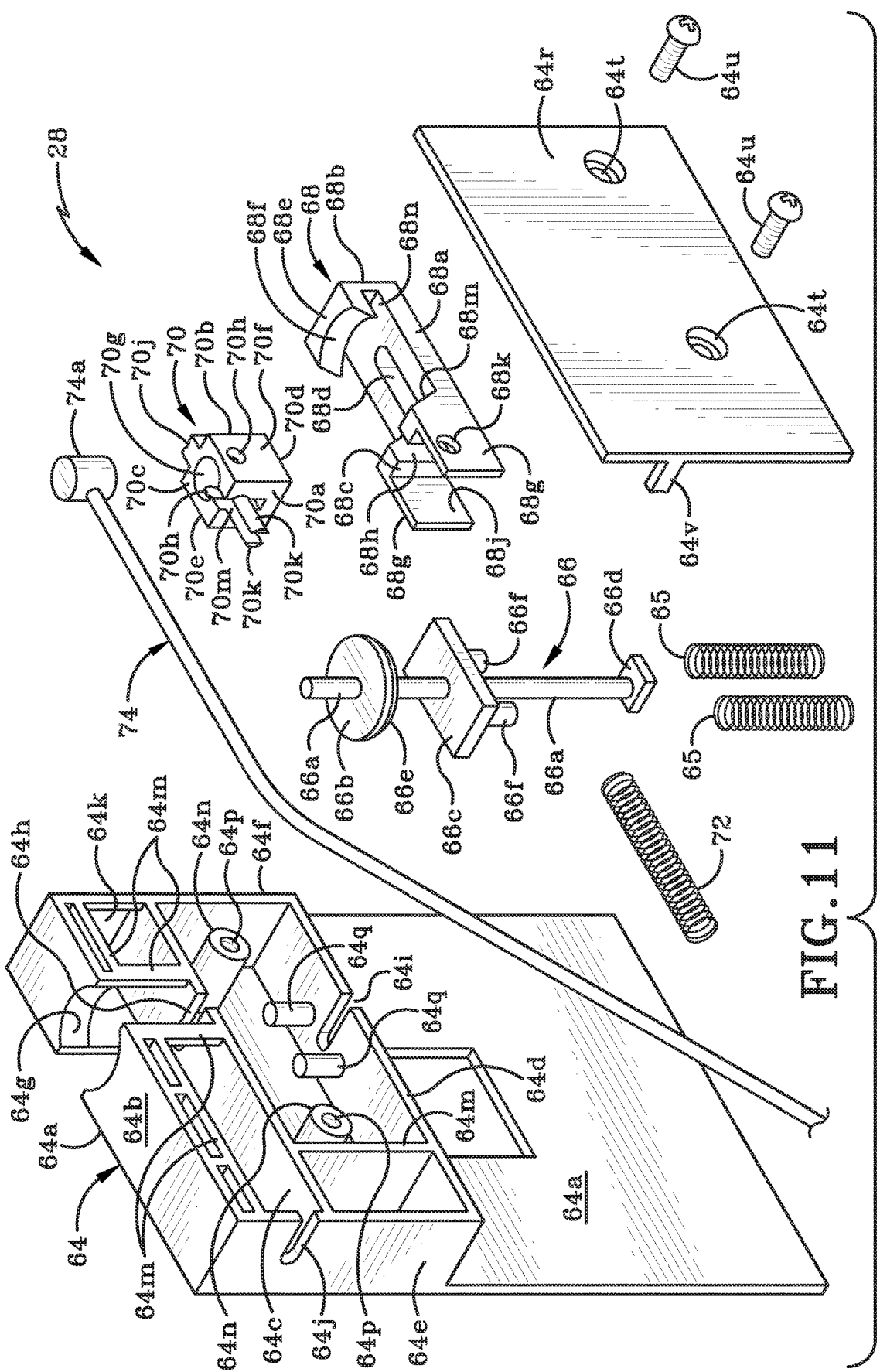
FIG. 11 is an exploded isometric perspective view of the actuator assembly of the seatbelt assembly.

As shown in FIG. 5, cable locking assembly 28 is provided within actuator housing 30. FIG. 11 shows cable locking assembly 28 in greater detail. Cable locking assembly 28 includes a housing 64 having a first side wall 64a from which extend three horizontal walls, namely an upper wall 64b, a middle wall 64c, and a lower wall 64d; and two vertical walls, namely front wall 64e and rear wall 64f. Upper wall 64b defines an aperture 64g therein that is shaped and sized to receive projection 30n from actuator housing 30 therein. Middle wall 64c defines a slot 64h therein that is vertically aligned with aperture 64g. Lower wall 64d defines a slot 64i there in that is vertically aligned with slot 64h and with aperture 64g. Front wall 64e defines a horizontal slot 64j therein. Slot 64j is located between upper wall 64b and middle wall 64c. Rear wall 64f defines an opening 64k (FIG. 4) therein that extends between a lower surface of upper wall 64b and an upper surface of middle wall 64c. A plurality of supports 64m are provided in various locations between upper, middle and lower walls 64b, 64c, 64d. A pair of horizontally oriented posts 64n extends outwardly from an interior surface of first side wall 64a. Each post 64n defines an internally threaded bore 64p therein. A pair of vertical posts 64q extends upwardly from an upper surface of lower wall 62c and on opposite sides of slot 64i. A coil spring 65 is engageable around each post 64q.

Housing 64 further includes a second side wall 64r that is selectively engaged with upper, middle, and lower walls 64b, 64c, and 64d. Second side wall 64r has an exterior surface and an interior surface. Countersunk holes 64t are defined in second side wall 64r and each hole 64t extends between the interior and exterior surfaces of wall 64r. A fastener 64u is received through each hole 64t and is subsequently received into threaded bore 64p of one of posts 64n. One or more posts 64v extend outwardly from the interior surface of second side wall 64r and slide into a portion of slot 64j of front wall 64f of housing 64. As best seen in FIG. 14, a horizontally extending post 64x projects inwardly from an interior surface of front wall 64e in a location between top wall 64b and middle wall 64c and above slot 64j.

Cable locking assembly 28 further includes a plunger 66, a slider 68, a cable fastener 70, and a coil spring 72. Slider 68 and cable fastener 70 are configured to be received in the space defined between upper wall 64b and middle wall 64c of housing 64. Cable fastener 70 engages a first end 74a of a cable 74. Cable 74 extends from buckle assembly 18, through hole 20g in front wall 20a of housing 20, through slot 64j of housing 64 and the first end 74a of cable 74 is then engaged with cable fastener 70.

Plunger 66 includes a shaft 66a, first plate 66b; a second plate 66c and a third plate 66d. First plate 66b may be generally circular in shape when viewed from above and includes a beveled annular lower surface 66e. Second plate 66c is spaced a distance vertically below first plate 66b. Second plate 66b may be generally rectangular when viewed from above. A pair of posts 66f extends downwardly from a lower surface of second plate 66b and towards third plate 66d. Third plate 66d may be generally square or rectangular when viewed from above. Plunger 66 is engaged with cable locking assembly 28 such that a first region of shaft 66a extends upwardly through aperture 64g, a second region of shaft 66a extends through slot 64h in middle wall 64c, and a third region extends through slot 64i in lower wall 64d. When plunger 66 is engaged in housing 64, first plate 66b is located between upper and middle walls 62b and 62c; second plate 66c is located between middle wall 64c and lower wall 64d of housing 64; and third plate 66d is located a distance beneath lower wall 64d. Third plate 66d is positioned proximate foot 52b of retractor mechanism 26 as can be seen in FIG. 14. Posts 66f extending downwardly from second plate 66c are vertically aligned with posts 64q extending upwardly from lower wall 64d of housing 64. Coil springs 65 extend around posts 66f and around posts 64q. When plunger 66 moves downwardly inside housing 64 (in the direction indicated by arrow "I" in FIG. 19) coil springs 65 become compressed between second plate 66c and lower wall 64d. When coil springs 65 return to their original size and position, they cause plunger 66 to move in the opposite direction to arrow "I" and urge second wall 66c of plunger 66 away from lower wall 64d.

As shown in FIG. 11, slider 68 includes a base 68a with a vertical wall 68b at a first end and a vertical wall 68c at a second end. A longitudinal slot 68d is defined in base 68a. A hook member 68e extends outwardly from an upper end of wall 68b. Hook member 68e is located a spaced distance above base 68a and extends for a distance above base 68a. Hook member 68e includes a chamfered and convexly shaped wall 68f. A pair of arms 68g extends longitudinally outwardly from second wall 68c. Arms 68g may be generally parallel to each other. A vertical slot 68h is defined in second wall 68c and this slot 68h is aligned with and in communication with slot 68d. Arms 68g are spaced laterally from each other and a gap 68jj is defined between the interior surfaces of arms 68g. Gap 68j is in communication with slots 68d and 68h. The width of gap 68j is complementary to the width of cable fastener 70 and cable fastener 70 is configured to be received within gap 68j. An aperture 68k is defined in at least one arm 68g. Aperture 68k may be oriented at right angles to a longitudinal axis of slider 68, wherein the longitudinal axis runs along slot 68d. Slider 68 also includes an angled surface 68m that extends upwardly from an upper surface of base 68a and in a direction opposite to the chamfered surface 68f. Angled surface 68m is, however, planar instead of curved. A space is defined between surface 68m and chamfered surface 68f.

Referring still to FIG. 11, cable fastener 70 may be a generally cubically-shaped component that has a front surface 70a, a rear surface 70b, a top surface 70c, a bottom surface 70d, and side surfaces 70e and 70f. A circular bore 70g is defined in cable fastener 70 and bore 70g extends from top surface 70c through to bottom surface 70d. A pair of aligned apertures 70h is defined in the opposed side walls 70e, 70f and apertures 70h are in communication with bore 70g. A projection 70j extends outwardly and rearwardly from rear surface 70b and projection 70j runs from adjacent top surface 70c through to bottom surface 70d and may be generally rectangular in shape. A pair of arms 70k extends outwardly and forwardly from front surface 70a. Arms 70k are generally parallel and aligned with each other. Arms 70k are also longitudinally aligned with second region 70j' of projection 70j. A slot 70m is defined in front surface 70a and slot 70 m originates in top surface 70c and extends for a distance downwardly towards bottom surface 70d and also extends forwardly between arms 70k. The width of cable fastener 70 is measured as the distance between side surfaces 70e and 70f. This width is complementary to the width of gap 68j in slider 68. When cable fastener 70 is received within gap 68j of slider 68, projection 70j is received within vertical slot 68h of slider 68 and in such a way that second region 70j' extends towards surface 68f. Holes 70h in cable fastener 70 are aligned with hole 68k in slider 68. A fastener (not shown) is inserted through the aligned holes 68k and 70h to secure slider 68 and cable fastener 70 together. Coil spring 72 (FIG. 11) is positioned so that a first end thereof engaged with post 64x on front wall 64e of housing 64 and a second end thereof is engaged with arms 70k of cable fastener 70.

Figure 12:
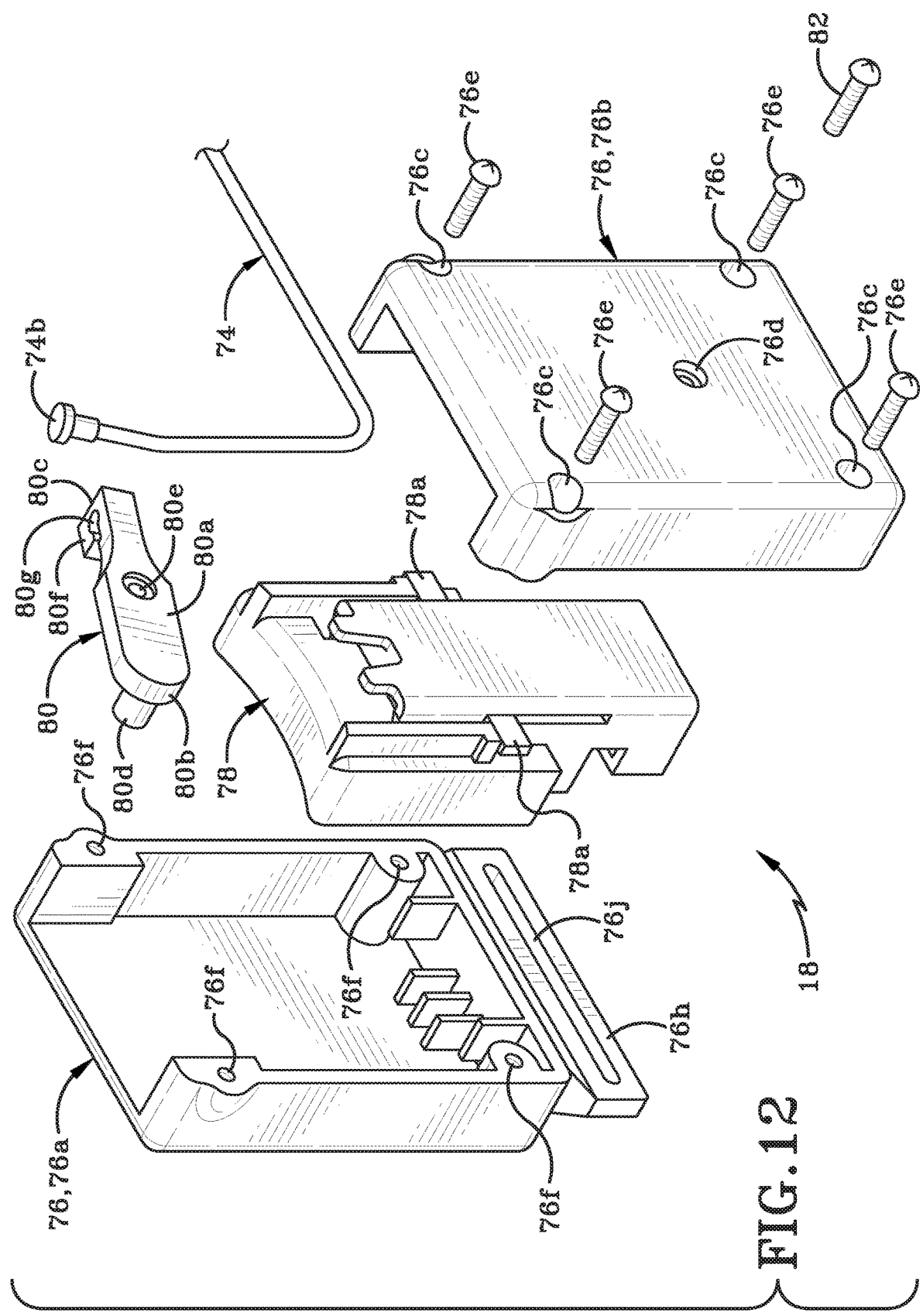
FIG. 12 is an exploded isometric perspective view of the buckle assembly.
Figure 13:
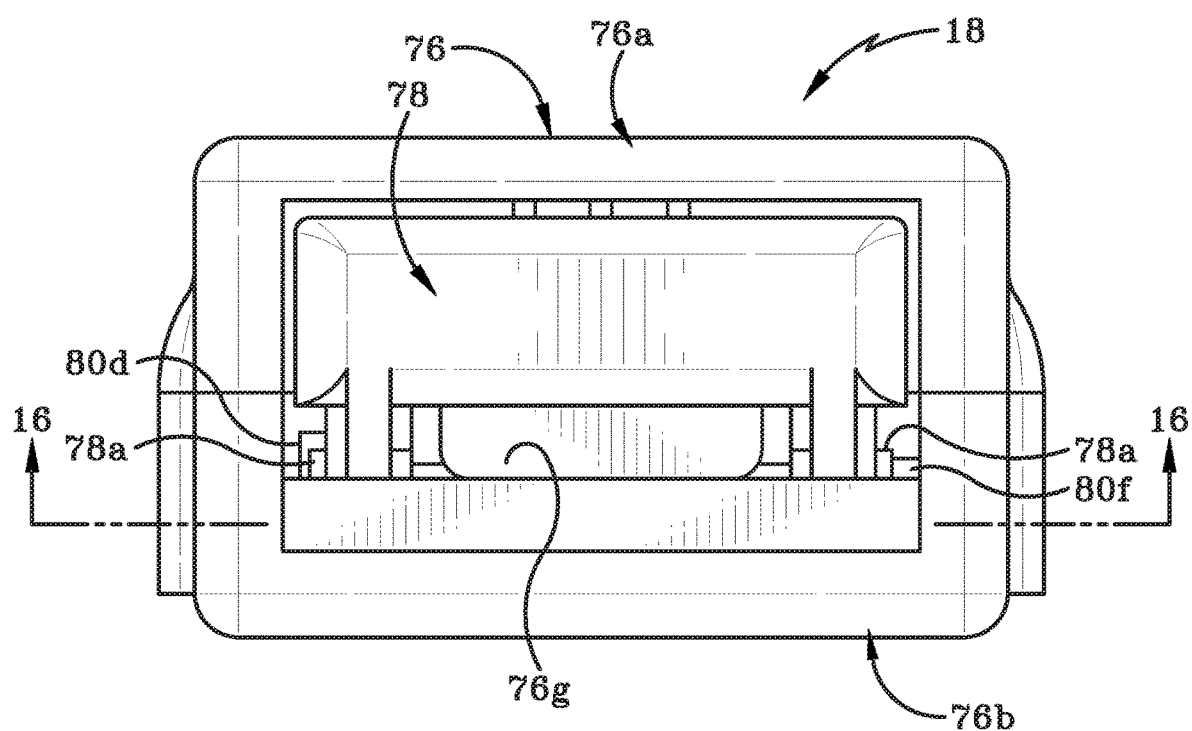
FIG. 13 is a top plan view of the buckle assembly.

Turning now to FIG. 12, buckle assembly 18 is shown in greater detail. Buckle assembly 18 comprises a housing 76 and a buckling mechanism 78 engaged with housing 76. Housing 76 is comprised of a first side 76a and a second side 76b. Second side 76b defines a plurality of holes 76c and 76d therein. Fasteners 76e are insertable through holes 76c and into engagement with threaded bores 76e defined in first side 76a. Fasteners 76e secure first and second sides 76a, 76b to each other, capturing buckling mechanism 78 between them. As best seen in FIG. 13, when first and second sides 76a, 76b capture buckling mechanism 78, an opening 76g is defined between buckling mechanism 78 and second side 76b.

A tether connector 76h is provided on housing 76. Tether connector 76h may be integral with one or the other of the first and second sides 76a, 76b of housing 76. Tether connector 76h defines a slot 76j therein and through which a tether (not shown) may be threaded to secure housing 76 to the frame of the vehicle.

As shown in FIG. 12, buckling mechanism 78 may include one or more tabs 78a that extend horizontally outwardly therefrom approximately midway along the length of the body of buckling assembly 78. Housing 76 and buckling mechanism 78 are known in the prior art and will therefore not be further described herein. The opening 76g defined between buckling mechanism 78 and second side 76b is configured to receive locking tongue 48 of seatbelt 24 therein and buckling mechanism 78 engages locking tongue 48 and secures the same within buckle assembly 18.

Figure 16:
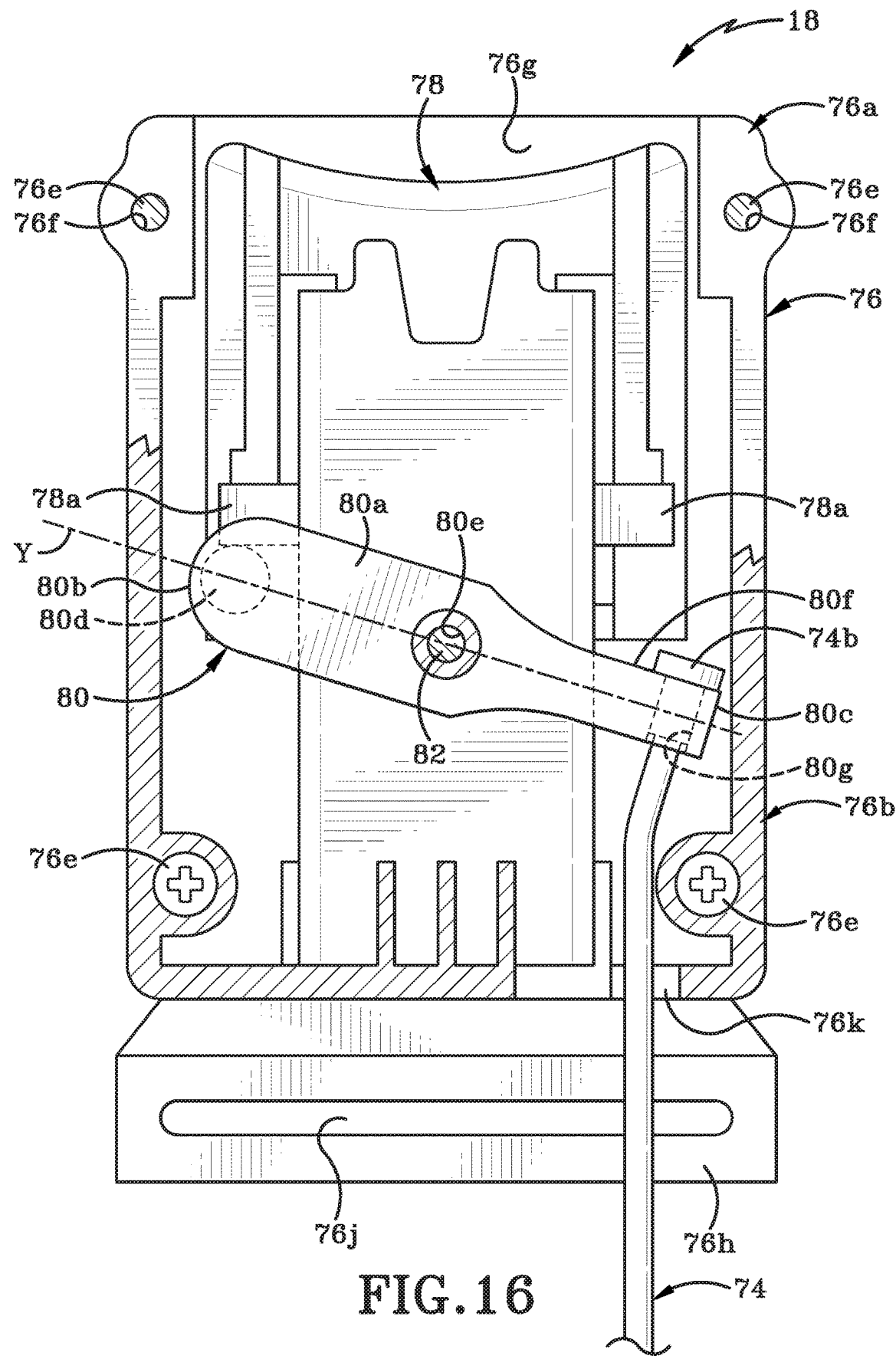
FIG. 16 is a longitudinal cross-section of the buckle assembly taken along line 16-16 of FIG. 13 shown prior to engagement of the seatbelt tongue with the buckle assembly.

In accordance with an aspect of the present disclosure, buckle assembly 18 may further include a lever arm 80 (FIG. 12) that engages a second end 74b of cable 74. Lever arm 80 includes a base 80a having a first end 80b and a second end 80c. First end 80b may be convexly curved and second end 80c may be substantially planar. A longitudinal axis of base 80a extends between first end 80b and second end 80c and is identified in FIG. 16 by the reference character "Y". A peg 80d extends outwardly from proximate first end 80b of base 80a. Peg 80d may be oriented at right angles to longitudinal axis "Y" of base 80a. A countersunk hole 80e may be provided in base 80a approximately midway along the base's length, i.e., approximately midway between first end 80b and second end 80c. A landing region 80f may be provided on an upper surface of base 80a proximate second end 80c. Landing region 80f defines a hole 80g therein. Hole 80g extends from an upper surface of landing region 80f to a lower surface of base 80a. Second end 74b of cable 74 is received in this hole 80g thereby securing cable 74 to lever arm 80. Second end 74b prevents cable 74 from being pulled through hole 80g and out of engagement with lever arm 80. Cable 74 extends out of an aperture 76k defined in a bottom wall of one or both sides 76a, 76b of housing 76. Lever arm 80 is secured to second side 76b of housing by inserting a fastener 82 through hole 76d defined in second side 76b. Fastener 82 acts as a pivot pin for lever arm 80 as will be described further herein.

Seatbelt system 14 is used in the following manner. The user will position child seat 12 on vehicle seat 10 as illustrated in FIG. 1. As indicated earlier herein, locking tongue 48 is provided on seatbelt webbing 46 and this locking tongue 48 is pulled in the direction of arrow "A" out of seatbelt assembly 16 (FIGS. 1, 2 and 15). This motion in the direction "A" causes webbing 46 to be unwound from spool 42, thereby rotating spool 42 as indicated by arrows "C" in FIG. 15. The webbing 46 is redirected by flange 50 on the vehicle pillar "P" and is moved downwardly and through seatbelt channel 12c on child seat 12 (FIG. 1) and then locking tongue 48 is engaged with buckle assembly 18. It should be noted that with the system 14 disclosed herein, there is no requirement to pull substantially the entire webbing 46 out of seatbelt housing 40 in order to activate the locking retractor mechanism as was necessary in the past. The user is able to pull out only as much webbing as they need to engage locking tongue 48 in buckle assembly 18. Furthermore, because the system will not lock up at this stage, the user can move more freely while they try to engage locking tongue 48 in buckle assembly 18 than was the case in the past. In previously known systems, the seatbelt would readily lock up during the installation process and so the user's movements would need to be relatively slow and deliberate. Frequently, in past systems, the seatbelt would have to be fed all the way back into the seatbelt housing in order to deal with a locked-up seatbelt (i.e. one that would not allow any additional webbing to be fed out of the seatbelt housing.)

Figure 17:
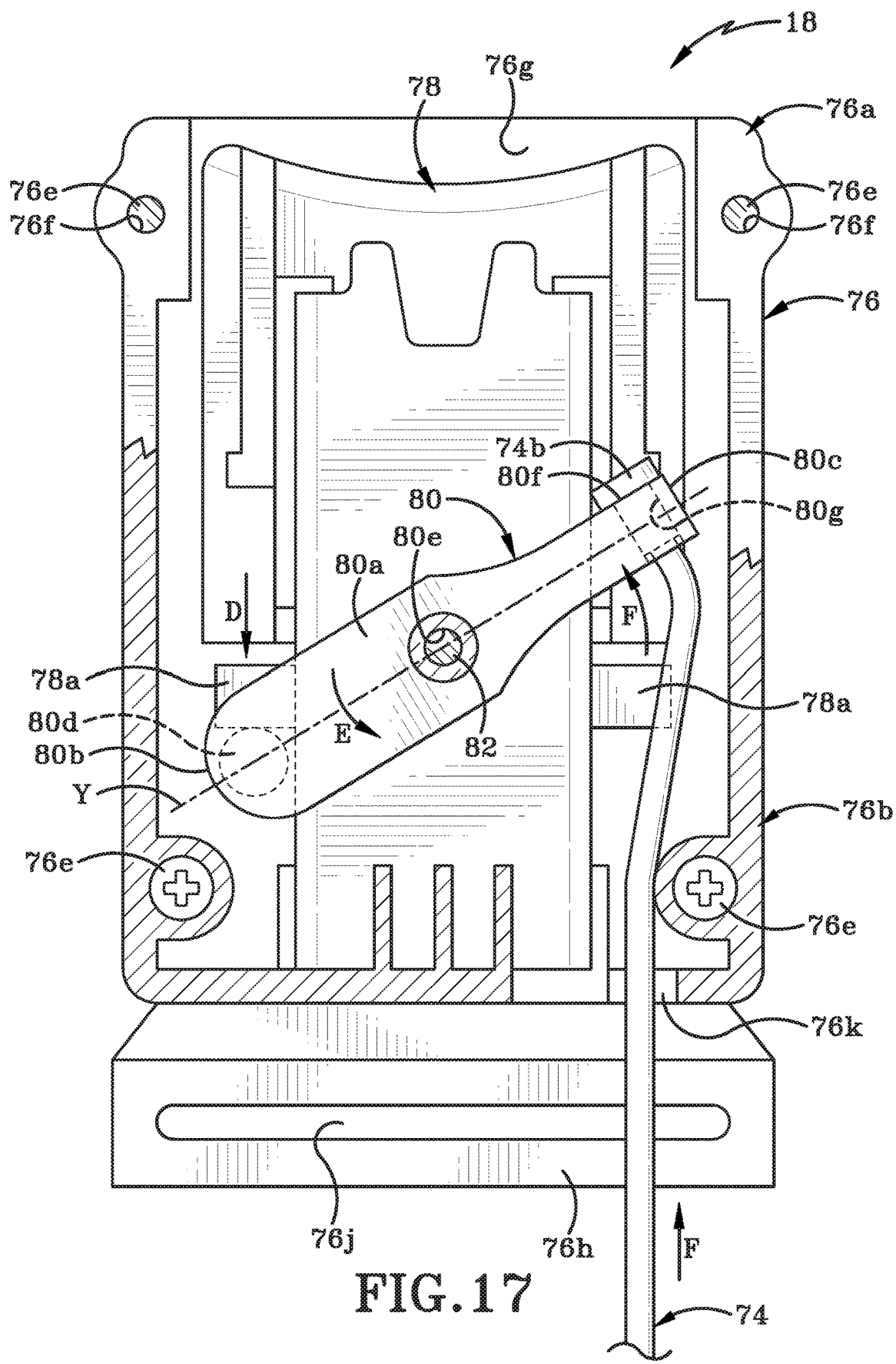
FIG. 17 is a longitudinal cross-section of the buckle assembly taken along line 16-16 of FIG. 13 shown after engagement of the seatbelt tongue with the buckle assembly but with the tongue not shown for clarity of illustration.

With seatbelt system 14, when locking tongue 48 is inserted into opening 76g (FIG. 13) of buckle assembly 18 the tongue 48 engages buckling mechanism 78 and drives a portion of that mechanism (which includes tabs 78a) downwardly within housing 76 in the direction of arrow "D" (FIG. 17). One of tabs 78a is in contact with peg 80d on lever arm 80. Movement of tabs 78a in the direction of arrow "D" causes a similar movement in peg 80d from the position shown in FIG. 16 to the position shown in FIG. 17. Since lever arm 80 is mounted for pivotal motion about fastener 82, as peg 80d is moved in the direction "D" lever arm 80 is caused to pivot about fastener 82 in the direction indicated by arrow "E" (FIG. 17). The pivoting of lever arm 80 pulls second end 74b upwardly in the direction of arrow "F" (FIG. 17) and this motion, in turn, causes cable 74 to be pulled in the direction of arrow "F". The motion in the direction "F" is transmitted along the length of cable 74. Cable 74 may be a bike brake style cable which is housed in a sheath (not shown). The sheath may be affixed at the ends (and typically along the way as well) so that pulling second end 74b of cable 74 does not simply shorten the cable path in the middle.

FIG. 14 shows the position of the locking mechanism (plunger 66, slider 68, and cable fastener 70) in a locked condition prior to engagement of the locking tongue 48 with buckle assembly 18. In this locked condition, spring 72 is in an uncompressed state and, consequently, spring 72 urges cable fastener 70 and therefore slider 68 away from front wall 64e of housing 64 of the cable locking assembly 28.

Slider 68 is thereby urged away from front wall 20*a* of housing 20 of seatbelt assembly 16. It will be noted that shaft 66*a* of plunger 66 is received through longitudinal slot 68*d* (FIG. 11) of slider 68 but hook member 68*e* of slider 68 is not engaged so as to lock plunger 66 to slider 68. This means that plunger 66 is free to move relative to slider 68.

FIG. 14 also shows that third plate 66*d* on plunger 66 is positioned so that the second end 56*d* of lever arm 56 of retractor mechanism 26 rests on an upper surface of third plate 66*d*. In this position, lever arm 56 does not contact pawl mechanism 52. Because lever arm 56 is separated from foot 52*b* of pawl mechanism 52, pawl 52*c* is disengaged from teeth 44*a* of ratchet wheel 44. Consequently, rotational motion of ratchet wheel 44 and therefore of spool 42 cannot be checked. (It should be understood that the ELR system provided on ratchet wheel 44 is not illustrated in the attached figures. It should further be understood that the ELR system is provided and will immediately stop rotation of the ratchet wheel 44 and therefore the spool 42 in the event that the vehicle comes to a sudden stop or is involved in a collision.) Furthermore, because pawl 52*c* is disengaged from ratchet wheel 44, webbing 46 may be freely withdrawn from spool 42 and thereby rotate spool 42 in the direction "A" (FIG. 15). If the pulling force on the webbing 46 is stopped and the webbing 46 is released, the torsion spring that is provided on spool 42 will cause the webbing 46 to be wound back onto spool 42.

Figure 19:
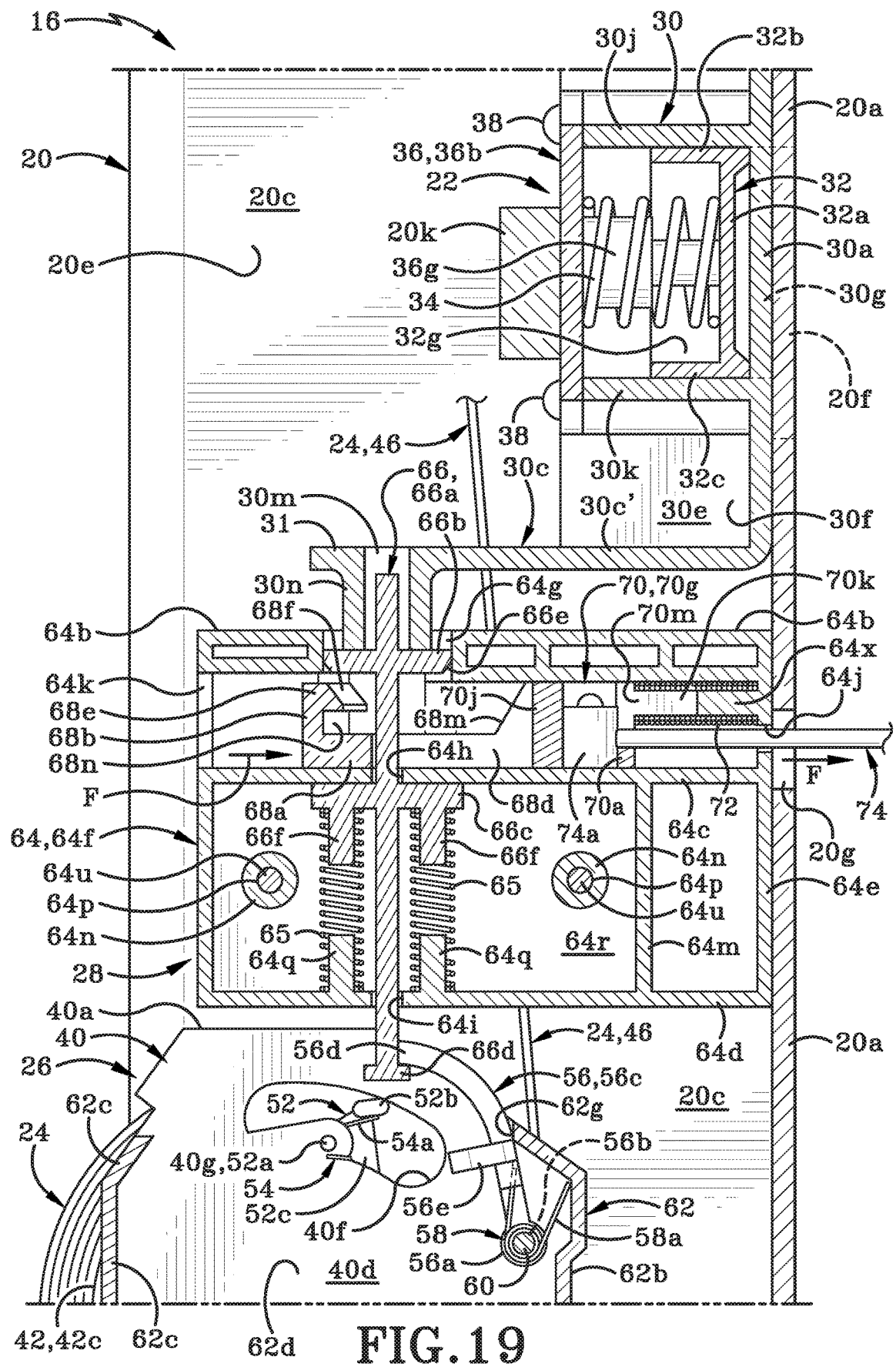
FIG. 19 is a cross-section of the seatbelt assembly taken along line 14-14 of FIG. 6 showing the retractor mechanism in an unlocked position and the locking mechanism in an unlocked position.

When, however, locking tongue 48 is engaged in buckle assembly 18, as has been discussed above, cable 74 is pulled in the direction of arrow "F" and this pulling motion is transmitted along the length of cable 74 to the first end 74*a* thereof (FIG. 19). Since first end 74*a* of cable is secured to cable fastener 70, when cable 74 is pulled in the direction "F", that pulling motion is transmitted to cable fastener 70 which is then also moved in the direction of arrow "F". Since slider 68 is interlocked with cable fastener 70 via projection 70*j*, the motion of cable fastener 70 in the direction of arrow "F" is also transmitted to slider 68. Slider 68 and cable fastener 70 are thus moved from the position shown in FIG. 14 to the position shown in FIG. 19. FIG. 19 shows coil spring 72 compressed between an end interior surface of front wall 64*e* of housing 64 and cable fastener 70. FIG. 19 also shows slider 68 moved inwardly and away from rear wall 64*f* of housing 64.

It should be noted that, at this point, plunger 66 is still in its original position (seen in FIG. 14) and thus second end 56*d* of lever arm 56 is still being held by third plate 66*d* of plunger 66 in a position where lever arm 56 does not contact foot 52*b* of pawl mechanism 52. Thus, pawl 52*c* remains in a position where it does not and cannot engage ratchet wheel 44. Seatbelt system 14 may be used in this condition to secure a person on seat 10 without the risk that the webbing 46 will accidentally become locked in place as the person leans forward and then sits back. In other words, webbing 46 cannot be cinched when the various components of seatbelt system 14 are in the position illustrated in FIG. 19. If a user were to place a child seat 12 on seat 10 when seatbelt system 14 is in the condition illustrated in FIG. 19 and then thread webbing 46 through seatbelt channel 12*c* and engage locking tongue 48 in buckle assembly 18, the user would be completely unable to cinch or tighten webbing 46 to a sufficient degree to tightly retain child seat 12 on seat 10. In other words, no matter how much the user pulled on webbing 46 in the opposite direction to arrow "A" (FIG. 2) in order to wind the webbing 46 back onto spool 42 and then try to pull the webbing 46 outwardly again in the direction "A" to engage the retractor mechanism, the spool 42 cannot be locked against further rotation. Thus, if the user tries to wiggle the child seat 12 around to see if the child seat 12 is tightly retained against seat 10, the child seat 12 will be able to be pulled away from seat 10 and be easily rocked from side-to-side or back-and-forth. It will therefore be obvious to the user that they have not taken the next step to engage the locking retractor mechanism. That next step is to activate the control mechanism.

In order to cinch webbing 46, i.e., in order to stop webbing 46 from being able to be pulled out of housing 40 in the direction of arrow "A", the user needs to actively and purposefully engage the control mechanism that is linked to the retractor mechanism on spool 42. Engaging the control mechanism, i.e., engaging actuator assembly 22, can only occur after the user has engaged locking tongue 48 in buckle assembly 18 and all of the components of the locking mechanism (slider 68 and cable fastener 70) are in the condition shown in FIG. 19.

Figure 18:
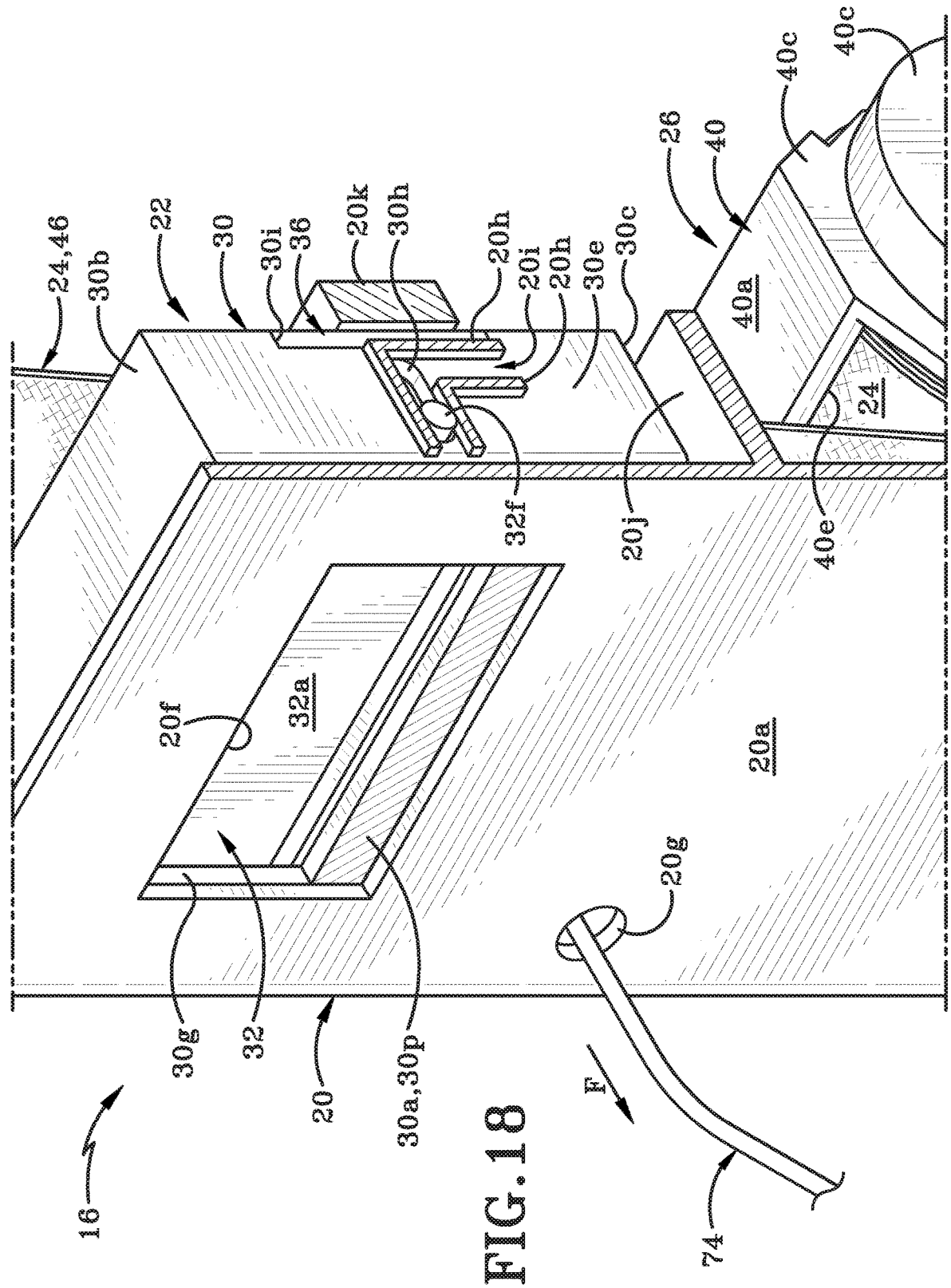
FIG. 18 is front isometric perspective view of the seatbelt assembly with the right side wall of the housing removed for clarity of illustration but showing the guide tracks that are provided on the housing engaged with the actuator assembly.

Actuator assembly 22 is engaged by pushing button 32 (FIGS. 1 and 21) inwardly in the direction of arrow "G" (FIG. 21) and downwardly in the direction of arrow "H". This motion will cause posts 32*f* to slide horizontally (in the direction of arrow "G" shown in FIG. 20) and then vertically downwardly in guide path 20*i* (in the direction of arrow "H"). As button 32 is pushed inwardly and downwardly in this manner, springs 34 are compressed. This is shown in FIG. 21. Additionally, the inward and downward motion causes the entire actuator housing 30 to move downwardly in the direction of arrow "H" from the position shown in FIG. 18 to the position shown in FIG. 20. Button 32 cannot return to its original position once aperture 30*g* of actuator housing 30 moves out of alignment with aperture 20*f* in front wall 20*a* of housing 20. It should also be noted that when actuator housing 30 is in the first position (FIG. 18), the first visual indicator 30*p* is visible to the user. The second visual indicator 30*q* cannot be seen when the button has not been depressed. The presence of this visual indicator 30*p* in a location that is viewable to the user may be used to verify that the control mechanism has not yet been engaged.

Figure 20:
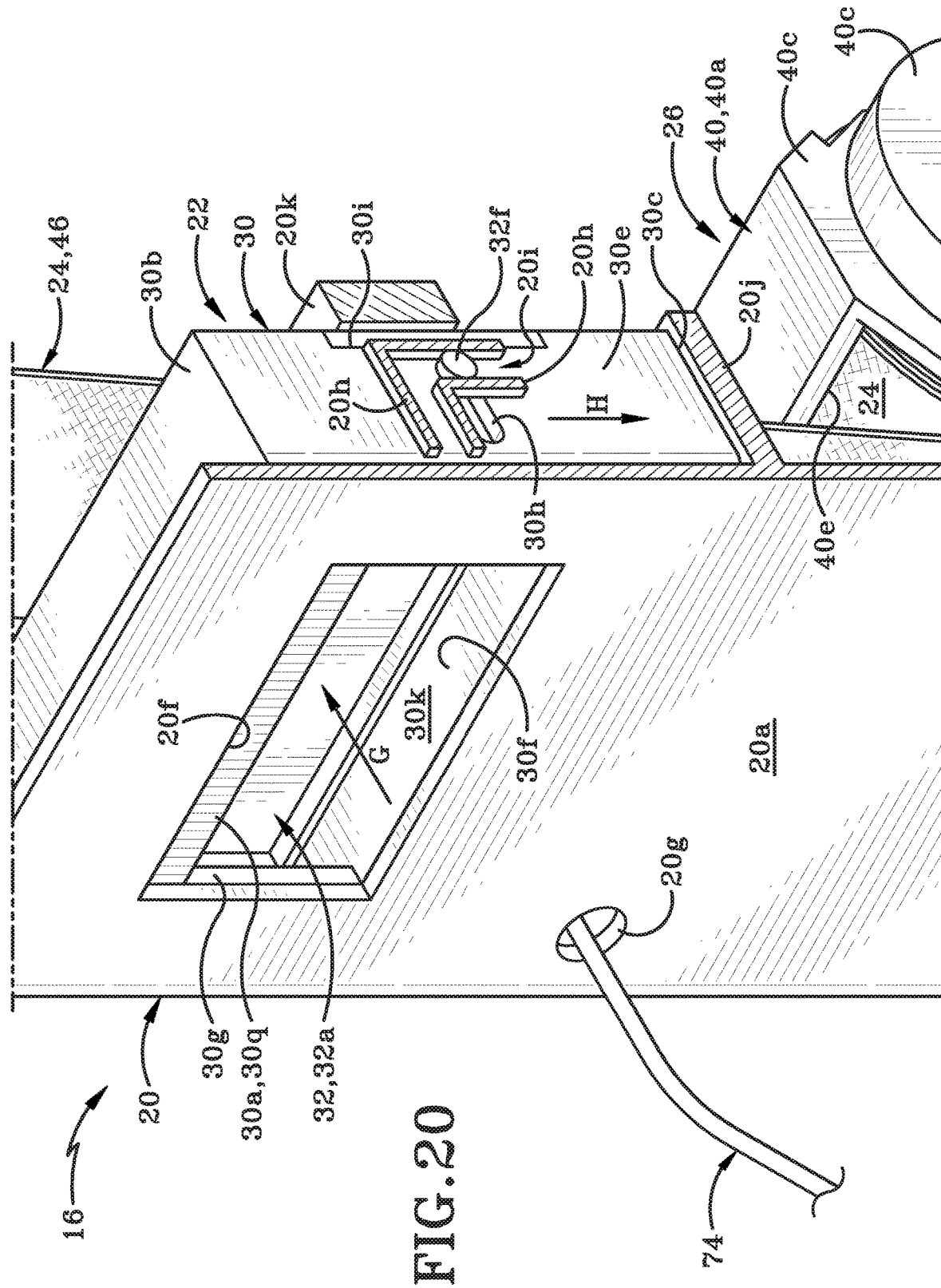
FIG. 20 is front isometric perspective view of the seatbelt assembly with the right side wall of the housing removed for clarity of illustration but showing the guide tracks provided on the housing engaged with the actuator assembly and showing the actuator assembly moved to a locked position.
Figure 21:
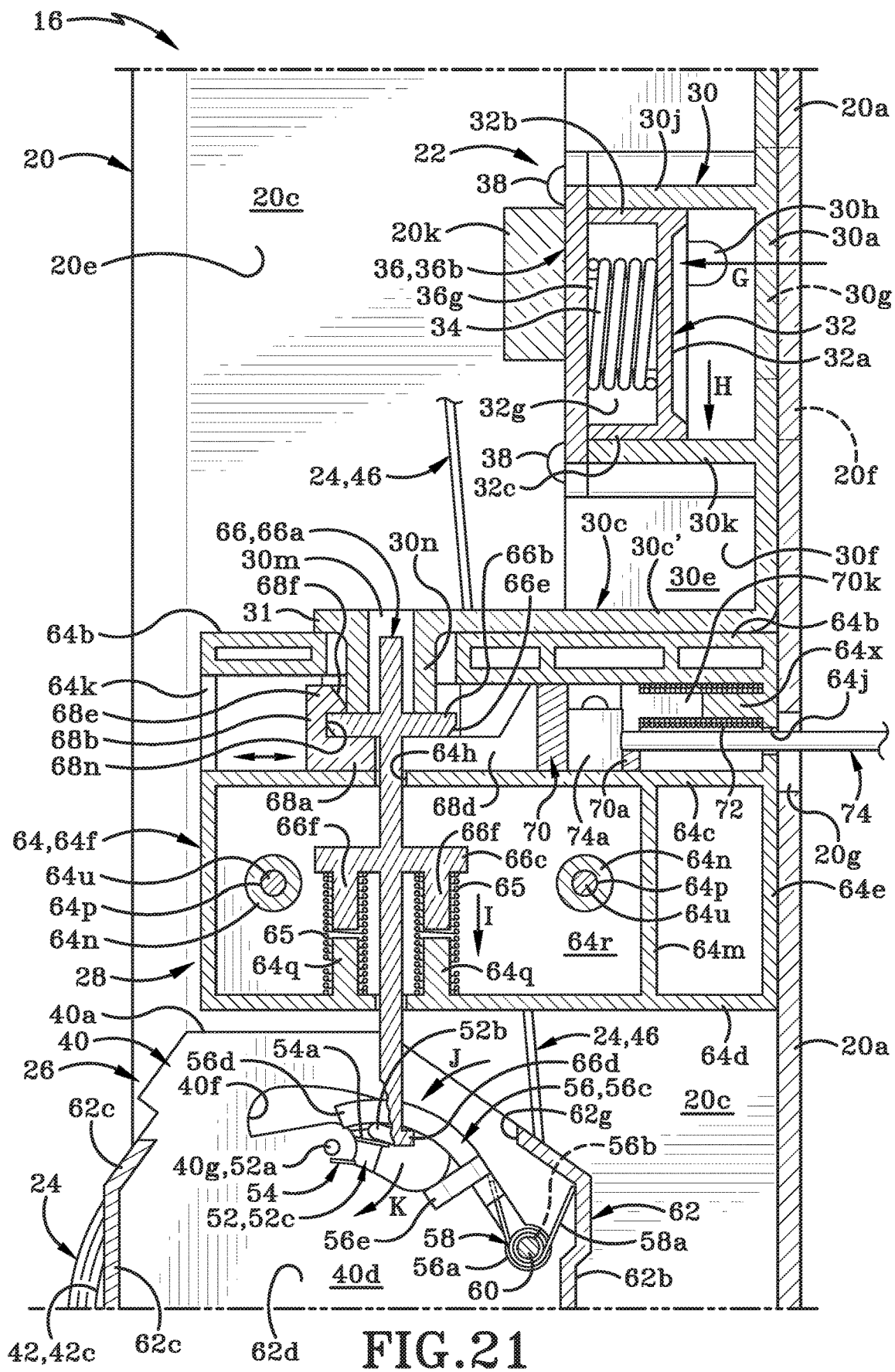
FIG. 21 is a cross-section of the seatbelt assembly taken along line 14-14 of FIG. 6 showing the retractor mechanism in a locked position and the locking mechanism in a locked position.

Once button 32 is pushed inwardly and downwardly to the position shown in FIG. 20, the second visual indicator 30*q* is visible to the user (while the first visual indicator 30*p* has become hidden and therefore cannot be seen). The second visual indicator 30*q* helps the user verify that the control mechanism has been actuated.

The movement of actuator housing 30 in the direction of arrow "H" also causes a bottom end of projection 30*n* on actuator housing 30 to push downwardly on first plate 66*b* of plunger 66. This motion moves plunger 66 in the direction of arrow "I" (FIG. 21), compressing coil springs 65 as it does so. As plunger 66 moves downwardly, the chamfered surface 66*e* on first plate 66*b* slides downwardly along the surface 68*f* of slider 68. This moves slider 68 slightly in the direction of arrow "F" thereby permitting first plate 66*b* to move downwardly and past an innermost edge of curved surface 68*f* of slider and into a slot 68*n* defined between an interior surface of hook member 68*e* and upper surface of base 68*a*. First plate 66*b* slides inwardly into slot 68*n* to a sufficient degree that the lower surface of first plate 66*b* moves into contact with the upper surface of base 68*a* of slider 68. As the first plate 66*b* clears the lowermost edge of hook member 68*e*, slider 68 will move slightly back in the opposite direction to arrow "F". Hook member 68*e* will thus lock slider 68 to plunger 66 and further movement of plunger 66 in the opposite direction to arrow "I" will be prevented. FIG. 21 shows plunger 66 and slider 68 locked together.

As plunger 66 moves downwardly in the direction of arrow "I", the third plate 66d thereof also moves downwardly in the direction of arrow "I". This movement of third plate 66d allows lever arm 56 to rotate in the direction indicated by arrow "J" (FIG. 21) as spring 58 returns to an uncompressed position. The rotational motion of lever arm 56 brings the second end 56d thereof into a position where second end 56d pushes downwardly on foot 52b of pawl mechanism 52. Foot 52b and thereby pawl 52c are caused to rotate in the direction of arrow "K" (FIGS. 21 and 22). Pawl 52c becomes wedged between two teeth 44a on ratchet wheel 44 thus preventing any rotational motion of ratchet wheel 44 in a direction that will allow webbing 46 to be pulled out of seatbelt assembly 16 in the direction of arrow "A" (FIG. 2). Ratchet wheel 44 and therefore spool 42 can therefore no longer rotate freely in a counter-clockwise direction as this motion is prevented by pawl 52c. It is possible, however, for spool 42 and ratchet wheel 44 to still be rotated in a clockwise direction as this motion is not prevented by pawl 52c. So, a user is able to cinch webbing 46 tightly in order to secure child seat 12 in place on seat 10. This is made possible because as the user feeds webbing 46 back onto spool 42 (in the opposite direction to arrow "A"), each time they let go of the webbing 46, the interaction between pawl 52c and ratchet wheel 44 locks the spool 42 against rotation and therefore locks the webbing 46 in place.

When it is later desired to release the child seat 12 from vehicle seat 10, the user simply unbuckles locking tongue 48 from buckle assembly 18. This is accomplished by pushing downwardly on buckling mechanism 78 as would customarily be done to disengage a seatbelt. Buckling mechanism 78 will return from the position illustrated in FIG. 17 to the position illustrated in FIG. 16. As lever arm 80 rotates back to its original position, the pulling motion "F" on cable 74 is released. At the seatbelt assembly 16, since the motion "F" on cable 74 is no longer applied, coil spring 72 returns to its original size and position. This expansion of coil spring 72 causes cable fastener 70 and thereby slider 68 to move in the opposite direction to arrow "F" from the position shown in FIG. 19 to the position shown in FIG. 14. Hook member 68e on slider 68 is moved rearwardly towards rear wall 64e of housing 68d thereby disengaging from first plate 66b on plunger 66. Coil springs 65 are thereby freed to return to their original size and position. The expansion of coil springs 65 causes plunger 66 to move upwardly in the opposite direction to arrow "I". The third plate 66d on the upwardly moving plunger 66 causes the second end 56d of lever arm 56 to be moved upwardly with it, thus rotating lever arm 56 in the opposite direction to arrow "J" (FIG. 21). Spring 58 is compressed as lever arm 56 rotates. Spring 54 on pawl mechanism 52 thus returns to its uncompressed state and, as it does so, pawl 52c is rotated in the opposite direction to arrow "K" (FIG. 21). Pawl 52c is thereby disengaged from teeth 44a of ratchet wheel 44. The motion of ratchet wheel 44 therefore can no longer be stopped by pawl 52c and so cinching of webbing 46 is no longer possible. Webbing 46 may thus be pulled out of housing 40 or fed back into the same at will.

It should be noted that as plunger 66 is moved upwardly in the opposite direction to arrow "I" when coil springs 65 return to their original position, the upper surface of first plate 66b on plunger 66 contacts the underside of projection 30n on actuator housing 30. The upward motion of plunger 66 moves projection 30n and thereby the entire actuator housing 30 vertically in the opposite direction to arrow "H". As soon as apertures 30g and 20f align once again, coil springs 34 return to their original size and shape and button 32 is forced horizontally forwardly by springs 34 in the opposite direction to arrow "G". Button 32 is therefore moved back into a position where front surface 32a of button 32 is in close proximity to the interior surface of front wall 30a of actuator housing 30.

It should be noted that actuator assembly 22 cannot be engaged without locking tongue 48 first being engaged with buckle assembly 18. This is because (as illustrated in FIG. 14) slider 68 is not in the correct position to lock onto first plate 66a of plunger 66 until cable 74 has pulled cable connector 70 and thereby slider 68 from the position shown in FIG. 14 to the position shown in FIG. 19. So, even if a user pushes button 32, first plate 66a on plunger 66 will contact the upper surfaces of the second wall 68c of slider 68 and top wall 70c of cable connector 70 and therefore be prevented from moving downwardly in the direction of arrow "I".

It is contemplated that, instead of having manual components such as cable 74 and button 32, seatbelt assembly 14 may be provided with sensors in one, more or all of buckle assembly 18, actuator assembly 22, locking tongue 48, lever arm 56, and locking mechanism (68/66). Seatbelt assembly 16 may also be provided with a central processing unit (CPU) that will monitor and control these sensors and provided programming that is able move, lock and unlock various components in the same manner as has been manually described above. It is further contemplated that, when activated, these electronic components may be able to initiate movement of slider 68 and plunger 66 in order to engage pawl 52c or disengage pawl, as needed. So, for example, if such electronic components are provided, then sensors in buckle assembly 18 may send a signal to actuator assembly 22 on seatbelt assembly 16 when locking tongue 48 is engaged in buckle assembly 18. As with the manual system, the retractor mechanism will remain disengaged unless and until the user presses button 32 on seatbelt assembly 16. When button 32 on actuator assembly 22 is depressed, a signal may be sent to the CPU and then the CPU will control movement of the slider 68 and plunger 66 to rotate pawl 52c into engagement with ratchet wheel 44. Cinching of webbing 46 may then be possible.

When locking tongue 48 is disengaged from buckle assembly 18, that information will be transmitted to CPU which will control the movement of slider 68 and plunger 66 and break the engagement of pawl 52c from ratchet wheel 44. Cinching of webbing 46 will then no longer be possible. The CPU may include programming that not only controls all of these functions but also helps to determine whether or not all components are engaged and functioning properly and whether or not child seat 12 is properly and adequately engaged on seat 10.

Still further, the system may be set up to have a control mechanism that electronically transmits a signal directly to pawl 52c to rotate pawl 52c from a first position of engagement with ratchet wheel 44 so that the wheel's rotation is prevented in one direction but is allowed in an opposite direction; to a second position where pawl 52c does not interfere with the rotation of ratchet wheel 44 in either direction. Still further, CPU could include programming that directly controls the ratchet wheel's rotation and selectively is activated to rotate ratchet wheel 44 in only one direction instead of rotating selectively in one of two opposite directions.

In each of these instances, whether manual or electronic, some type of control mechanism (such as button 32) is required to be activated after engaging locking tongue 48 in buckle assembly but before cinching of webbing 46. Applicant contemplates that, in the future, sensors could be placed in a child seat 12 and in the vehicle seat 10 and the act of the user simply placing the child seat 12 on the seat 10 could be the additional control mechanism that instructs the CPU to switch on the locking retractor mechanism after verification that the locking tongue 48 has been engaged in the buckle assembly 18.

It is further contemplated that the manual and electronic versions of the seatbelt system 14 described above will not interfere in any way with any ELR system provided to engage the retractor mechanism in the case of an emergency stop of the vehicle.

It will be understood that the seatbelt system 14 may also be used in instances where there is a removable seat. The system 14 may include components that ensure automatic reconnection when the removable seat is re-engaged in the vehicle. This is particularly true if various operations of the system are electronic instead of manual but even manual components of system 14 can be set up to re-engage automatically.

It will be understood that while button 32 is disclosed herein as requiring to be manually pushed inwardly and downwardly through aligned apertures 20*f*, 30*g*, a touch screen may be used to actuate an electronic version of the button. Alternatively, button 32 may act in a different fashion. For example, two spaced apart button sections may need to be pinched together or pushed toward each other or away from each other to activate the plunger 66. Alternatively, button 32 may be replaced with a lever type mechanism that is linked to plunger 66 and may be used to raise or lower this plunger 66.

It will further be understood that some of the features disclosed herein may be utilized in currently known ALR systems where the webbing has to be entirely pulled out of the seatbelt housing in order to activate the ALR. Those features include providing a modified ALR system where the locking tongue on the seatbelt would have to be engaged in the buckle assembly before the ALR would be activated.

It will further be understood that the presently disclosed system could omit the feature of requiring the locking tongue to be buckled in the buckle assembly prior to engaging button 32 of the control mechanism. So, in this instance, the user may be able to have direct cinching control by simply engaging the button to turn on the cinching function. Resetting the button to the original state or activating a second actuator would reset or turn off cinching control, irrespective of how much webbing is pulled out of the seatbelt housing.

Previously known retractor mechanisms have included ratchet wheels and pawls but none of the previously known systems have included a lever arm such as lever arm 56 that pivots to engage pawl 52*c* and move it into contact with the ratchet wheel's teeth 44*a*. Furthermore, no previously known systems have included a lever arm 56 that can only be moved into contact with the ratchet wheel's teeth 44*a* after engaging the locking tongue 48 on seatbelt 24 with the buckle assembly 18. Still further, no previously known systems have included a control mechanism (actuator assembly 22) that is moved to a condition to engage and permit movement of the lever arm 56 only after the locking tongue 48 on seatbelt 24 is engaged with buckle assembly 18. If locking tongue 48 is released from buckle assembly 18, then the retractor mechanism 26 will unlock. Seatbelt system 14 discloses the use of a mechanical means for connecting buckle assembly 18 to retractor mechanism 26. In particular, a cable 74 is utilized to connect buckle assembly 18 to retractor mechanism 26.

A second embodiment of the seatbelt system in accordance with the present disclosure is illustrated in FIGS. 23-39 and is described below. This second embodiment of the seatbelt system is generally indicated by the reference number 114. Seatbelt system 114 comprises a seatbelt assembly 116 and a buckle assembly 118. Seatbelt system 114 differs from seatbelt system 14 in that electronic components are utilized to connect a retractor mechanism 126 of seatbelt assembly 116 to buckle assembly 118 instead of using the cable 74 that is utilized in seatbelt system 14. The electronic components may be used in seatbelt system 114 to activate or deactivate mechanisms within the system 114 or to monitor the status of the mechanisms.

Furthermore, in seatbelt system 14 described above, an actuator assembly 22 on the seatbelt assembly 16 is engaged by a person in lieu of or in addition to pulling the seatbelt webbing 46 all the way out of the seatbelt housing 20. In seatbelt system 114, however, there is no actuator on the seatbelt assembly 116.

Figure 23:
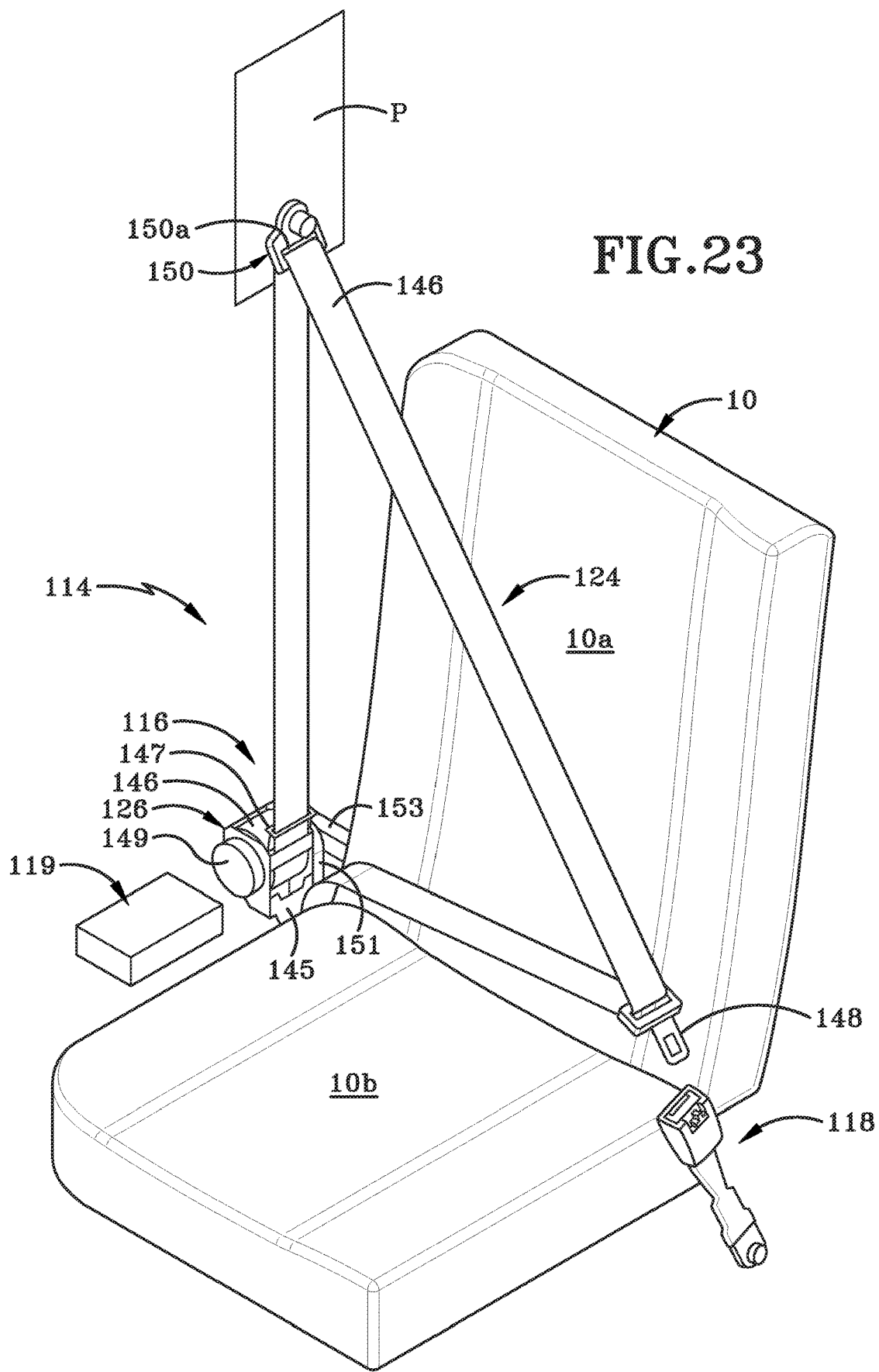
FIG. 23 is schematic representation of a second embodiment of a seatbelt system in accordance with an aspect of the present disclosure.

Referring to FIGS. 23 to 39, the seatbelt system 114 in accordance with the present disclosure is described in greater detail below. FIG. 23 shows a vehicle seat 10 having a back region 10*a* and a seat region 10*b*. It will be understood that a child seat 12, such as is illustrated in FIG. 1, may be positioned on vehicle seat 10 and may be secured thereto by seatbelt system 114. Seatbelt system 114 shows a different position of mounting of the retractor mechanism 126 on a pillar of the vehicle relative to what is illustrated in FIG. 1 with respect to seatbelt assembly 16. Seatbelt assembly 16 is shown in FIG. 1 as being a mounted higher on the pillar while retractor mechanism 126 is mounted lower on the pillar. In some instances, the pillar may cover some or all of retractor mechanism 126.

Seatbelt system 114 further comprises the vehicle's onboard computer system 119 that is diagrammatically illustrated in FIG. 23. Computer system 119 will be located a distance away from vehicle seat 10 and from seatbelt system 114. The block that is used to represent computer system 119 is shown proximate seatbelt assembly 114 for ease of illustration only.

Figure 24:
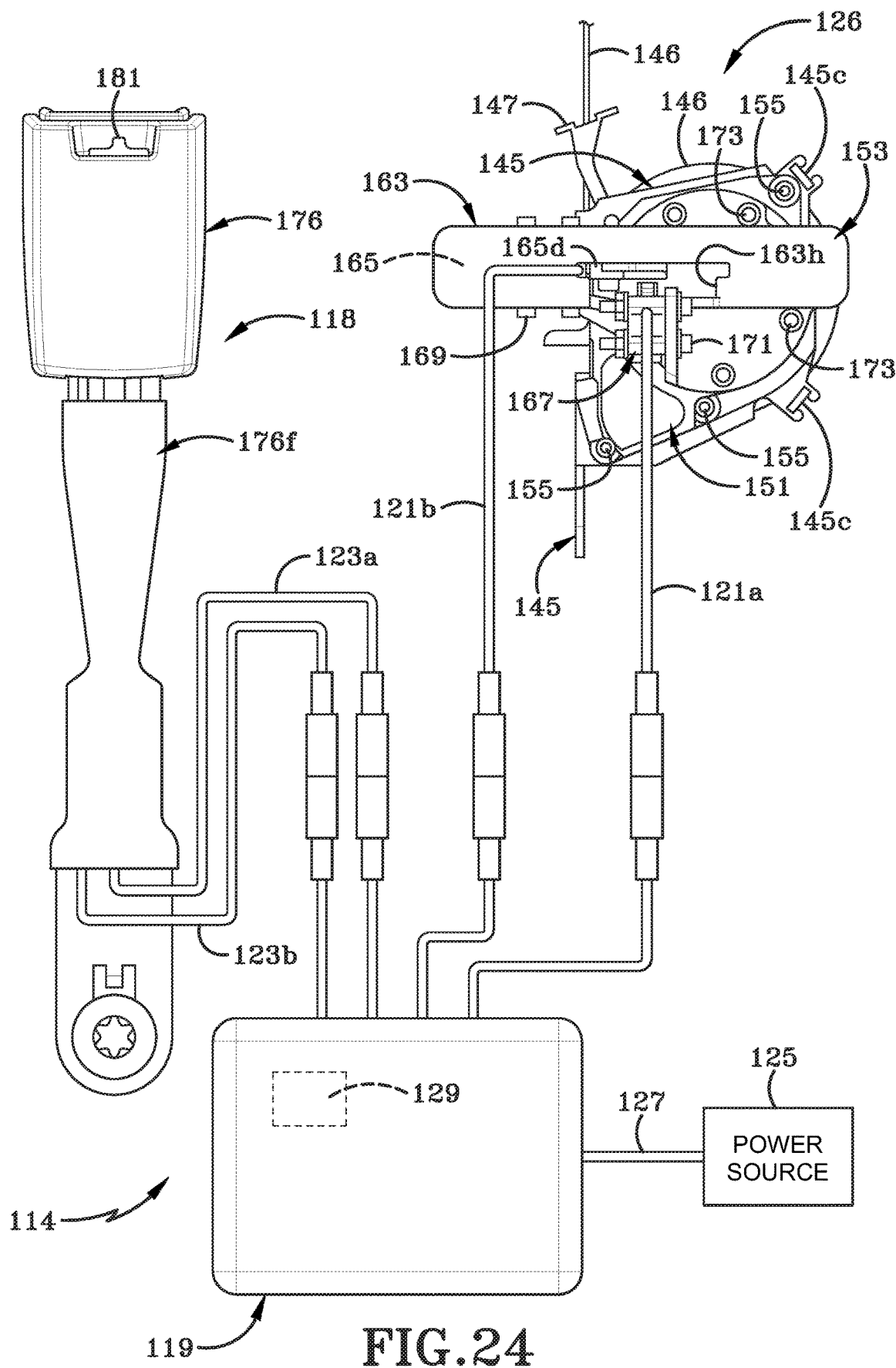
FIG. 24 is a schematic representation of the second embodiment of the seatbelt system shown on its own.

FIG. 24 shows retractor mechanism 126 is operatively engaged with computer system 119 via wiring 121*a*, 121*b* and buckle assembly 118 is operatively engaged with computer system 119 via wiring 123*a*, 123*b*. Computer system 119 is operatively engaged with a remote power source 125 via one or more wires 127. The onboard computer system 119 includes a central processing unit (CPU) 129 that is programmed to power, control, and/or operate various electronic systems of the vehicle. CPU 129 also is programmed to control, operate, and monitor the electronic components of seatbelt system 114.

While seatbelt system 114 is shown to include wiring 121*a*, 121*b* and 123*a*, 123*b*, it will be understood that in other examples, onboard computer system 119 may be wirelessly connected to seatbelt assembly 116 and to buckle assembly 118. Still further, computer system 119 may be wirelessly linked to a handheld electronic device of the vehicle operator so that the operator may be alerted by their personal electronic device (a smartphone, for example, whether seatbelt system 114 is activated or not and whether the child seat 12 (FIG. 1) is properly secured in place or not. In other examples, the operator may activate or deactivate the seatbelt system 114 from securing the child seat 12 in place by utilizing a user interface on their personal electronic device.

Referring again to FIG. 23, seatbelt 124 includes a length of webbing 146 that extends outwardly from retractor mechanism 126 and is threaded through a flange 150 mounted on a pillar "P" on the vehicle. A locking tongue 148 is slidably movable along webbing 146. As with the previously described seatbelt 24, seatbelt 124 includes a shoulder portion and a lap portion. Locking tongue 148 is configured to be selectively engageable in buckle assembly 118.

Figure 28:
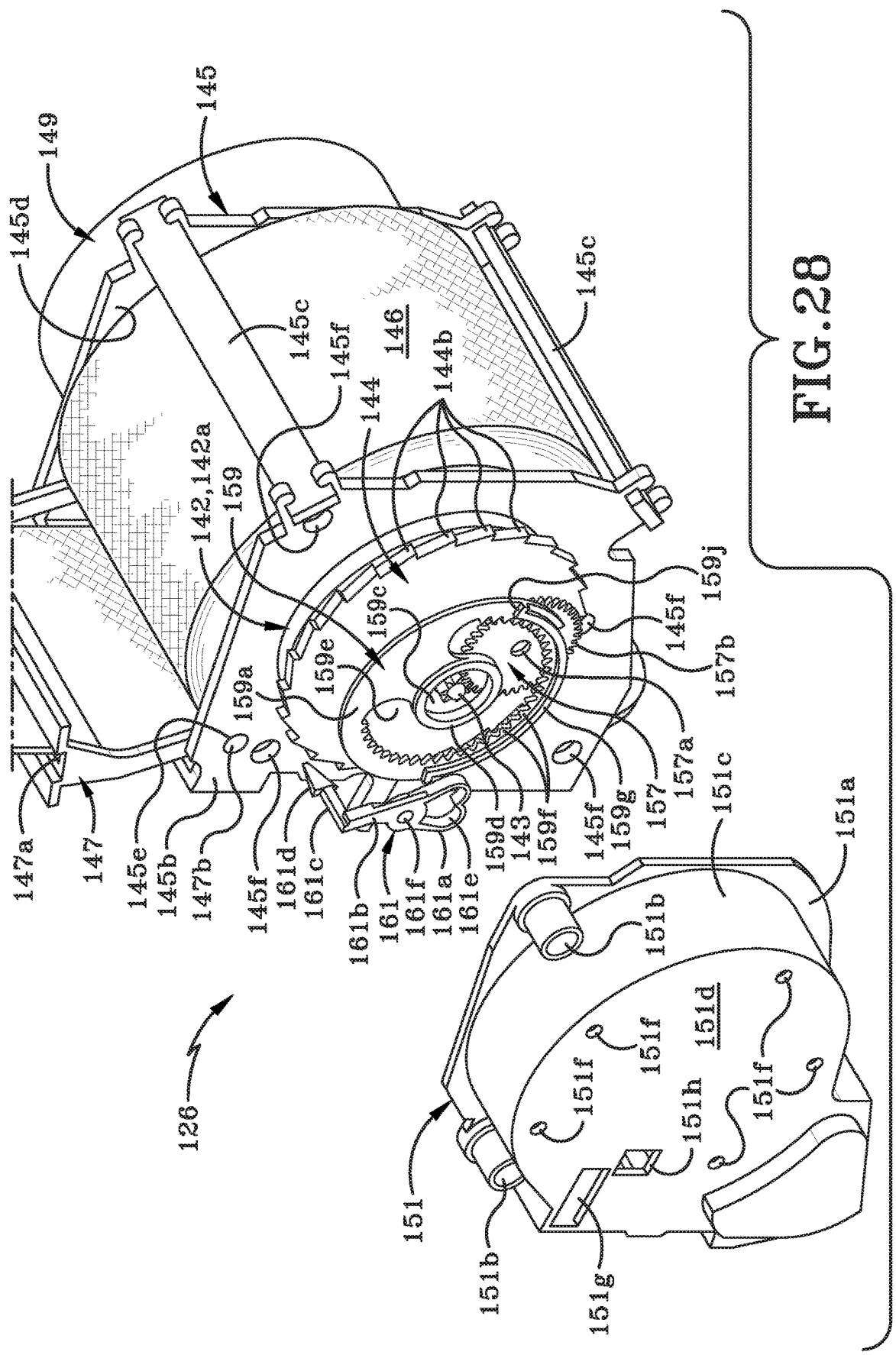
FIG. 28 is a partially exploded isometric perspective view of the retractor mechanism with the second gear housing exploded away therefrom.

Retractor assembly 126 includes a retractor frame 145 (FIGS. 25, 28, 29) that has a first side wall 145a and a second side wall 145b with a plurality of bracing members 145c extending therebetween. First and second side walls 145a, 145b are substantially identical and are located a distance laterally apart from each other and define a cavity 145d therebetween. Each of the first and second side walls 145a, 145b defines therein a central aperture, a first hole, and a plurality of second holes therein. FIG. 28 shows second side wall 145b with a first hole 145e and one or more second holes 145f. The central aperture cannot be seen in the figures but it will be understood that a portion of the spool 142 and the axle 143 extends through the central aperture. The central aperture (not shown), the first hole 145e and the one or more second holes 145f all extend between an interior surface and an exterior surface of the associated side wall 145a, 145b. The purpose of the central aperture, first hole 145e, and the one or more second holes 145f will be described hereafter.

A spool 142 (FIG. 28) is mounted for rotation within cavity 145d of retractor frame 145. Although spool 142 is not illustrated in FIGS. 23 to 36, it will be understood that spool 142 is substantially identical to the spool 42 shown in FIG. 10. Spool will therefore include a hub, a first end and a second end that are similar to hub 42a, first end 42b and second end 42c of spool 42.

Figure 29:
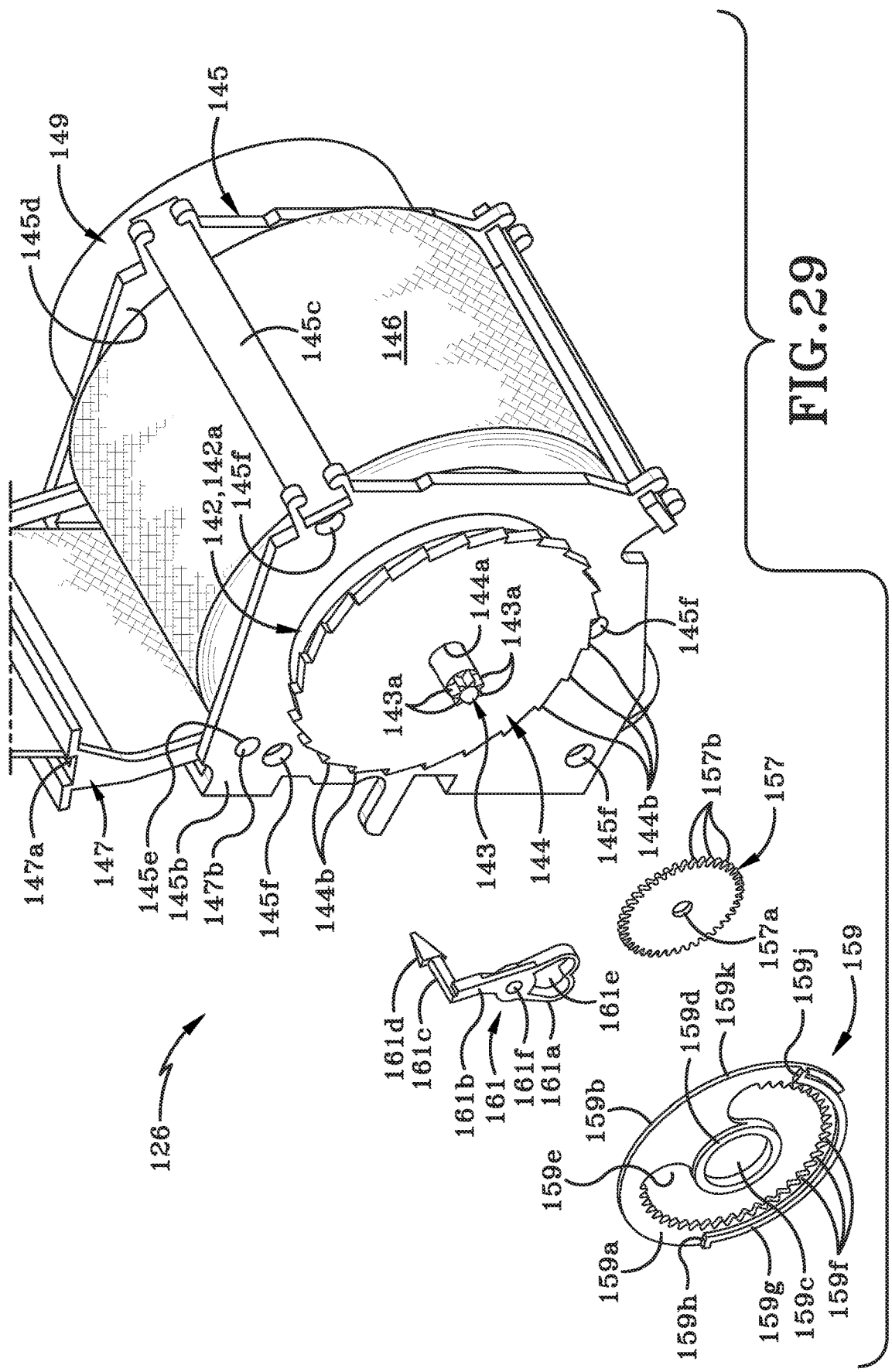
FIG. 29 is a partially exploded isometric perspective view of the retractor mechanism with the first gear, second gear and trigger exploded away therefrom.

An axle 143 (FIGS. 28, 29, 35 and 36) extends between first and second side walls 145a, 145b of and through a bore defined in the hub of spool 142. Spool 142 is able to rotate about an axis that extends along axle 143 and a torsion spring (not shown) is also provided within retractor frame 145 for controlling the rotation of spool 142, as has been previously described with respect to spool 42. As illustrated in FIG. 29, at least one end of axle 143 includes a plurality of teeth 143a that extend radially outwardly from an exterior surface of axle 143.

A first end of seatbelt webbing 146 is secured to spool 142 and webbing 146, is wound around the hub of spool 142 when the spool is rotated in a first direction, and is wound off of the hub of the spool 142 when the spool is rotated in a second direction. A seatbelt guide 147 is engaged with retractor frame 145 and extends upwardly and outwardly therefrom. Seatbelt guide 147 includes a head that defines a slot 147a (FIG. 25) therein. Two arms extend downwardly from the head and each arm includes a pin 147b that extends through the first hole 145e in the adjacent one of the first and second side walls 145a, 145b of retractor frame 145. Seatbelt guide 147 is able to pivot relative to retractor frame 145 about an axis that extends along the pins 147b. Webbing 146 is threaded through slot 147a defined in seatbelt guide 147 and is then threaded through a slot 150a (FIG. 1) defined in flange 150 mounted on pillar "P" of the vehicle. Although not shown in the attached figures, it should be understood that a second end of webbing 146 is fixedly secured to a region of the vehicle's frame or to pillar "P" a distance away from flange 150.

Retractor assembly 126 further comprises a first gear housing 149, a second gear housing 151, and a solenoid assembly 153. First gear housing 149 is secured to first side wall 145a of retractor frame 145 and second gear housing 151 is secured to second side wall 145b of retractor frame 145. Each of the first and second gear housings 149, 151 may include a base and a generally cylindrical region extending outwardly from the base. FIGS. 27, 28, 31, and 32 show second gear housing 151 in greater detail but it will be understood that first gear housing 149 may be generally similarly configured. (First gear housing 149 does not house any components that are of particular relevance to the present disclosure and therefore will not be described in any further detail herein.)

Second gear housing 151 comprises a base 151a that has an interior surface and an exterior surface. The interior surface of second gear housing 151 is configured to abut second side wall 145b of retractor frame 145. One or more apertures 151b may be defined in base 151a. Each aperture 151b extends between the interior and exterior surfaces of base 151a and is located so as to be alignable with one of the holes 145f in second side wall 145b. When second gear housing 151 is to be secured to second side wall 145b, a fastener 155 (FIG. 24) is inserted through each pair of aligned apertures 151b and holes 145f.

Figure 31:
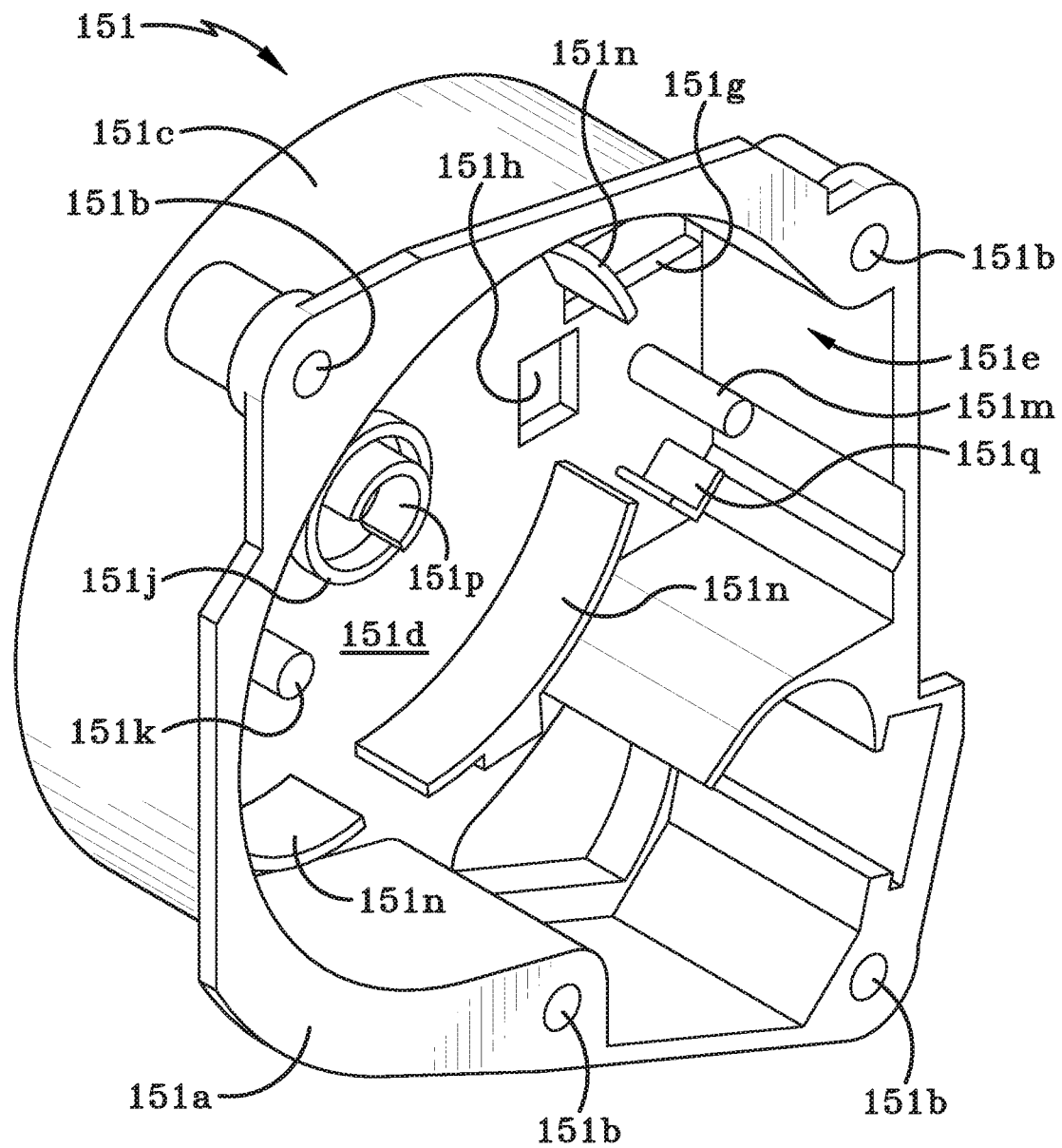
FIG. 31 is a rear perspective view of the second gear housing.
Figure 32:
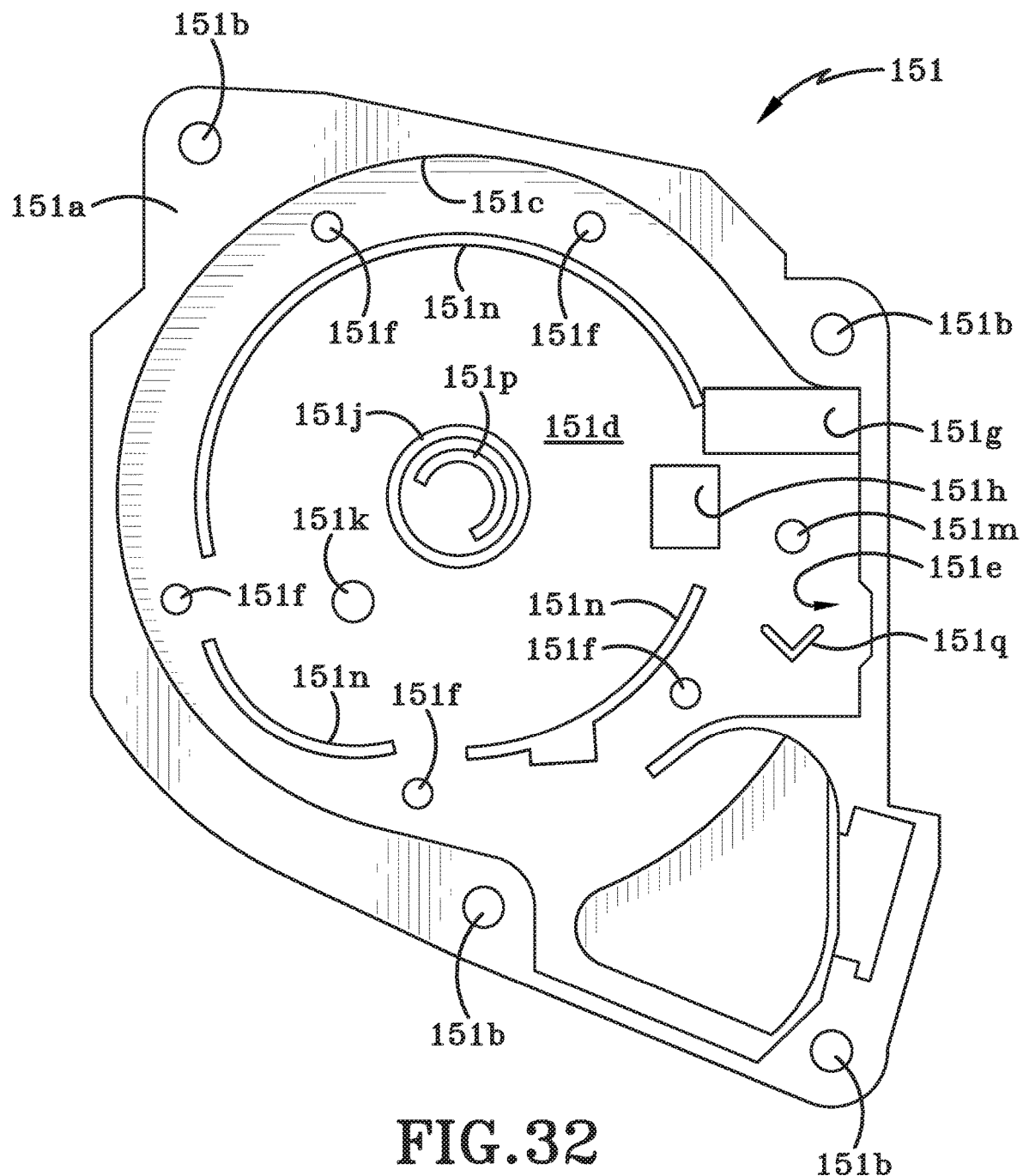
FIG. 32 is a rear elevation view of the second gear housing.

Referring to FIGS. 27, 28, 31, and 32, a generally cylindrical region extends outwardly from the exterior surface of base 151a. The cylindrical region includes a circumferential wall 151c that extends outwardly from the exterior surface of base 151a and an end wall 151d that closes off access to a space 151e (FIG. 31) defined by base 151a and circumferential wall 151c. End wall 151d is spaced a distance laterally from base 151a and is oriented substantially parallel thereto. A plurality of holes 151f are defined in end wall and extend between an exterior surface and interior surface thereof. End wall 151d defines a first aperture 151g (FIG. 27) and a second aperture 151h therein. Each of the first aperture 151g and second aperture 151h extends between the exterior surface and interior surface of end wall 151d. Holes 151f, first aperture 151g, and second aperture 151h are therefore in fluid communication with space 151e. FIGS. 31 and 32 show that a first support 151j, a first pin 151k, a second pin 151m, a plurality of guide walls 151n, a second support 151p, and a V-shaped flange 151q are provided on the interior surface of end wall 151d and extend into space 151e. The purpose of these various components of second gear housing 151 will be discussed hereafter. As is evident from FIG. 31, second support 151p extends outwardly from end wall 151d relative to first support 151j. First support 151j may be circular in shape while second support 151p may be C-shaped.

As indicated earlier herein, spool 142 is engaged with retractor frame 145. It will be understood that the hub of spool 142 is located within cavity 145d of retractor frame 145 and a portion of the hub extends through each central aperture defined in first and second side walls 145a, 145b. The first end (not shown) of spool 142 is located adjacent an exterior surface of first side wall 145a. The second end 142a of spool 142 is located adjacent an exterior surface of second side wall 145b and can be seen in FIGS. 28 and 29. Each end of axle 143 extends through a hole (not shown) in each of the first and second ends of spool 142.

A ratchet wheel 144 (FIG. 28) is mounted on the end of axle 143 that extends outwardly beyond second end 142a of spool 142. Ratchet wheel 144 is located adjacent first end 142a of spool 142. (Alternatively, ratchet wheel may be integrally formed with first end 142a of spool 142.) Axle 143 passes through a central hole 144a (FIG. 29) defined in ratchet wheel 144 and extends for a distance outwardly beyond ratchet wheel 144. A plurality of radial teeth 144b extend outwardly from a circumferential edge surface of ratchet wheel 144. Ratchet wheel 144 is operatively engaged with the spool 142 in such a way that ratchet wheel 144 will rotate in unison with the spool 142.

A gear assembly is interposed between ratchet wheel 144 and a control mechanism that moves a pawl into and out of engagement with the ratchet wheel 144 as will be later described herein. The gear assembly includes at least a first gear 157 and a second gear 159. A portion of axle 143 may also be considered as part of the gear assembly as teeth 143a of axle 143 mesh with teeth 157b of first gear 157.

Figure 33:
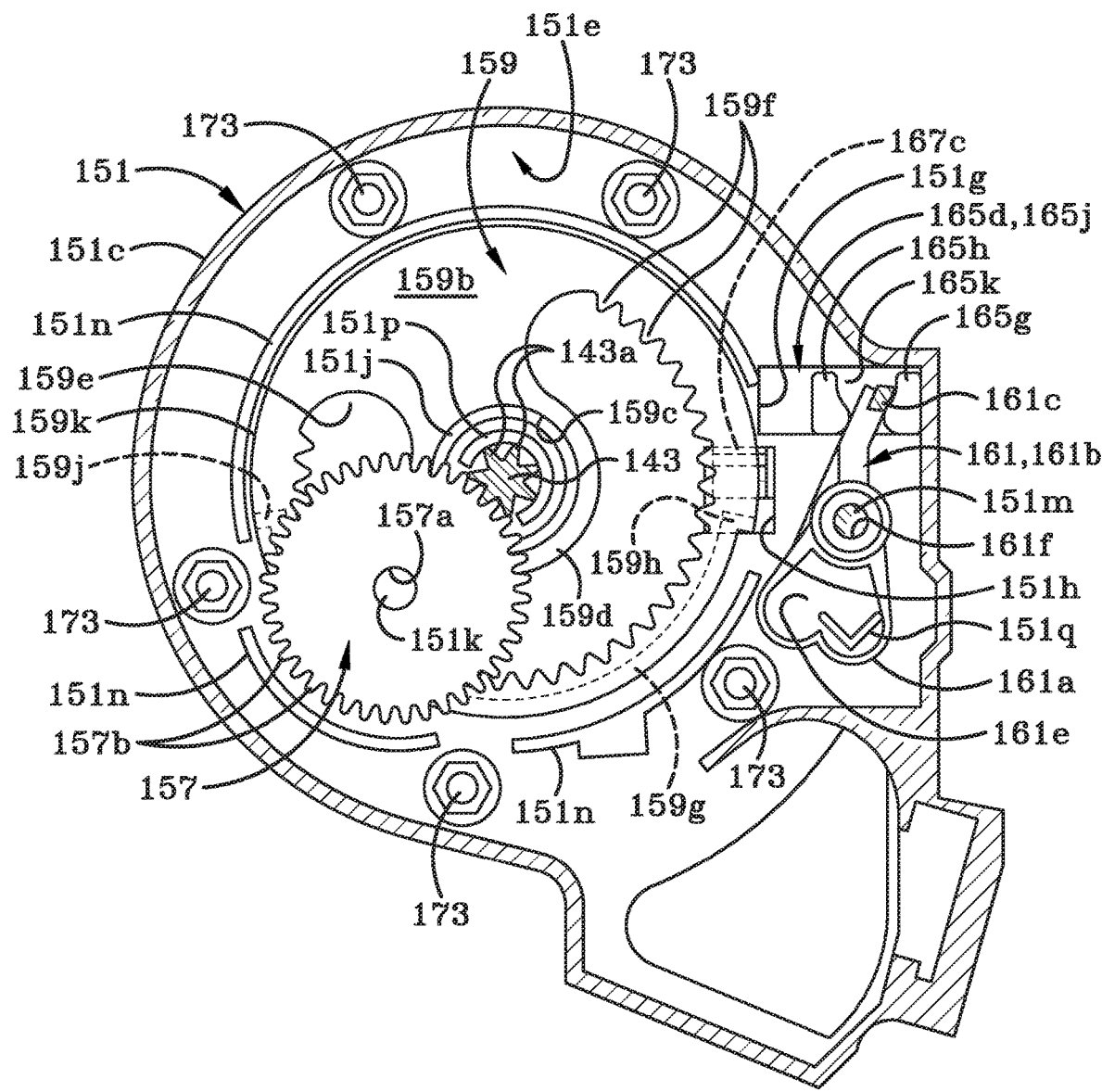
FIG. 33 is a cross-section through the second gear housing taken along line 33-33 of FIG. 25 and showing the first gear, second gear and trigger in a first position.
Figure 34:
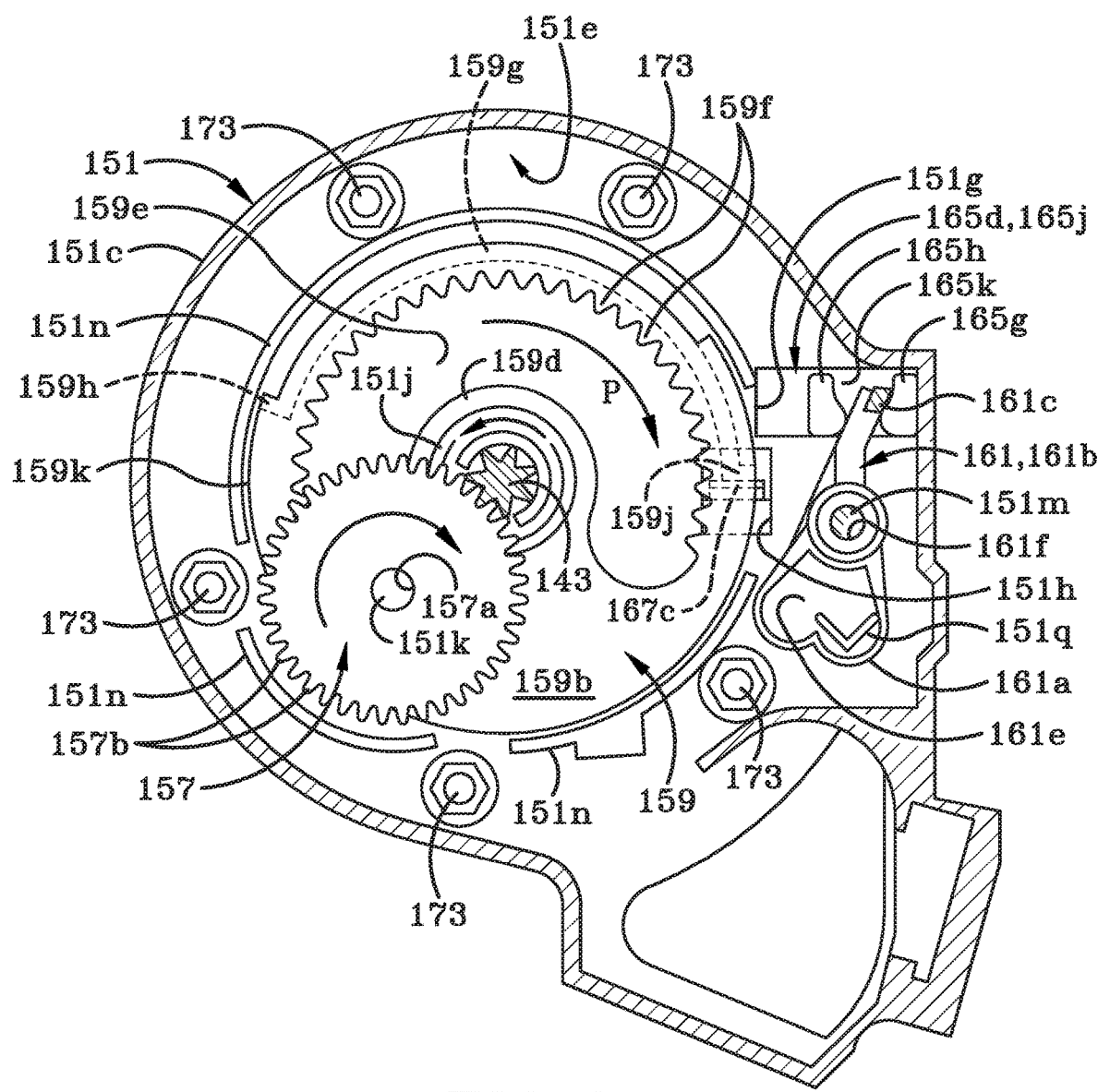
FIG. 34 is a cross-section through the second gear housing as in FIG. 33 with the first gear and second gear rotating to a second position.

First gear 157 (FIGS. 28, 29) is located adjacent ratchet wheel 144. First gear 157 defines a central hole 157a therein and has a plurality of teeth 157b provided on a circumferential edge surface thereof. First gear 157 is smaller than ratchet wheel 144 and is oriented substantially parallel thereto. First gear 157 is positioned in such a manner that first pin 151k of second gear housing 151 will extend through central hole 157a. FIG. 33 shows first gear 157 mounted on first pin 151k. Teeth 157b are configured to mesh with teeth 143a provided on axle 143.

Retractor assembly 126 further comprises a second gear 159 (FIG. 28, 29). Second gear 159 is a substantially planar member that is circular in shape and is configured to be located within second gear housing 151 between end wall 151d and first gear 157. First gear 157 therefore spaces second gear 159 from ratchet wheel 144. Second gear 159 has a front surface 159a and a back surface 159b (FIG. 33) and defines a central aperture 159c that extends between front surface 159a and back surface 159b. An annular ring 159d circumscribes central aperture 159c. Ring 159d is sized to be complementary to an outer diameter of support 151j (FIGS. 31 & 33) and fits therearound when retractor assembly 126 is assembled.

Second gear 159 also defines a generally U-shaped slot 159e that extends between front surface 159a and back surface 159b. Slot 159e is positioned to at least partially circumscribe central aperture 159c. First pin 151k extends outwardly from an interior surface of end wall 151d, through U-shaped slot 159e of second gear 159 and through central hole 157a of first gear 157. A plurality of radial gear teeth 159f (FIG. 33) are provided on a portion of second gear 159 that defines an outer surface of the U-shaped slot 159e.

Second gear 159 further defines a generally U-shaped rib 159g that is provided on front surface 159a and extends outwardly for a distance therefrom. Rib 159g is located adjacent a peripheral edge 159k of second gear 159. Rib 159g originates in a first shoulder 159h and terminates in a second shoulder 159j.

As shown in FIG. 33, when retractor assembly 126 is assembled, second gear 159 is seated in an area circumscribed by guide walls 151n; annular ring 159d is seated around first support 151j and second support 151p extends through central aperture 159c. First pin 151k extends through U-shaped slot 159e. First gear 157 is mounted on first pin 151k. Axle 143 extends outwardly from ratchet wheel 144 and a terminal end of axle 143 is received within a space defined by the C-shaped second support 151p. The teeth 143a on axle 143 project outwardly from the opening in the C-shaped second support 151p and mesh with teeth 157b on first gear 157.

Retractor assembly 126 further comprises a trigger 161 (FIG. 29) that is received within the cavity 151e defined by second gear housing 151. Trigger 161 includes an inverted heart-shaped counterbalance 161a, an arm 161b that extends outwardly from the apex of the counterbalance 161a, and a leg 161c that extends outwardly from arm 161b. Leg 161c is oriented at right angles to arm 161b. Leg 161c terminates in a tip 161d. Tip 161d may be shaped as an arrow-head. Counterbalance 161a defines an aperture 161e therein. The region of arm 161b proximate the apex of counterbalance 161a defines a hole 161f therein that extends from a front surface to a back surface of trigger 161. FIG. 33 shows that trigger 161 is mounted on end wall 151d of second gear housing by second pin 151m extending through hole 161f. (Second pin 151m is effectively a trigger axis about which trigger 161 pivots.) V-shaped flange 151q is seated within a region of aperture 161e. V-shaped flange 151q may act as a stop to restrict pivotal motion of trigger 161, as will be described later herein.

Figure 25:
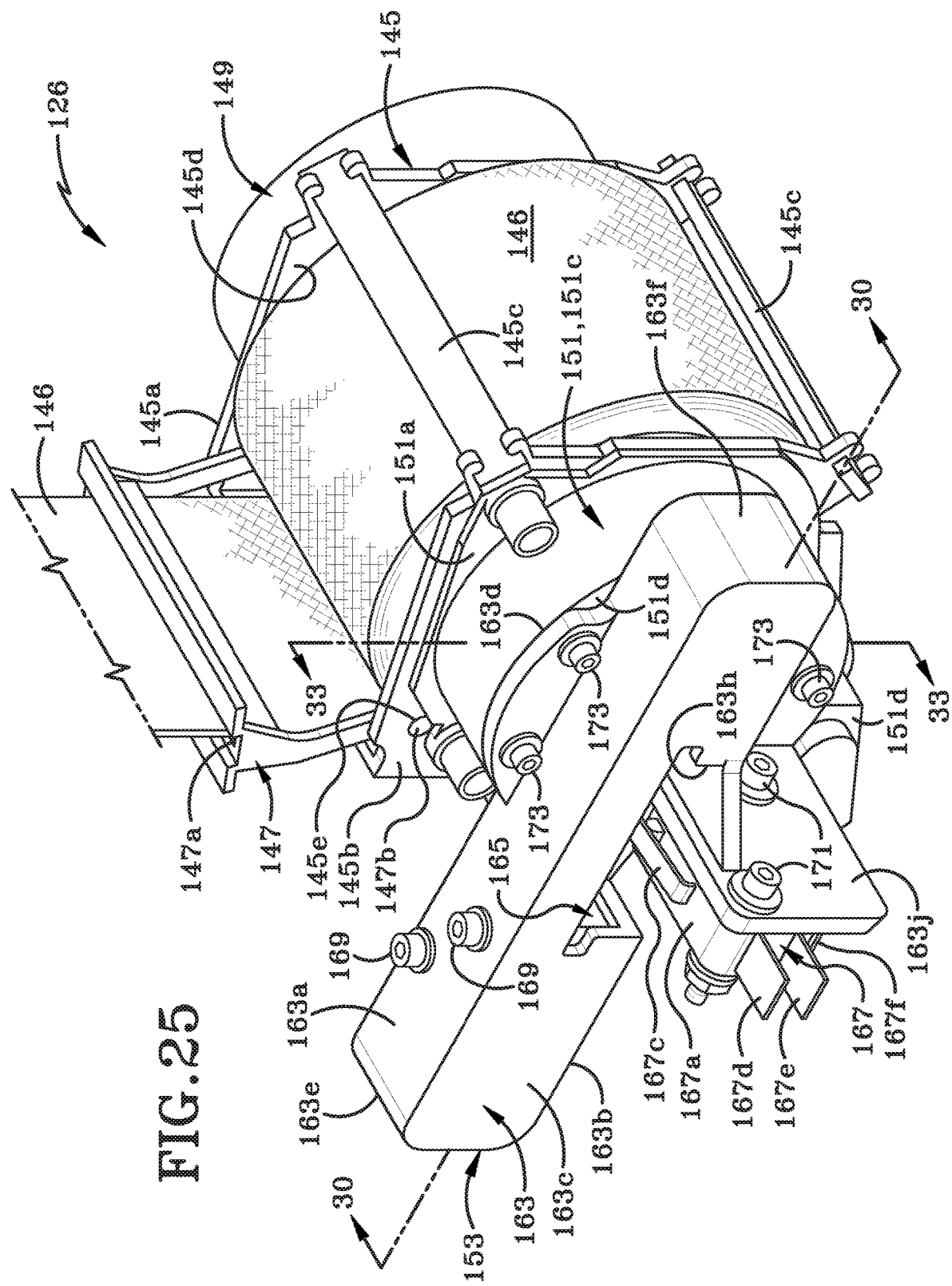
FIG. 25 is an isometric perspective view of the retractor mechanism.
Figure 26:
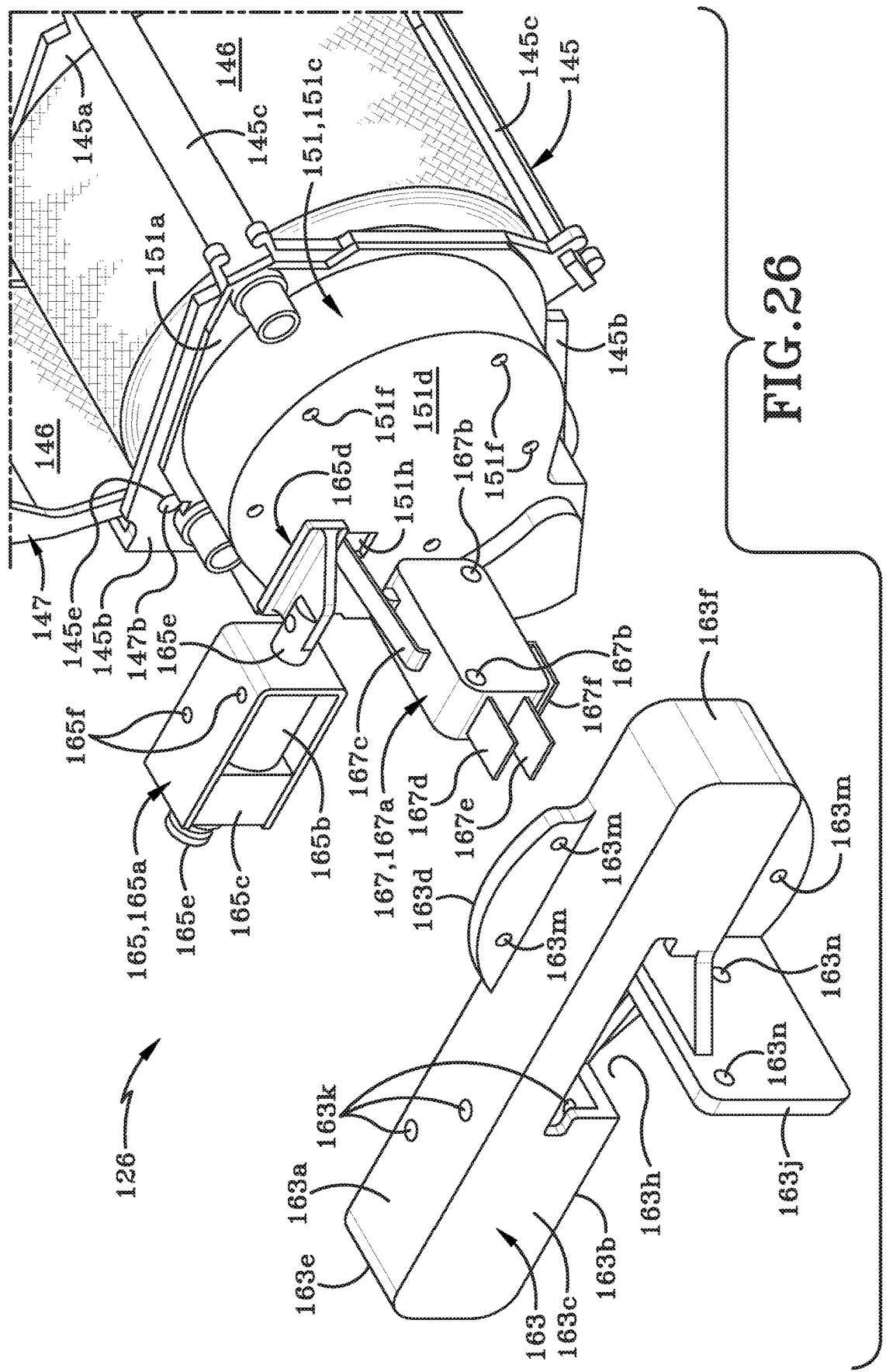
FIG. 26 is a partially exploded isometric perspective view of the retractor mechanism of FIG. 25 with the solenoid housing exploded away therefrom.
Figure 30:
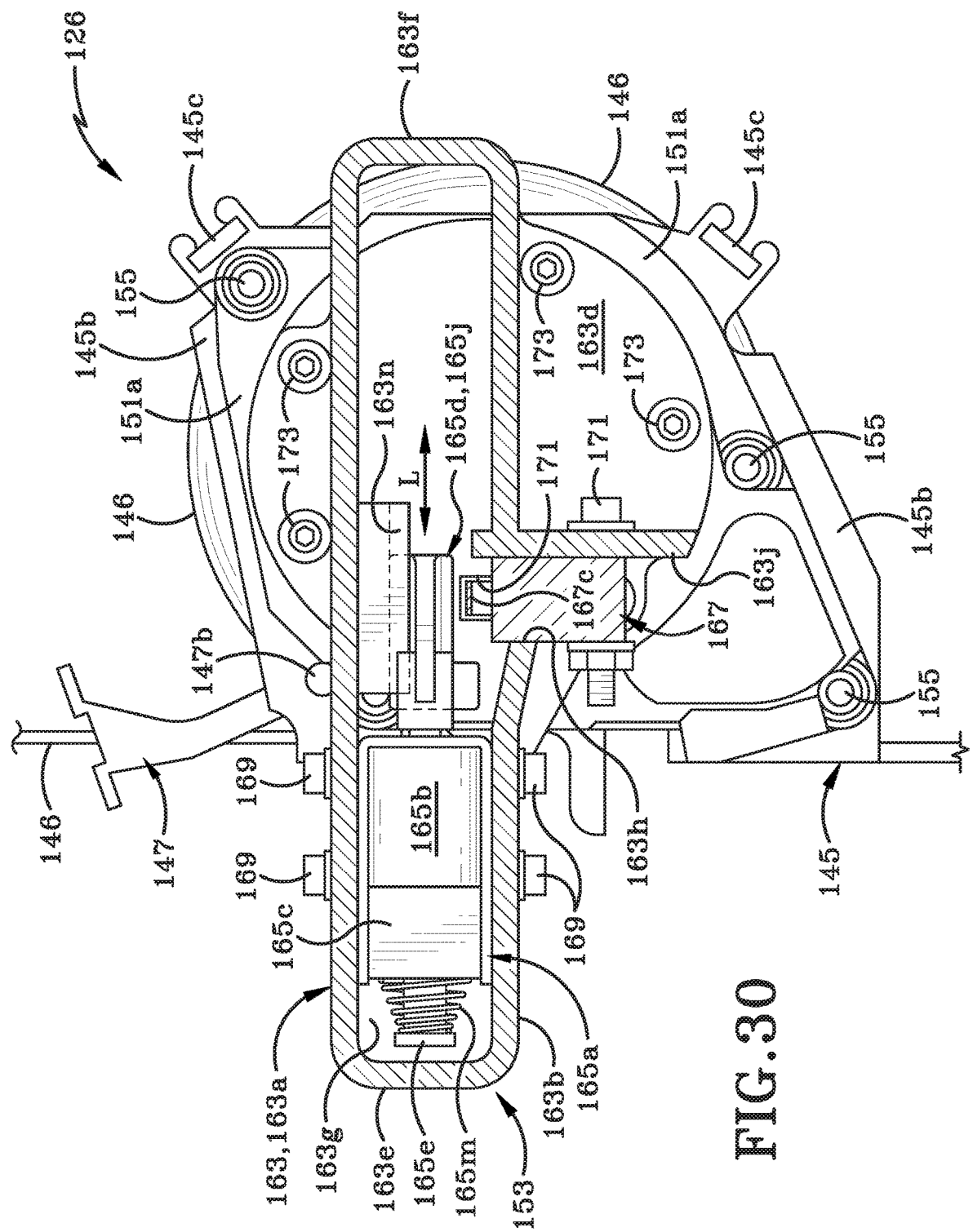
FIG. 30 is a cross-section through the retractor mechanism taken along line 30-30 of FIG. 25.

As indicated earlier herein, and as shown in FIGS. 25, 26 and 30, retractor assembly 126 includes solenoid assembly 153. Solenoid assembly 153 is positioned adjacent end wall 151d of second gear housing 151 and is secured thereto. Solenoid assembly 153 includes a solenoid housing 163 that has a top wall 163a, a bottom wall 163b, a front wall 163c, a back wall 163d, a first end wall 163e, and a second end wall 163f. Back wall 163d is shaped to be substantially complementary to end wall 151d of second gear housing 151 and is configured to be secured thereto. Solenoid housing 163 defines an interior cavity 163g. A notch 163h is defined in bottom wall 163b and a guide wall 163j defines one side of notch 163h. Guide wall 163j may be oriented at right angles to bottom wall 163b.

Figure 26A:
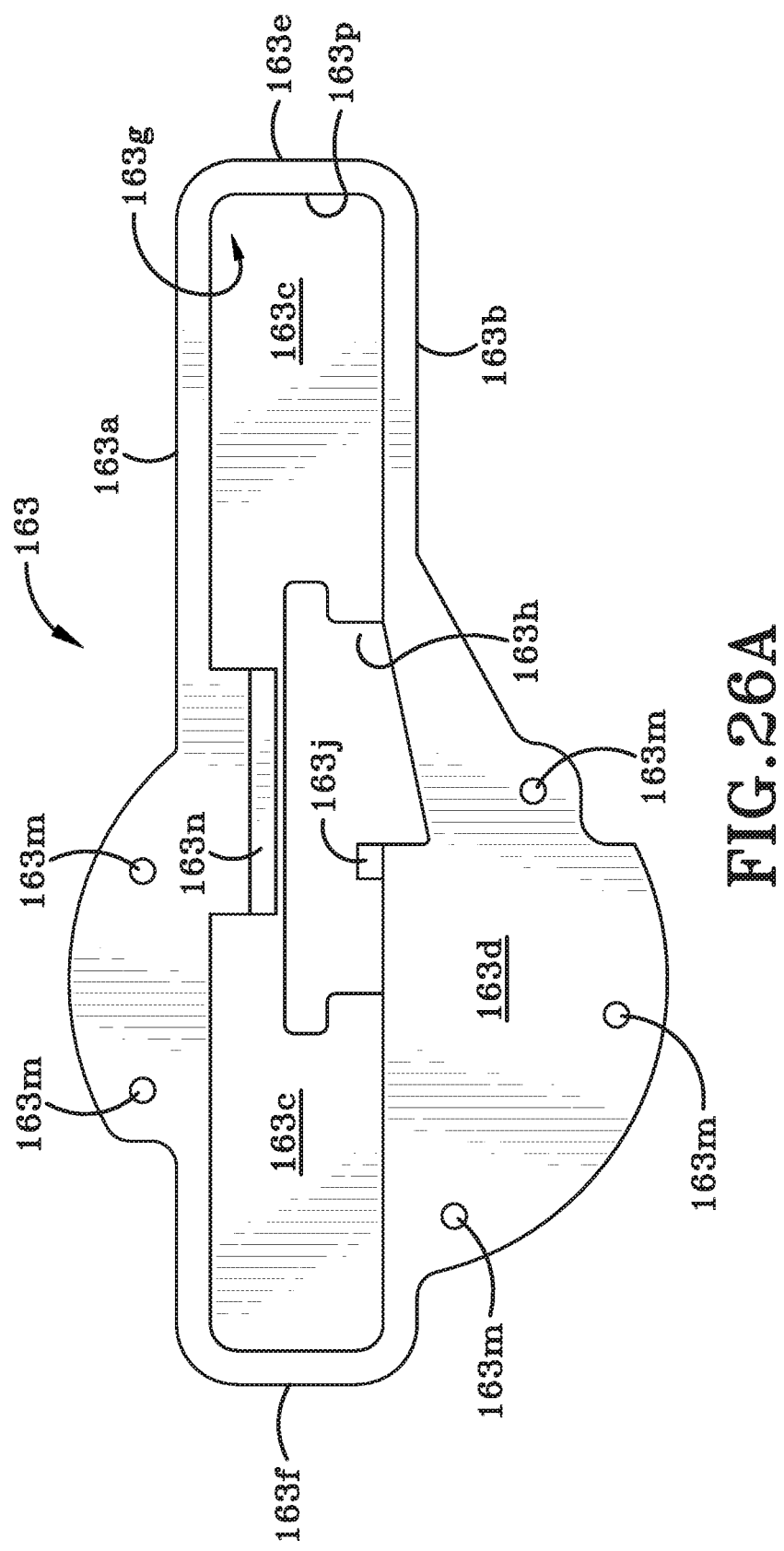
FIG. 26A is a rear elevation view of the solenoid housing shown on its own.

FIG. 26 shows that solenoid housing 163 defines one or more holes 163k in top wall 163a. One or more first holes 163k are defined in bottom wall 163b; one of the first holes defined in bottom wall 163b is visible in FIG. 26. The first holes 163k in top wall 163a and bottom wall 163b are vertically aligned with each other. One or more second holes 163m are defined in back wall 163d. Second holes 163m are positioned on back wall 163d so as to be alignable with holes 151h in end wall 151d of second gear housing 151. One or more third holes 163n are defined in guide wall 163j. FIG. 26A shows that back wall 163b of solenoid housing defines an opening 163p and a first aperture 163q therein. FIG. 30 shows a retaining flange 163r that extends downwardly from top wall 163a and together with end wall 151d retains and guides plate 165j in place.

A solenoid 165 and a limit switch 167 form part of solenoid assembly 153 and are engaged with solenoid housing 163. Solenoid 165 includes a slider housing 165a that defines a cavity in which at least a coil 165b and a magnet 165c are retained. A slider arm 165d extends outwardly from a first end of slider housing 165a. A plunger 165e extends outwardly from a second end of slider housing 165a. One or more holes 165f are defined in an upper wall of slider housing 165a and these holes 165f are located to align with holes 163k in top wall 163a of solenoid housing 163. As shown in FIG. 26, fasteners 169 are inserted through the aligned holes 163k, 165f to secure slider housing 165a within solenoid housing 163.

Figure 26B:
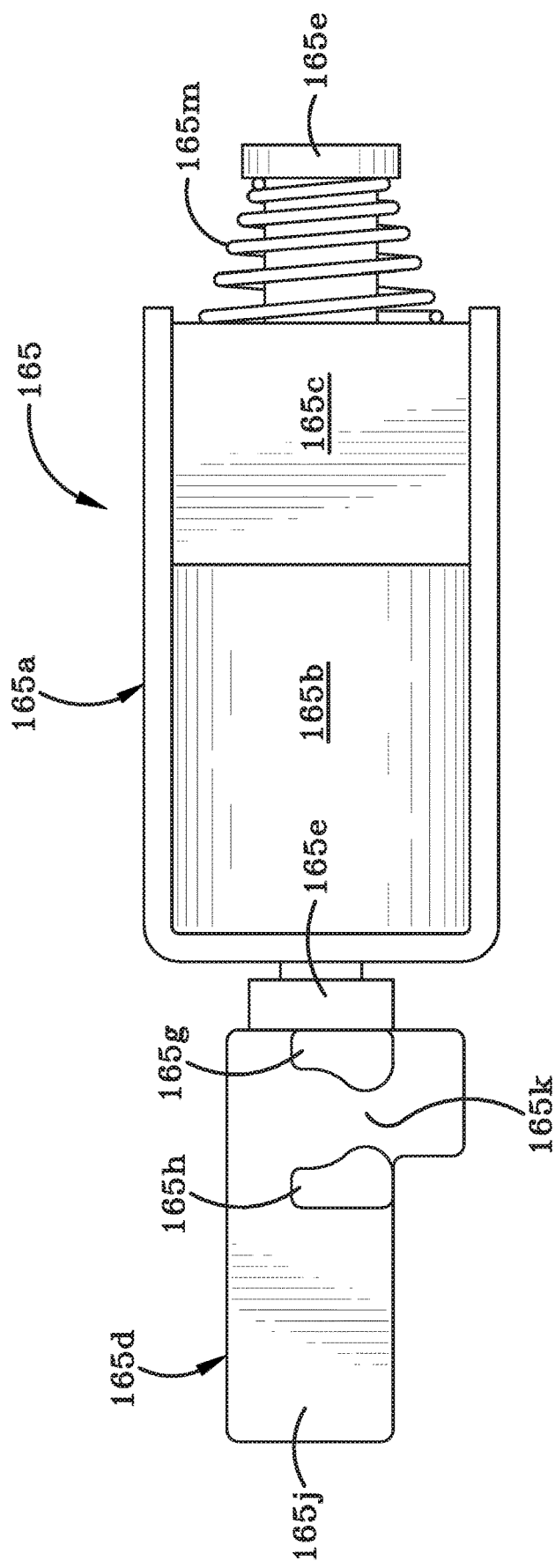
FIG. 26B is a rear elevation view of the solenoid shown on its own.

FIG. 26B shows solenoid 165 shown on its own. As is evident from this figure, slider arm 165d includes a first finger 165g and a second finger 165h that project outwardly from a plate 165j. First finger 165g and second finger 165h are spaced laterally a distance apart from each other by a gap 165k.

FIG. 30 shows that a coil spring 165m is located around a portion of plunger 165e. Wiring 121b (FIG. 24) is operatively engaged with solenoid 165 and with the vehicle's computer system 119. When solenoid 165 is actuated electrically, the plunger 165e moves from the position shown in FIG. 30 towards second end wall 163f, compressing spring 165m as it moves. Slider arm 165d moves in unison with plunger 165e. Consequently, movement of plunger 165e towards second end wall 163f also causes slider arm 165d to move towards second end wall 163f. When solenoid 165 is deactivated, then coil spring 165m returns to its original position (FIG. 30) drawing plunger 165e back towards first end wall 163f and similarly moving slider arm 165d to move back towards first end wall 163f. The reciprocal linear movement of slider arm 165d is indicated by the arrow "L" in FIG. 30.

FIG. 26B and FIG. 33 show that plate 165j is positioned to be aligned with first aperture 151g in end wall 151d of second gear housing 151. As can be seen in FIG. 33, arm 161b of trigger 161 is located within the gap 165k separating first finger 165g from second finger 165h. When solenoid 165 is actuated and slider arm 165d is moved in either of the directions indicated by arrow "L" in FIG. 30, the first and second fingers 165g, 165h will move arm 161b of trigger 161 with them as they move. This motion will cause trigger 161 to pivot about second pin 151m between the positions shown in FIGS. 35 and 36. The V-shaped flange 151q will tend to limit the pivotal motion of trigger 161 between the positions shown in FIGS. 35 and 36. As trigger 161 pivots, the leg 161c of trigger 161 may be moved between a first position (FIG. 35) and a second position (FIG. 36).

When slider arm 165d is in the position shown in FIG. 30, trigger 161 is in the first position (FIG. 35) and leg 161c is spaced a distance away from teeth 144b of ratchet wheel 144. Ratchet wheel 144 is therefore free to rotate with the spool in a first direction or in a second direction. The possible rotational directions of ratchet wheel 144 are indicated by the arrows "M" in FIG. 35.

When slider arm 165d is moved in the direction of "L1" (FIG. 36), i.e., slider arm 165 is moved towards second end wall 163f of solenoid housing 163, trigger 161 is moved to the second position (FIG. 36) and leg 161c comes into contact with teeth 144b of ratchet wheel 144. When leg 161c comes into contact with teeth 144b, rotational motion of ratchet wheel 144 is limited to a single direction that is indicated by arrow "N" in FIG. 36.

Leg 161c therefore selectively acts as a locking pawl that, when engaged, prevents ratchet wheel 144 (and thereby the spool 142) from rotating about an axis extending along axle 143 in one direction. When leg 161c effectively prevents rotation of the spool 142 in the one direction, it prevents seatbelt webbing 146 from being unwound from the spool. Spool 142 is, however, still able to be rotated in the opposite direction so that the seatbelt webbing 146 can be wound onto spool 142.

When solenoid assembly 153 is actuated so that slider arm 165d moves in the opposite direction, leg 161c moves out of engagement with the teeth 144b of ratchet wheel 144 and ratchet wheel 144 is then free rotate in either direction. Seatbelt webbing 146 can therefore be unwound from the spool 142 or may be wound onto the spool 142.

Figure 27:
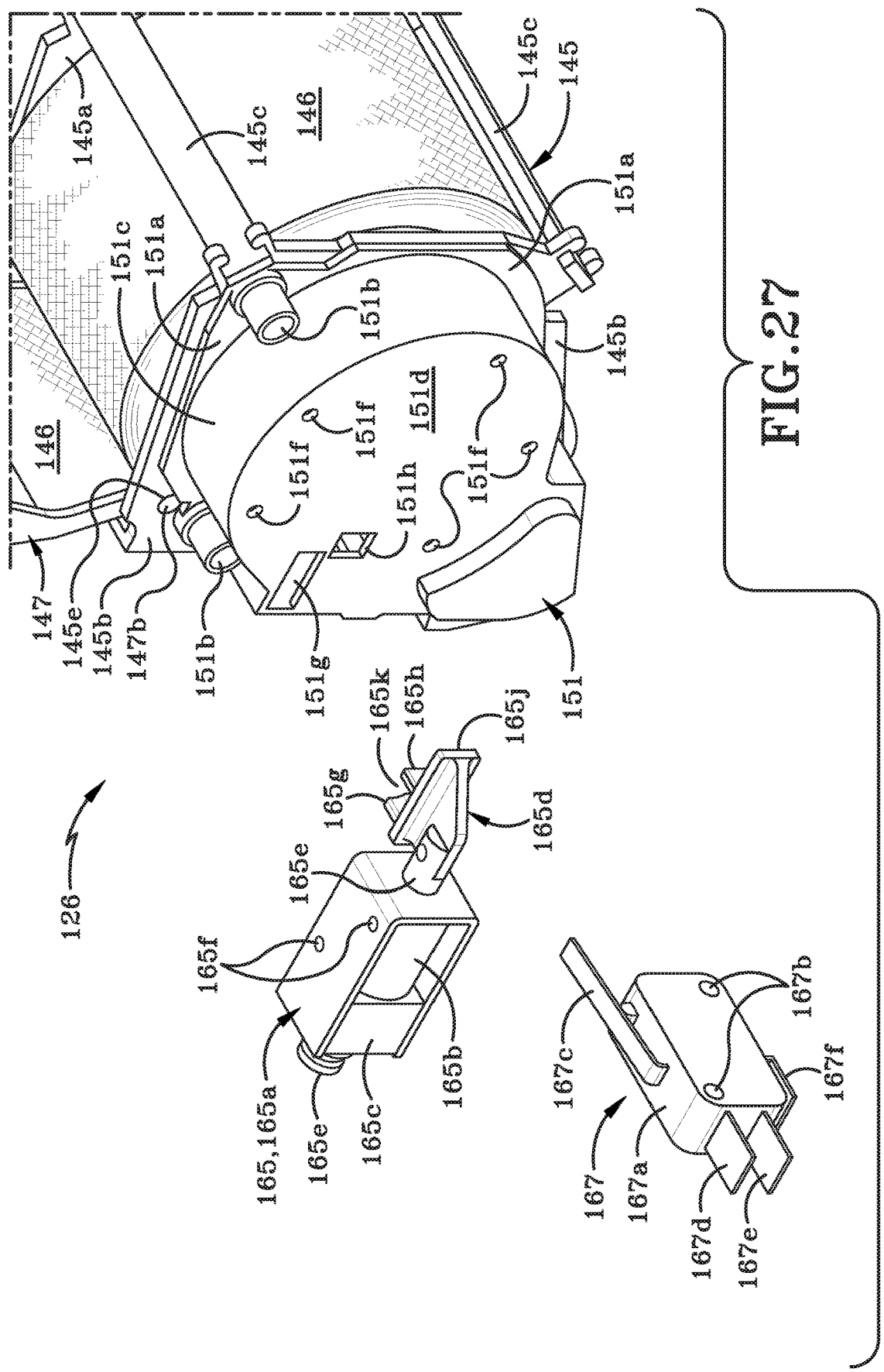
FIG. 27 is a partially exploded isometric perspective view of the retractor mechanism with the solenoid and the limit switch exploded away therefrom.

As indicated earlier herein, solenoid assembly 153 also includes a limit switch 167. FIG. 27 shows that limit switch 167 includes a body 167a that defines one or more holes 167b therein. A first prong 167c extends outwardly from body 167a in a first direction and a second prong 167d, a third prong 167e, and a fourth prong 167f that extend outwardly from body 167a in a second direction. FIG. 24 shows that wiring 121a is operatively engaged with limit switch 167 and with vehicle's computer system 119. Limit switch 167 is secured to a portion of solenoid housing 163 by a plurality of fasteners 171 that extend through holes 163n of solenoid housing 163 and into holes 167b defined in body 167a of limit switch 167. Limit switch 167 is located on solenoid housing 163 in a position that is vertically below slider arm 165d. When solenoid housing 163 is engaged with end wall 151d of second gear housing 151, first prong 167c extends through second aperture 151h of end wall 151d. The position of limit switch 167 relative to end wall 151d is shown in FIG. 26.

FIG. 25 shows that fasteners 173 are used to secured back wall 16ed of solenoid housing 163 to end wall 151d of second gear housing 151. Fasteners 173 are inserted through holes 163m of solenoid housing 163 that are aligned with holes 151f in end wall 151.

Figure 35:
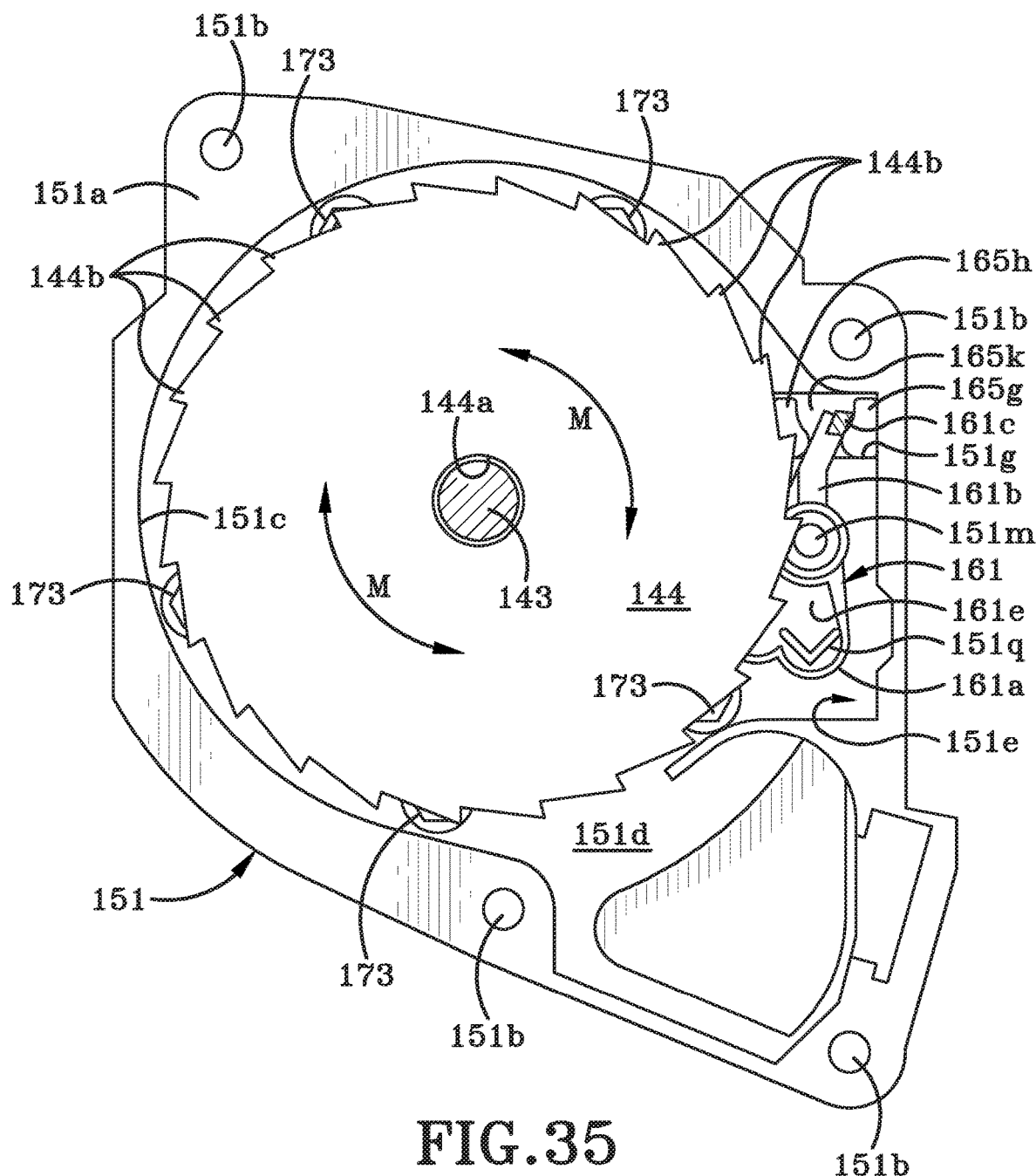
FIG. 35 is rear elevation view of the second gear housing showing the rotation of the ratchet wheel.
Figure 36:
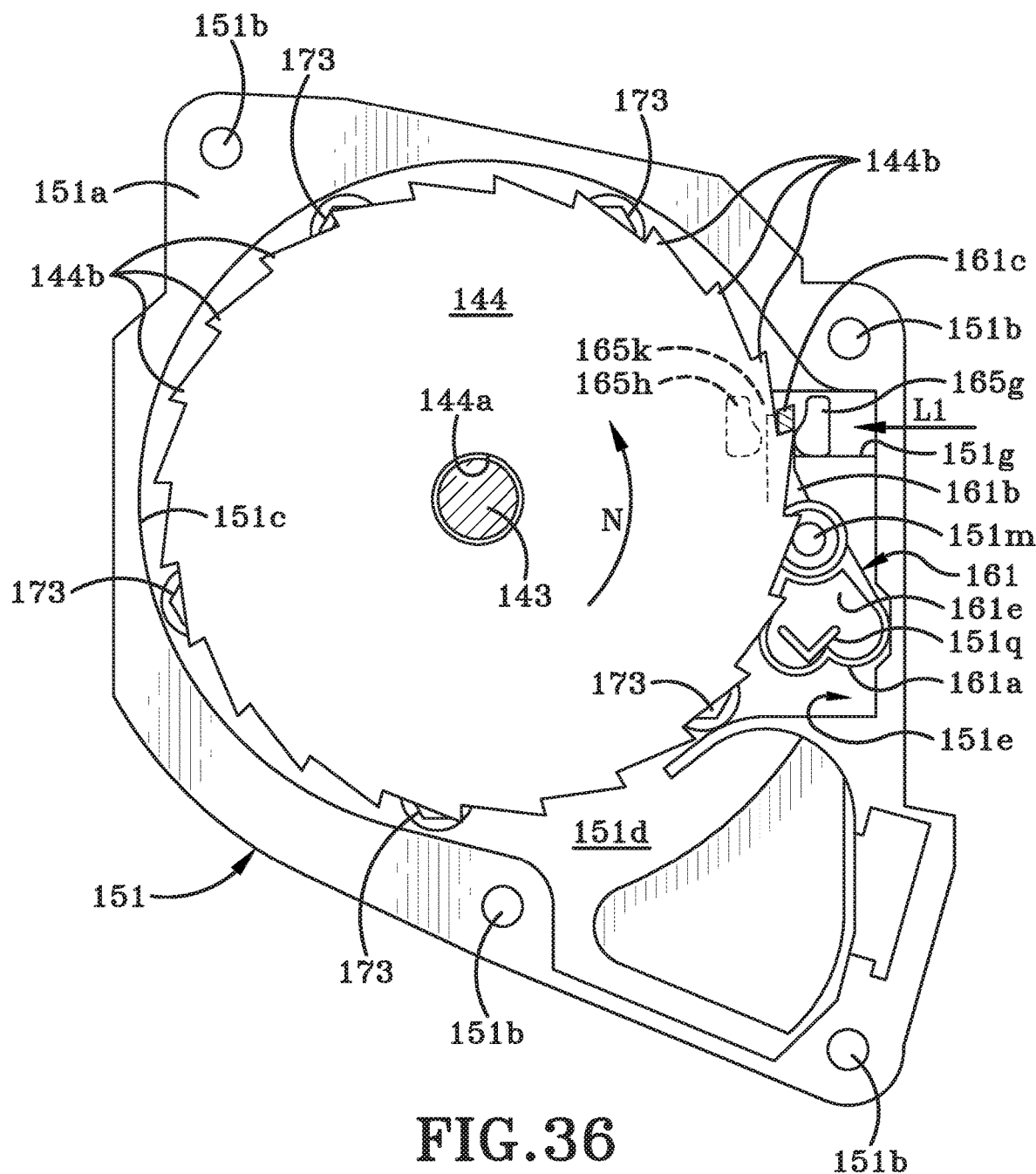
FIG. 36 is a rear elevation view of the second gear housing showing linear movement of the slider arm.

When limit switch 167 is actuated, first prong 167c moves from the position shown in FIG. 33 to the position shown in FIG. 35. The component that actuates limit switch is second gear 159. When second gear 159 rotates in the direction of arrow "P" from the position shown in FIG. 33 to the position shown in FIG. 34, shoulder 159j is rotated to a position where it contacts an upper surface of first prong 167c and pushes first prong 167c downwardly within second aperture 151h. This motion actuates limit switch 167 which transmits a signal, particularly an electrical signal, to computer system 119 via wiring 121a. The computer system 119 then activates solenoid 165 (sending an electrical signal to solenoid 165 by way of wiring 121b), moving solenoid arm 165d from the position shown in FIG. 33 to the position shown in FIG. 36.

Figure 37:
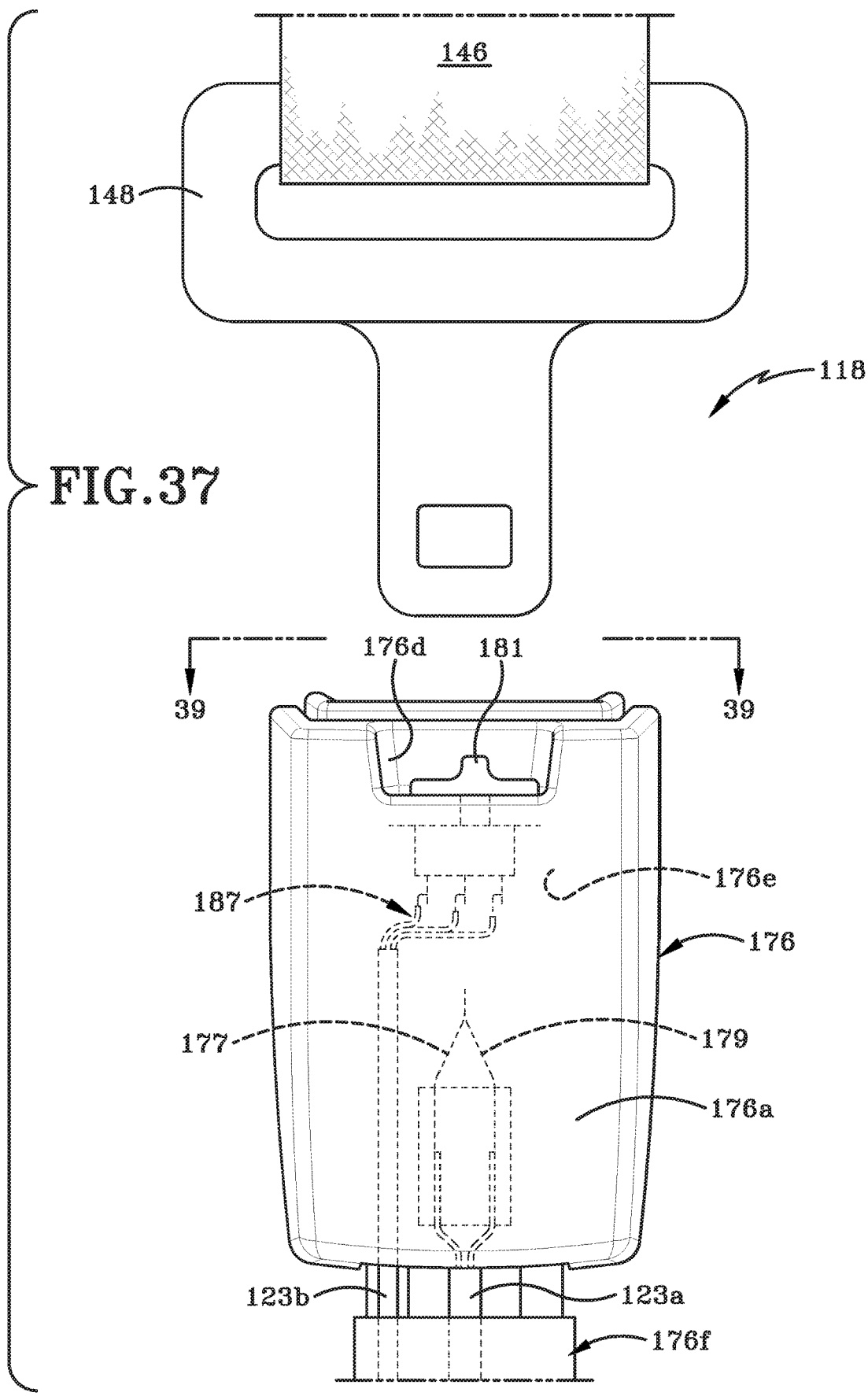
FIG. 37 is a partial front elevation view of the buckle assembly with the tongue on the seatbelt webbing poised to be inserted into the buckle; and showing the actuation switch and, in phantom, electronic components of the switch within the interior of the buckle in a first position.
Figure 38:
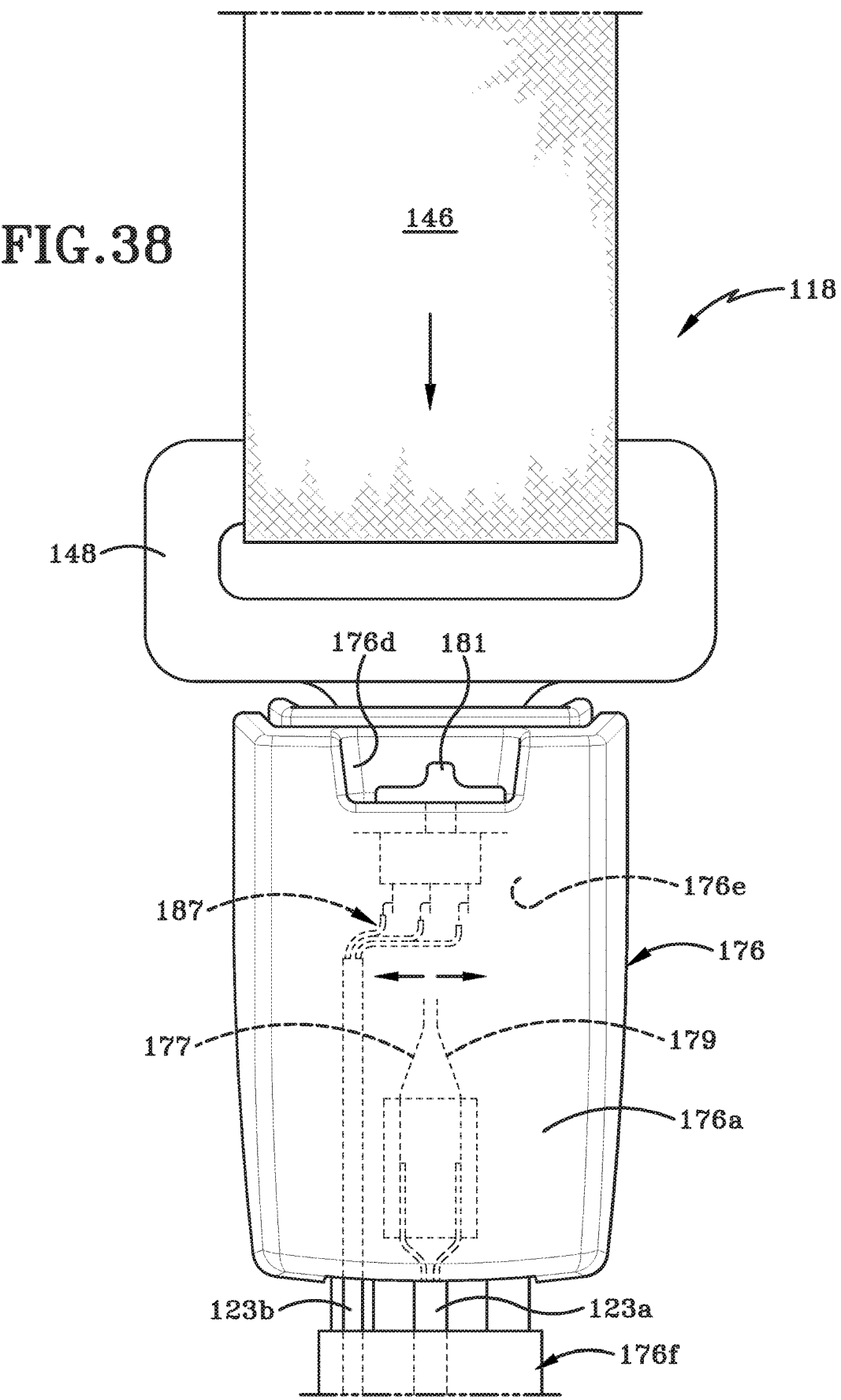
FIG. 38 is a partial front elevation view of the buckle assembly with the tongue inserted into the buckle and showing, in phantom, electronic components of the switch moved to a second position.
Figure 39:
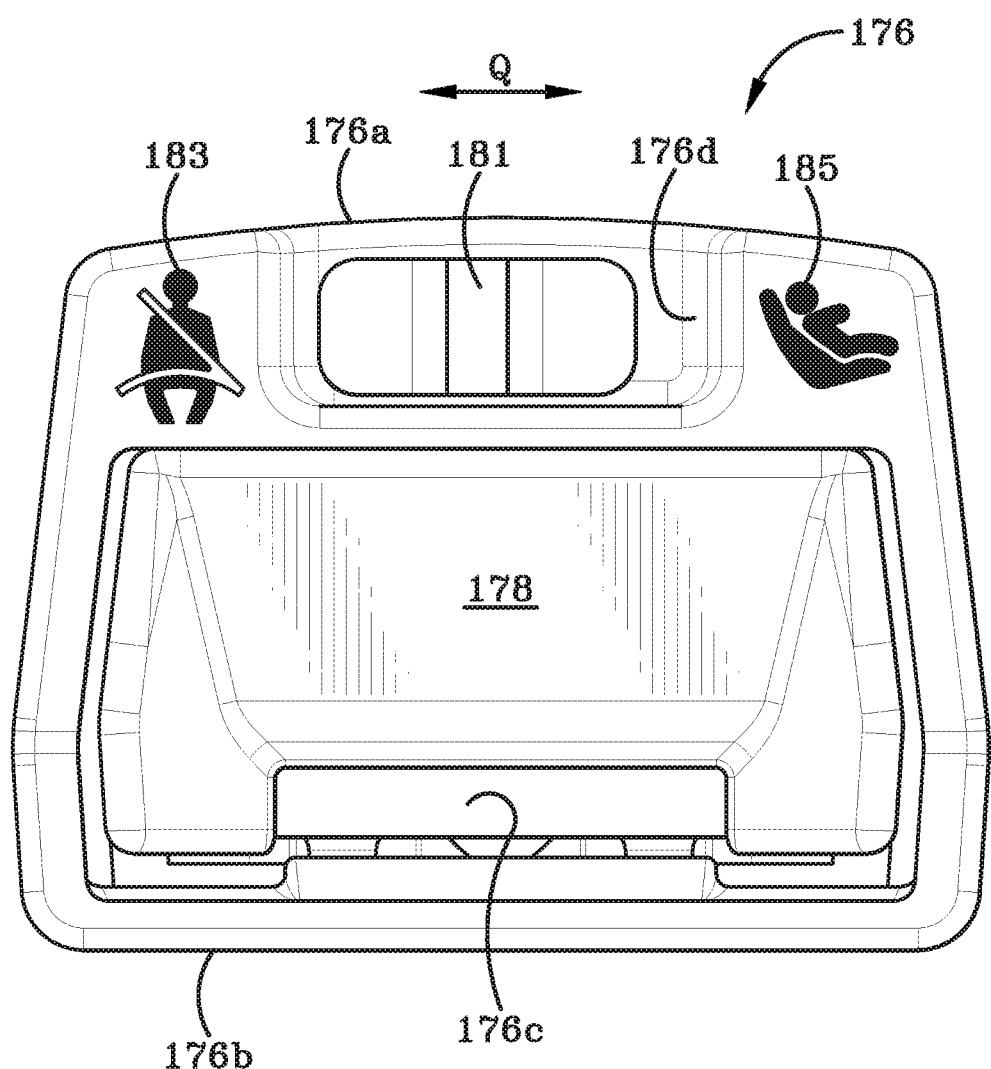
FIG. 39 is a top plan view of the buckle showing the switch that is movable in either of a first direction or a second direction.

FIGS. 37 to 39 illustrate buckle assembly 118 in greater detail. FIG. 37 shows locking tongue 148 disengaged from buckle assembly 118. Buckle assembly 118 comprises a housing 176 that includes buckling mechanism 178 (FIG. 39) therein that is similar to buckling mechanism 78 provided in housing 76. Housing 176 is comprised of a first side 176a and a second side 176b that are secured together in any suitable manner and capture buckling assembly 178 between them. When first and second sides 176a, 176b are secured to each other, an opening 176c to a cavity 176e is defined between buckling mechanism 178 and second side 176b.

A tether connector 176f is provided on housing 176. Tether connector 176f extends outwardly from housing 176 and secures housing 176 to the frame of the vehicle.

In accordance with the present disclosure, a first contact 177 and a second contact 179 are provided within an interior of housing 176. First contact 177 and second contact 179 are brass components that are configured to be moved laterally towards each other or away from each other as will be described later herein. First and second contacts 177, 179 are in abutting contact with each other when locking tongue 148 is not inserted and engaged in buckle housing 176. First contact 177 and second contact 179 are operatively engaged with wiring 123a that extends between buckle assembly 118 and the vehicle's computer system 119. When locking tongue 148 is inserted into buckle housing 176, first and second contacts 177, 179 are moved apart from each other. This is how the buckle assembly "senses" if the locking tongue 148 is engaged in buckle housing 176 or not. If the locking tongue 148 is inserted into buckle housing 176 and contacts 177, 179 move apart, a signal is sent to the remote vehicle computer 119 that locking tongue 148 is in the locked condition.

It should be noted that insertion of the locking tongue in other example embodiments of the seatbelt system may cause the contacts 177, 179 to move towards each other while disengaging the locking tongue 148 from the buckle housing 176 may move the contacts 177, 179 away from each other. Any other suitable electronic mechanism for indicating the locking tongue 148 is engaged or disengaged with respect to buckle housing 176 may be utilized.

Housing 176 defines a depression 176d in a top region of first side 176a. An actuating switch 181 is provided within depression 176d and switch 181 is operatively engaged with wiring 123b that extends between buckle assembly 118 and the vehicle's computer system 119. Switch 181 is selectively movable by a user in a first direction or in a second direction. The linear movement of switch 181 is indicated by arrow "Q" in FIG. 39. Switch 181 allows the seatbelt system to be placed into one of two modes. Those two modes may be described as "adult mode" or "car seat mode".

A first indicator 183 may be located on the top surface of first side 176a of housing 176 and on a first side of depression 176d. A second indicator 185 may be located on the top surface of first side 176a of housing 176 and on a second side of depression 176d. It will be understood that first and second indicators 183, 185 may, alternatively, be provided in other locations, such as on one side of the actual switch 181 and on the other side of the actual switch 181. First indicator 183 may be a pictorial representation of an adult being secured by a seatbelt while second indicator 185 may be a pictorial representation of a child sitting in a child seat. The first indicator 183 and second indicator 185 are provide to inform a user as to which way they need to move switch 181 based on whether an adult or youth will be using the seatbelt to secure themselves into the vehicle or whether a child seat will be restrained by the seatbelt. The user will move the switch 181 in a selected direction toward the one of the first indicator 183 or second indicator 185 representing the type of use to which the seatbelt system is to be put. Switch 181 may be moved toward first indicator 183 when it is desired that an adult or a youth be able to buckle themselves into the vehicle using the seatbelt system 114, i.e., to use the seatbelt in "adult mode". Switch 181 may be moved toward second indicator 185 when it is desired that a child seat be firmly secured against a vehicle seat, i.e., to use the seatbelt in "car seat mode".

FIG. 38 illustrates electronic wiring 187 connecting switch 181 to wiring 123b that is linked to the vehicle's computer system 119. When switch 181 is moved in the direction towards first indicator 183 in FIG. 37, i.e., into "adult mode" then the adult or youth may use seatbelt system 114 in the same manner as any other seatbelt system. When switch 181 is moved in the direction towards second indicator 185 in FIG. 38, i.e., into "car seat mode" then a signal is sent from switch 181 to the remote vehicle computer 119 via wiring 123b to indicate that the switch is in "car seat mode". When the locking tongue 148 is inserted into buckle housing 176, then first and second contacts 177, 179 are moved laterally apart from each other and into the position shown in FIG. 38. A signal is then sent, via wiring 123a to the remote vehicle computer 119 to indicate that the locking tongue is engaged.

Seatbelt system 114 functions in a similar manner to seatbelt system 14 except that where mechanical components such as the cable 74 were utilized in seatbelt assembly 16 and buckle assembly 18, some of those mechanical components have now been replaced with electronic components. The physical slider of switch 181 activates the electronic components inside the buckle housing 176 (i.e., contacts 177, 179). The slider may be replaced with a hall-effect sensor, a reed switch and could be a plurality of sensors or switches. When the switch 181 on the buckle housing is set to "car seat mode", the system behaves identically to the buckle-controlled mechanism described above with respect to the first embodiment of the seat belt system.

Essentially, there are now three conditions that need to be met to activate locking of the retractor mechanism. Firstly, the locking tongue 148 needs to be engaged in the buckle housing 176. Secondly, the switch 181 must be in "car seat mode", i.e., pushed towards second indicator 185. Thirdly, the seatbelt webbing 146 must be pulled out. When the switch 181 is set to "adult mode", i.e., is pushed towards the first indicator 183, the retractor mechanism never enters into a locked condition. Because the retractor mechanism is not in a locked condition, adult passengers or youth are able to move around while secured in place with the seatbelt system; they can reach for something or otherwise pull out the seatbelt webbing 146 freely without triggering a nuisance locking of the retractor mechanism. Similarly, children, whether in a car seat or not, will not be able to accidentally entangle themselves with an unused seatbelt while the switch is set to adult mode, because the retractor mechanism will never lock. Moving the switch 181 to "adult mode" (i.e., towards first indicator 183) while the locking tongue 148 is engaged within buckle housing 176 does not do anything since the mode of the switch 181 only matters at the point when the webbing is fully pulled out. It is also contemplated that the releasing of the locking tongue 148 from the buckle housing 176 will automatically move the switch 181 to adult mode. This may be accomplished by the provision of a small mechanical linkage. This feature will minimize the risk of adults dealing with accidental locking of the retractor mechanism while adding only a minor burden to users who will be installing a car seat because the user will have to slide the switch 181 every time into car seat mode. They cannot simply set the switch 181 in car seat mode once. The switch 181 has to be placed in car seat mode every time the user installs a car seat in the vehicle.

In a simplified system, to engage the ALR, the user must perform two steps, with each step helping to decrease the chances of accidental ALR entanglement. These steps may be performed in any order in some instances and in a specific order in other instances. The ALR is disengaged until the seat belt tongue is inserted into the buckle housing. This "primes" the ALR, i.e., the system is ready but is not yet in a locked position. The user may pull a length of the seatbelt webbing out from the retractor mechanism and this engages the ALR. To disengage the ALR, the user disengages the locking tongue from the buckle housing. The motion of disengaging the locking tongue from the buckle housing both disables and disengages the ALR.

In the second embodiment, the user must perform three steps, with at the first two steps being undertaken in any order. The first two steps are engagement of the locking tongue 148 in the buckle housing 176 and moving the switch 181. All controls are located within the user's area of visual focus. The ALR is disengaged until the locking tongue 148 is inserted into the buckle housing 176. The user has to slide or move the ALR interface (i.e., the switch 181) from the "adult mode" to the "car seat mode". The motion of the switch 181 to the car seat mode enables the ALR.

The user may also pull the seatbelt webbing 146 partially or completely out of the retractor mechanism 126. The motion of pulling the seatbelt webbing 146 out of the retractor mechanism 126 engages the ALR. In particular, if the seatbelt webbing 146 is pulled all of the way out of the retractor mechanism, the ALR is engages. After the ALR is engaged, if the user slides the ALR interface (i.e., switch 181) back to its original position (i.e., moves the switch 181 from "car seat mode" back to "adult mode"), then the ALR will remain engaged. The ALR is only disabled and disengaged when the user depresses a button to release the locking tongue 148 from the buckle housing 176.

It should be noted that the step of pulling the seatbelt webbing 146 out of the retractor mechanism 126 may be undertaken after the previously listed two steps of engaging the locking tongue 148 in the buckle housing 176 and moving the switch 181. In other instances, however, the seatbelt webbing 146 may be pulled out of the retractor mechanism 126 before one or both of the other two steps.

Instead of providing the switch 181 on the buckle housing 176 that has to be moved from "adult mode" to "car seat mode", a lever or button may be provided on each vehicle seat or on the vehicle pillar adjacent each retractor mechanism, or at any other location where it may be readily seen by the user. If the switch is replaced, then the user may have to perform two steps to engage the ALR. After buckling the seat belt (i.e., inserting locking tongue 148 into buckle housing 176) the user must pull the lever or push the button to enable the ALR. The user will then pull the webbing 146 completely out of the retractor mechanism 126. This engages the ALR. The engaged status of the ALR may be indicated by a LED becoming illuminated on the buckle housing 176, or on the retractor mechanism 126, or on the lever or button. If the LED does not illuminate, then the user knows the ALR is not engaged. The LED should come on and stay on to indicate to the user that the ALR is engaged. A cover may be positioned over the lever or button when the lever is not being actively engaged so as to protect the lever. Disengaging and disabling the ALR is accomplished by releasing the locking tongue 148 from the buckle housing 176.

As indicated above, buckle assembly 16 included a mechanical cable 74 that was used to indicate to the rest of the system when the tongue 48 was inserted into the buckle assembly 16. In buckle assembly 116, the mechanical cable 74 is replaced with wiring 123a, 123b that extends outwardly from the buckle assembly housing 176. Wiring 123a enables the system to know when the locking tongue 148 is inserted into the buckle assembly 176. A wiring 123b connects to switch 181 on the buckle assembly housing 176. This wiring 123b lets the system know whether the switch 181 is set to "car seat mode" or "adult mode". The wiring 123a, 123b connects buckle assembly 118 to the vehicle's onboard computer 119. Retractor mechanism 126 is connected to computer 119 by wiring 121a, 121b. Limit switch 167 that forms part of retractor mechanism 126 is connected to computer 119 by wiring 121a. The solenoid 165 that forms part of the retractor mechanism 126 is connected to the vehicle's onboard computer 119 via wiring 121b. The solenoid 165 controls whether the retractor mechanism 126 is in a locked state (i.e., pawl 161b is engaged with ratchet wheel 144) or in an unlocked state (i.e., pawl 161b is not engaged with ratchet wheel 144). Switch 167 on the retractor mechanism 126 essentially lets the vehicle's onboard computer 119 know whether the webbing 146 is fully pulled out or not.

The second embodiment of the seatbelt system 114 is utilized in the following manner.

The child seat is placed on the vehicle seat. The user then holds onto the locking tongue 148 and threads the lap and shoulder portions of the seatbelt webbing 146 through a belt path of the child seat. The instructions for the child seat will show a person how to accomplish the above steps.

The locking tongue 148 is then inserted into the buckle housing 176 and is pushed downwardly until it clicks. As indicated earlier, when locking tongue 148 is engaged in housing 176, contacts 177 and 179 are pushed apart and an electrical signal is sent via wiring 123a to computer 119. The buckle stalk or tether 176d on buckle assembly 118 should be positioned so that a user can readily and easily reach the release button on the buckle housing 176 if needed.

The switch 181 on the buckle housing 176 is then moved to the "car seat mode". This action sends another signal to computer 119. The user will pull the seatbelt webbing 146 all of the way out of the retractor mechanism 126 in order lock the retractor mechanism 126. As the spool 142 rotates to allow the webbing 146 to unwind therefrom, axle 143 rotates which in turn causes gear 157 to rotate (because teeth 143a on axle 143 mesh with teeth 157b on gear 157. Gear 157 in turn causes second gear 159 to rotate. Shoulder 151h on second gear 159 pushes downwardly on first prong 167c of limit switch 167. When first prong 167c reaches a specific point, limit switch 167 is triggered and a signal is sent via wiring 121a to computer 119. The computer 119 in turn sends a signal to solenoid 165 via wiring 121b. Slider arm 165d is moved linearly within solenoid housing 153 and into a position where first and second fingers 165g, 165h pivot trigger 161 from the position shown in FIG. 33 to the position shown in FIG. 36. In this latter position, the trigger arm 161b engages teeth 144b of ratchet wheel 144, locking the same against rotation in a direction that permits webbing 146 to be fed off spool 142. Retractor mechanism 126 is then locked; the third condition that is required to correctly restrain the car set. When the retractor lock is set, the user will be able to tighten the seatbelt (by feeding seatbelt webbing 146 back into the retractor frame 145 and onto spool 142) but the user will not be able to pull seatbelt webbing 146 out of the retractor frame 145 and off spool 142. The user should check that the retractor mechanism 126 is locked by trying to pull a length of seatbelt webbing 146 out of the retractor frame 145. If seatbelt webbing 146 is able to be pulled out of the retractor frame 145, then the retractor mechanism 126 is not in a locked condition. If seatbelt webbing 146 cannot be pulled out of the retractor frame 145, then the retractor mechanism 126 is in the locked condition.

To tighten the seatbelt and secure the child car seat in place properly, the user will push down on the child car seat (i.e., inwardly toward vehicle seat 10), pull the shoulder portion of the seatbelt webbing 146 to tighten the lap portion of the seatbelt, and then feed the shoulder belt portion of the webbing 146 back into the retractor frame and onto the spool 142. For forward facing child car seats a top tether should be engaged. Tether instructions will be provided in the child restraint instructions and in the vehicle manual's "Tether" section.

Before a child is placed in the child car seat, the user should make sure the child car seat is securely held in place. To check this, the user should grasp the child car seat at the safety belt path and try to move the child car seat from side-to-side and back-and-forth. When the child car seat is properly installed, there should be no more than about one inch (2.5 cm) of movement of the child car seat.

To later remove the child car seat, the locking tongue 148 can simply be disengaged from the buckle housing 176 in the usual manner. The seatbelt webbing 146 can then be threaded back out of the belt path on the child car seat and then the child car seat can be removed from the vehicle.

In summary, seatbelt system 114 is used in the following manner. A method of locking a retractor mechanism 126 to secure a child car seat 12 against a vehicle seat 10 comprising engaging a locking tongue 168 on a length of seatbelt webbing 146 into a cavity 176e of a buckle housing 176; sending a first electrical signal (via wiring 123a) to a computer 119 when the locking tongue 148 is engaged in the buckle housing 176; moving a switch 181 on the buckle housing 176 into a first position (i.e., towards the car seat indicator 185); sending a second electrical signal (via wiring 123*b*) to the computer 119 when the switch 181 is moved to the first position (i.e., towards the car seat indicator 185); unwinding some or all of the seatbelt webbing 146 wound around a spool 142 of a retractor mechanism 126; sending a third electrical signal (via wiring 121*a*) to the computer 119 when all of the seatbelt webbing 146 has been unwound from the spool 142; and locking the spool 142 against rotation in a direction that will unwind seatbelt webbing 146 from the spool 142.

The method may further comprise moving one or both of a first electrical contact 177 and a second electrical contact 179 within the buckle housing 176 apart from each other when the locking tongue 148 is engaged within the cavity 176*e* of the buckle housing 176.

The method may further comprise sending a signal (via wiring 121*b*) from the computer 119 to a solenoid slider 165 after the third electrical signal is received by the computer 119; moving the solenoid slider 165*d* from a first location (FIGS. 30 & 33) to a second location (FIG. 36) relative to a housing 163 of the retractor mechanism 126; moving a pawl 161*b* in the retractor mechanism 126 from a first position (FIG. 33) to a second position (FIG. 36) when the solenoid slider 165 is moved to the second location (FIG. 36); engaging a ratchet wheel 144 with the pawl 161*b*; wherein the ratchet wheel 144 is secured to the spool 142 and rotates in unison therewith; and permitting rotation of the ratchet wheel 144 and the spool 141 in only one direction when the pawl 161*b* engages the ratchet wheel 144, where that direction is a direction that permits seatbelt webbing 146 to be wound onto the spool 142. (In other words, seatbelt webbing 146 cannot be rotated in the opposite direction that allows seatbelt webbing 146 to be unwound from spool 144.)

A method of securing a child car seat 12 in a vehicle 10 with a seatbelt 114, 146; said method comprising positioning a child car seat 12 on a vehicle seat 10; threading a length of a seatbelt webbing 146 through a belt path 12*c* provided on the child car seat 12; moving a switch 181 on a buckle housing 176 to a car seat mode 185; engaging a locking tongue 148 on the seatbelt webbing 146 in the buckle housing 176; engaging an automatic locking retractor mechanism 126; and preventing unwinding of the seatbelt webbing 146 from a spool 142 while permitting winding of the seatbelt webbing 146 onto the spool 142. The engaging of the automatic locking retractor mechanism 126 includes controlling rotation of a ratchet wheel 144 with a control mechanism 161, 165.

The method may further comprise sending an electronic signal to the computer 119 (via wiring 123*b*) to indicate the switch 181 is in the car seat mode 185; and sending an electronic signal to the computer 119 (via wiring 123*a*) to indicate the locking tongue 148 is engaged in the buckle housing 176. The method may further comprise sending a signal from the computer 119 to a control mechanism 161, 165 (via wiring 121*b*) operatively engaged with a ratchet wheel 144 associated with the spool 142.

Still further, the method may comprise unwinding some or all of the seatbelt webbing 146 wound around spool 142 of retractor mechanism 126. The method may further include sending an electronic signal to computer 119 (via wiring 121*a*) to indicate all the seatbelt webbing 146 is unwound from spool 142. The method may also include winding seatbelt webbing 145 back onto the spool 142 until the child car seat 12 is securely retained against the vehicle seat 10. The controlling of the rotation of the ratchet wheel 144 further includes moving a pawl 161 of the control mechanism 126 into engagement with the ratchet wheel 144. The moving of the pawl 161 includes moving a slider 165*d* of the retractor mechanism 126 from a first position (FIG. 30) to a second position (FIG. 36); capturing the pawl 161*d* in a gap defined between spaced-apart fingers 165*g*, 165*h* of the slider 165*d*; and rotating the pawl 161*d* from a first position (FIG. 34) where the pawl 165*d* is out of engagement with the ratchet wheel 144 to a second position (FIG. 36) where the pawl is in engagement with the ratchet wheel 144.

In order to remove the child car seat 12 from the vehicle 10, the method may further include disengaging the automatic locking retractor mechanism 126. The disengaging includes removing the locking tongue 148 from the buckle housing 176. The method may therefore further comprise returning the switch 181 on the buckle housing to a default position. The default position typically will be an adult mode position where an adult or older child may be readily secured in place with the seatbelt. However, it should be understood that that automatic locking retractor mechanism 126 may be substantially permanently retained in a car seat mode where it is usable to secure child car seat 12 in place. There is no need to move the automatic locking retractor mechanism 126 to the default position between usages of the seatbelt. The retractor mechanism 126 may cycle through numerous locks and unlocks of the seatbelt while being positioned in the car seat mode.

A method of securing a child car seat 12 in a vehicle 10 with a seatbelt 146 may comprise positioning a child car seat 12 on a vehicle seat 10; threading a length of a seatbelt webbing 146 through a belt path 12*c* (FIG. 1) provided on the child car seat 12; moving a switch 181 on a buckle housing 176 to a car seat mode (i.e., toward indicator 185); sending an electronic signal (via wiring 123*b*) to the computer 119 to indicate the switch 181 is in the car seat mode (i.e., moved toward indicator 185); engaging a locking tongue 148 on the seatbelt webbing 146 in the buckle housing 176; sending an electronic signal (via wiring 123*a*) to the computer 119 to indicate the locking tongue 148 is engaged in the buckle housing 186; engaging an automatic locking retractor mechanism 126; and preventing unwinding of the seatbelt webbing 146 from a spool 142 while permitting winding of the seatbelt webbing 146 onto the spool 142. The method may further include. sending an electronic signal (via wiring 121*b*) from the computer 119 to a control mechanism 165, 161 operatively engaged with a ratchet wheel 144 associated with the spool 142 and controlling rotation of the ratchet wheel 144 with the control mechanism 165, 161. The method may further include preventing rotation of the ratchet wheel 144 in a direction that unwinds seatbelt webbing 146 from the spool 142. The method may further include unwinding some or all of the seatbelt webbing 146 wound around a spool 142 of a retractor mechanism 126; sending an electronic signal (via wiring 121*a*) to a computer 119 to indicate that all the seatbelt webbing 146 is unwound. The method may further include winding seatbelt webbing 146 back onto the spool 142 until the child car seat is securely retained against the vehicle seat 10. The preventing of rotation of the ratchet wheel 144 further includes moving a pawl 161*b* of the control mechanism 165, 161 into engagement with the ratchet wheel 144. The moving of the pawl 161*b* includes moving a solenoid slider 165*d* of the retractor mechanism 126 from a first position (FIGS. 30 & 33) to a second position (FIG. 36); capturing the pawl 161*b* in a gap defined between spaced-apart fingers 165*g*, 165*h* of the solenoid slider 165*d*; and rotating the pawl 161b from a first position (FIG. 30), where the pawl 165b is out of engagement with the ratchet wheel 144, to a second position (FIG. 36) where the pawl 161b is in engagement with the ratchet wheel 144.

When the user no longer wishes to retain the child car seat 12 against the vehicle seat 10 he or she will simply disengage the automatic locking retractor mechanism 126. The step of disengaging may include removing the locking tongue 148 from the buckle housing 176. The step of disengaging may, in some instances, further include returning the switch 181 on the buckle housing 176 to a default position (FIG. 39). The default position is adult mode 183. Once locking tongue 148 has been released from buckle housing 178, the seatbelt webbing 146 may be withdrawn from the belt path 12c on the car seat 12 and the car seat 12 may be removed from the vehicle. If the switch 181 is kept in the same position (i.e., the car seat mode 185), then the various components remain ready to lock a child car seat 12 in place.

If, however, the switch 181 is moved to the default position (i.e., adult mode 183), then when the user releases locking tongue 68, the trigger 161 pivots back to its original position (FIG. 33), solenoid slider 165 returns to its rest position (FIG. 30), and electrical contacts 177, 179 return to the position where they are in abutting contact with each other (FIG. 37O). Because trigger 161 pivots back to its original position, the pawl 161b (i.e., the arm of trigger 161) is pivoted out of engagement with ratchet wheel 144 and the spring that is engaged with spool 142 winds the seatbelt webbing 146 back onto spool 142.

The step of unbuckling the locking tongue 68 from buckle housing 176 when the switch 181 is in adult mode will therefore disengage the automatic locking retractor mechanism 126 and the system has been returned to its default state. In this default state, the seatbelt system may be used to secure an adult or a youth against the vehicle seat. Because the automatic locking retractor mechanism 126 is not engaged in this default state, the seatbelt system 114 is not usable to secure a child car seat 12 in place on vehicle seat 10 in the secure manner described previously herein. If the user subsequently wants to use the seatbelt to lock a child car seat 12 against the vehicle seat 10, then the user has to, once again, go through all of the steps required to activate the automatic locking retractor mechanism 126 by going through the steps described above. So, for example, if the user does not actively move the switch 181 to select the car seat mode 185, then seatbelt system 114 will automatically only be usable in its default state.

Seatbelt system 114 is therefore easy to move from adult mode to car seat mode by taking a few simple steps to prime and engage the ALR 126 by moving the switch and engaging the locking tongue 148 with the buckle housing 176. Seatbelt system 114 is also easily and simply moved from car seat mode back to adult mode, i.e., where the ALR 126 is disabled and disengaged. All that is required is that switch be moved to child seat mode and the locking tongue 148 be disengaged from the buckle housing 176.

It should be noted that any of the steps set out herein as steps that involve electronic actuation or signaling to or from a computer may, instead, be performed by a manual or mechanical mechanism instead. For example, moving switch 181 to a car seat mode 185 may simply be a mechanical action. One or more of the steps or components described herein as mechanical mechanisms and actions may be replaced with electronic components and actions instead, and vice versa.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration set out herein are an example and the disclosure is not limited to the exact details shown or described.

The invention claimed is:

1. A seatbelt system comprising:
a retractor mechanism including a spool mounted for selective rotation about an axis;
a length of a seatbelt webbing having a first end engaged with the spool;
a ratchet wheel operatively engaged with the spool, said ratchet wheel and spool being selectively rotatable in unison about the axis in a first direction to wind the seatbelt webbing onto the spool and in a second direction to wind the seatbelt webbing off of the spool;
a control mechanism operatively engaged with the retractor mechanism; said control mechanism including:
a slider;
an electrical actuator operable to move the slider between a first position and a second position; and
a pawl; wherein the slider pivots the pawl into engagement with the ratchet wheel when the slider is moved to the first position and pivots the pawl out of engagement with the ratchet wheel when the slider is moved to the second position;
wherein the electrical actuator includes a limit switch that is actuated when all of the seatbelt webbing is wound off of the spool; and when the limit switch is actuated, the slider is moved to the first position.

2. The seatbelt system as defined in claim 1, wherein the spool and ratchet wheel are selectively rotatable in one of the first direction and the second direction when the pawl is out of engagement with the ratchet wheel; and wherein the spool and the ratchet wheel are only rotatable in the second direction when the pawl is engaged with the ratchet wheel.

3. The seatbelt system as defined in claim 1, further comprising a gear assembly interposed between the limit switch and the spool.

4. The seatbelt system as defined in claim 1, further comprising:
a computer;
first wiring connecting the limit switch and the computer together; and
second wiring connecting the computer and the slider together; and wherein when the limit switch is moved to the first position a signal is sent via the first wiring to the computer; and a signal is sent from the computer via the second wiring to the slider, and the slider is moved to the first position upon receiving the signal from the computer.

5. The seatbelt system as defined in claim 1, further comprising:
a buckle assembly including a buckle housing; and
a locking tongue provided on the webbing; wherein the locking tongue is selectively engageable in a cavity defined in the buckle housing.

6. A seatbelt system comprising:
a retractor mechanism including a spool mounted for selective rotation about an axis;
a length of a seatbelt webbing having a first end engaged with the spool;

a ratchet wheel operatively engaged with the spool, said ratchet wheel and spool being selectively rotatable in unison about the axis in a first direction to wind the seatbelt webbing onto the spool and in a second direction to wind the seatbelt webbing off of the spool;
a control mechanism operatively engaged with the retractor mechanism; said control mechanism including:
a slider;
an electrical actuator operable to move the slider between a first position and a second position;
a pawl; wherein the slider pivots the pawl into engagement with the ratchet wheel when the slider is moved to the first position and pivots the pawl out of engagement with the ratchet wheel when the slider is moved to the second position; and
a trigger mounted for rotation about a trigger axis; wherein the pawl comprises an arm that extends outwardly from the trigger; and wherein the slider includes a first finger and a second finger that are spaced laterally apart from each other; and where the arm is captured in a space defined between the first finger and the second finger.

7. The seatbelt system as defined in claim 6, wherein the ratchet wheel has a circumferential surface with a plurality of teeth provided thereon; and wherein the arm of the trigger is pivotable into engagement with the plurality of teeth on the ratchet wheel.

8. The seatbelt system as defined in claim 7, further comprising a stop, wherein movement of the slider between the first position and the second position causes the trigger to pivot about the trigger axis and the stop limits the pivotal motion of the trigger.

9. A seatbelt system comprising:
a retractor mechanism including a spool mounted for selective rotation about an axis;
a length of a seatbelt webbing having a first end engaged with the spool;
a ratchet wheel operatively engaged with the spool, said ratchet wheel and spool being selectively rotatable in unison about the axis in a first direction to wind the seatbelt webbing onto the spool and in a second direction to wind the seatbelt webbing off of the spool;
a control mechanism operatively engaged with the retractor mechanism; said control mechanism including:
a slider;
an electrical actuator operable to move the slider between a first position and a second position;
a pawl; wherein the slider pivots the pawl into engagement with the ratchet wheel when the slider is moved to the first position and pivots the pawl out of engagement with the ratchet wheel when the slider is moved to the second position;
a buckle assembly including a buckle housing;
a locking tongue provided on the webbing; wherein the locking tongue is selectively engageable in a cavity defined in the buckle housing; and
a switch provided on the buckle housing; wherein the switch is movable in one of a first direction and a second direction; and wherein when the switch is moved in the first direction the buckle assembly is placed in an adult mode, and when the switch is moved in the second direction, the buckle assembly is placed in a car seat mode.

10. The seatbelt system as defined in claim 9, further comprising wiring connecting the switch to a vehicle's onboard computer; wherein moving the switch in the second direction causes a signal to be sent from the switch to the computer.

* * * * *